(12) United States Patent
Bunyk et al.

(10) Patent No.: US 11,797,874 B2
(45) Date of Patent: Oct. 24, 2023

(54) ERROR REDUCTION AND, OR, CORRECTION IN ANALOG COMPUTING INCLUDING QUANTUM PROCESSOR-BASED COMPUTING

(71) Applicant: D-WAVE SYSTEMS INC., Burnaby (CA)

(72) Inventors: Paul I. Bunyk, New Westminster (CA); James King, Vancouver (CA); Murray C. Thom, Vancouver (CA); Mohammad H. Amin, Coquitlam (CA); Anatoly Smirnov, Vancouver (CA); Sheir Yarkoni, Vancouver (CA); Trevor M. Lanting, Vancouver (CA); Andrew D. King, Vancouver (CA); Kelly T. R. Boothby, Coquitlam (CA)

(73) Assignee: 1372934 B.C. LTD., Burnaby (CA)

( * ) Notice: Subject to any disclaimer, the term of this patent is extended or adjusted under 35 U.S.C. 154(b) by 0 days.

(21) Appl. No.: 17/387,654

(22) Filed: Jul. 28, 2021

(65) Prior Publication Data
US 2022/0019929 A1 Jan. 20, 2022

Related U.S. Application Data

(63) Continuation of application No. 16/275,816, filed on Feb. 14, 2019, now Pat. No. 11,100,418.
(Continued)

(51) Int. Cl.
*G06N 10/00* (2022.01)
*G06F 11/07* (2006.01)

(52) U.S. Cl.
CPC ......... *G06N 10/00* (2019.01); *G06F 11/0736* (2013.01); *G06F 11/0751* (2013.01); *G06F 11/0793* (2013.01)

(58) Field of Classification Search
CPC .... G06N 10/00; G06N 5/003; G06F 11/0793; G06F 11/0751; G06F 11/0736
(Continued)

(56) References Cited

U.S. PATENT DOCUMENTS

| 4,370,359 A | 1/1983 | Fetter et al. |
| 4,947,118 A | 8/1990 | Fujimaki |

(Continued)

FOREIGN PATENT DOCUMENTS

| JP | 7-198816 | 8/1995 |
| JP | 9-33626 | 2/1997 |

(Continued)

OTHER PUBLICATIONS

Bocko et al., "Prospects for Quantum Coherent Computation Using Superconducting Electronics," IEEE Transactions on Applied Superconductivity, Jun. 1997, 5 pages.
(Continued)

*Primary Examiner* — Yair Leibovich
(74) *Attorney, Agent, or Firm* — Cozen O'Connor

(57) ABSTRACT

The systems, devices, articles, and methods described herein generally relate to analog computers, for example quantum processors comprising qubits, couplers, and, or cavities. Analog computers, for example quantum processor based computers, are the subject of various sources of error which can hinder operation, potentially reducing computational accuracy and speed. Sources of error can be broadly characterized, for example as i) a background susceptibility do to inherently characteristics of the circuitry design, ii) as an h/J ratio imbalance, iii) bit flip errors, iv) fidelity, and v) Anderson localization, and various combinations of the aforesaid.

20 Claims, 25 Drawing Sheets

Related U.S. Application Data

(60) Provisional application No. 62/636,688, filed on Feb. 28, 2018.

(58) Field of Classification Search
USPC .................................................. 714/47.1
See application file for complete search history.

(56) References Cited

U.S. PATENT DOCUMENTS

| | | |
|---|---|---|
| 6,608,581 B1 | 8/2003 | Semenov |
| 6,670,630 B2 | 12/2003 | Blais et al. |
| 6,838,694 B2 | 1/2005 | Esteve et al. |
| 6,900,454 B2 | 5/2005 | Blais et al. |
| 6,930,318 B2 | 8/2005 | Vion et al. |
| 6,943,368 B2 | 9/2005 | Amin et al. |
| 6,984,846 B2 | 1/2006 | Newns et al. |
| 7,135,701 B2 | 11/2006 | Amin et al. |
| 7,268,576 B2 | 9/2007 | Amin |
| 7,335,909 B2 | 2/2008 | Amin et al. |
| 7,418,283 B2 | 8/2008 | Amin |
| 7,498,832 B2 | 3/2009 | Baumgardner et al. |
| 7,533,068 B2 | 5/2009 | Maassen et al. |
| 7,619,437 B2 | 11/2009 | Thom et al. |
| 7,639,035 B2 | 12/2009 | Berkley |
| 7,876,248 B2 | 1/2011 | Berkley et al. |
| 7,898,282 B2 | 3/2011 | Harris et al. |
| 8,008,942 B2 | 8/2011 | Van et al. |
| 8,035,540 B2 | 10/2011 | Berkley et al. |
| 8,063,657 B2 | 11/2011 | Rose |
| 8,169,231 B2 | 5/2012 | Berkley |
| 8,190,548 B2 | 5/2012 | Choi |
| 8,195,596 B2 | 6/2012 | Rose et al. |
| 8,283,943 B2 | 10/2012 | Van Den Brink et al. |
| 8,421,053 B2 | 4/2013 | Bunyk et al. |
| 8,536,566 B2 | 9/2013 | Johansson et al. |
| 9,015,215 B2 | 4/2015 | Berkley et al. |
| 9,129,224 B2 | 9/2015 | Lanting et al. |
| 9,152,923 B2 | 10/2015 | Harris et al. |
| 9,178,154 B2 | 11/2015 | Bunyk |
| 9,495,644 B2 | 11/2016 | Chudak et al. |
| 9,547,826 B2 | 1/2017 | King |
| 9,806,711 B1 | 10/2017 | Abdo |
| 10,002,107 B2 | 6/2018 | Lanting |
| 10,290,798 B2 | 5/2019 | Harris et al. |
| 2003/0121028 A1 | 6/2003 | Coury et al. |
| 2004/0000666 A1 | 1/2004 | Lidar et al. |
| 2004/0012407 A1 | 1/2004 | Amin et al. |
| 2004/0077503 A1 | 4/2004 | Blais et al. |
| 2005/0082519 A1 | 4/2005 | Amin et al. |
| 2005/0250651 A1 | 11/2005 | Amin et al. |
| 2006/0097747 A1 | 5/2006 | Amin |
| 2006/0147154 A1 | 7/2006 | Thom et al. |
| 2006/0225165 A1 | 10/2006 | Maassen et al. |
| 2007/0180586 A1* | 8/2007 | Amin ............... B82Y 10/00 977/755 |
| 2007/0239366 A1 | 10/2007 | Hilton et al. |
| 2008/0176750 A1 | 7/2008 | Rose et al. |
| 2008/0215850 A1 | 9/2008 | Berkley et al. |
| 2008/0238531 A1 | 10/2008 | Harris |
| 2008/0260257 A1 | 10/2008 | Rose |
| 2008/0274898 A1 | 11/2008 | Johnson et al. |
| 2009/0033369 A1 | 2/2009 | Baumgardner et al. |
| 2009/0078932 A1 | 3/2009 | Amin |
| 2009/0121215 A1 | 5/2009 | Choi |
| 2009/0289638 A1 | 11/2009 | Farinelli et al. |
| 2010/0306142 A1 | 12/2010 | Amin |
| 2012/0023053 A1 | 1/2012 | Harris et al. |
| 2012/0144159 A1 | 6/2012 | Pesetski et al. |
| 2013/0117200 A1 | 5/2013 | Thom |
| 2015/0032991 A1 | 1/2015 | Lanting et al. |
| 2016/0071021 A1 | 3/2016 | Raymond |
| 2016/0314407 A1 | 10/2016 | Bunyk et al. |
| 2018/0218279 A1* | 8/2018 | Lechner ............... G06N 10/00 |
| 2019/0392878 A1 | 12/2019 | Murduck et al. |
| 2020/0090738 A1 | 3/2020 | Naaman et al. |
| 2020/0342548 A1 | 10/2020 | Mazed et al. |
| 2020/0411937 A1 | 12/2020 | Whittaker et al. |
| 2021/0073667 A1 | 3/2021 | Harris |

FOREIGN PATENT DOCUMENTS

| | | |
|---|---|---|
| JP | 9-83027 | 3/1997 |
| JP | H104223 A | 1/1998 |
| SU | 539333 A1 | 12/1976 |
| WO | 2005024716 | 3/2005 |
| WO | 2006066415 A1 | 6/2006 |
| WO | 2008083498 | 7/2008 |
| WO | 2008089559 A1 | 7/2008 |
| WO | 2009114805 | 9/2009 |
| WO | 2009120638 A2 | 10/2009 |
| WO | 2009143166 A2 | 11/2009 |
| WO | 2010028183 A2 | 3/2010 |
| WO | 2012064974 A2 | 5/2012 |
| WO | 2015013441 | 1/2015 |
| WO | 2016029172 A1 | 2/2016 |
| WO | 2017075246 A1 | 5/2017 |
| WO | 2017214331 A1 | 12/2017 |
| WO | 2019126396 | 6/2019 |

OTHER PUBLICATIONS

Clarke et al., "Superconducting quantum bits," Nature 453:1031-1042, Jun. 19, 2008.

Devoret et al., "Superconducting Circuits for Quantum Information: An Outlook," Science 339:1169-1174, Mar. 8, 2013.

Devoret et al., "Superconducting Qubits: A Short Review," arXiv:cond-mat/0411174v1, Nov. 7, 2004, 41 pages.

Harris et al., "Experimental Demonstration of a Robust and Scalable Flux Qubit," arXiv:0909.4321v1, Sep. 24, 2009, 20 pages.

Harris et al., "Experimental Investigation of an Eight-Qubit Unit Cell in a Superconducting Optimization Processor," arXiv:1004.1628v2, Jun. 28, 2010, 16 pages.

Wikipedia "Ancila bit" page from date Dec. 17, 2017, retrieved using the Way Back Machine, from https:web.archive.org/web/20171217060019/https://en.wikipedia.org/wiki/Ancilla_bit (Year:2017).

Wikipedia "Quantum error Correction bit" page from date Dec. 17, 2017, retrieved using the Way Back Machine, from Https://web.archive.org/web/20171217055958/https://en./wikipedia.org/wiki/quantum_erro_correction(year:2017).

Zagoskin et al., "Superconducting Qubits," La Physique au Canada 63(4):215-227, 2007.

Amin et al., "Josephson-phase qubit without tunneling", Physical Review B, Mar. 5, 2003.

Amin et al., Macroscopic Resonant Tunneling in the Presence of Low Frequency Noise, arXiv:0712.0845 [cond-mat.mes-hall], May 13, 2008, pp. 1-4.

Amin, "Charge-Phase Qubit in Phase Regime", arXiv:cond-mat/0311220, Nov. 10, 2003.

Amin, "Flux qubit in charge-phase regime", Physical Review B 71, Jan. 6, 2005.

Amin, "Quantum nondemolition charge measurement of a Josephson qubit", Physical Review B 71, Apr. 19, 2005.

Averin, "Quantum nondemolition measurements of a qubit", arXiv:cond-mat/0202082, Feb. 6, 2002.

Bao et al., "Fluxonium: an alternative qubit platform for high-fidelity operations", arXiv:2111.13504, Nov. 16, 2021.

Berkley, "A Josephson Junction Qubit", Dissertation University of Maryland, 2003.

Berkley, A.J. et al., "Tunneling Spectroscopy Using a Probe Qubit," arXiv:1210.6310v2 [cond-mat.supr-con], Jan. 3, 2013, 5 pages.

Bladh et al., "Reading out Charge Qubits with a Radio Frequency Single Electron Transistor", Physica Scripta, 2002.

Blatter et al., "Design aspects of superconducting-phase quantum bits," Physical Review B 63: 174511-1-174511-9, 2001.

Braginsky et al., "Quantum nondemolition measurements: the route from toys to tools", Review of Modern Physics 68, Jan. 1, 1996.

Caves et al., "On the measurement of a weak classical force coupled to a quantum-mechanical oscillator. I. Issues of principle", Reviews of Modern Physics 52, Apr. 1, 1980.

(56) References Cited

OTHER PUBLICATIONS

Cottet, "Implementation of a quantum bit in a superconducting circuit", Thesis University of Paris, Sep. 30, 2002.
Deutsch, "Quantum theory, the Church-Turing principle and the universal quantum computer," Appeared in Proceedings of the Royal Society of London A 400: 97-117, 1985.
Devoret et al., "Amplifying quantum signals with the single-electron transistor", Insight review articles, Aug. 31, 2000.
Dolan, "Offset masks for lift-off photoprocessing", Applied Physics Letters, Aug. 26, 2008. https://aip.scitation.org/doi/10.1063/1.89690.
Duty et al., "Coherent Dynamics of a Josephson Charge Qubit," Physical Review B 69(140503(R)):1-4, 2004.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Feldman, "The Josephson Junction as a Variable Inductance Tuner," Extended Abstracts of the Fourth International Superconductive electronics Conference, pp. 32-33, Aug. 1993.
Feynman, "Simulating Physics with Computers," International Journal of Theoretical Physics 21(6/7): 467-488, 1982.
Ficheux, et al., "Fast Logic with Slow Qubits: Microwave-Activated Controlled-Z Gate on Low-Frequency Fluxoniums", Physical Review X 11, 021026 (2021), 16 pages.
Friedman et al., "Quantum superposition of distinct macroscopic states," Nature 406:43-46, Jul. 6, 2000.
Fulton et al., "Observation of Single-Electron Charging Effects in Small Tunnel Junctions", Physical Review Letters, Jul. 6, 1987.
Geerlings, "Improving Coherence of Superconducting Qubits and Resonators", A Dissertation Presented to the Faculty of the Graduate School of Yale University, Aug. 19, 2013.
Grangier, "Quantum non-demolition measurements in optics", Nature, Dec. 10, 1998.
Guillaume et al., "Free evolution of superposition states in a single Cooper pair box", Physical Review B 69, Dec. 19, 2003.
Harris et al., "Sign and Magnitude Tunable Coupler for Superconducting Flux Qubits," arXiv:cond-mat/0608253v1 [cond-mat.supr-con], Aug. 11, 2006. 5 pages.
Harris, et al., "Compound Josephson-junction coupler for flux qubits with minimal crosstalk", Phys. Rev. B 80, 052506—Published Aug. 20, 2009, 4 pages.
Harris, et al., "Probing Noise in Flux Qubits via Macroscopic Resonant Tunneling," arXiv:0712.0838 [cond-mat.mes-hall], 2008, pp. 1-4.
Hazard et al., "Nanowire-Superinductance Fluxonium Qubit", arXiv:1805.00938v2, Jan. 29, 2019.
Hormozi et al., "Nonstoquastic Hamiltonians and Quantum Annealing of an Ising Spin Glass," arXiv:1609.06558v2 [quant-ph], May 15, 2017, 9 pages.
Born, et al., "Fabrication of Ultrasmall Tunnel Junctions by Electron Beam Direct-Writing", IEEE, 2001, 4 pages.
Boxio, et al., Computational Role of Multiqubit Tunneling in a Quantum Annealer, arXiv:1502.05754v1 [quant-ph], Feb. 20, 2015, pp. 1-7.
Hioe, et al., "Quantum Flux Parametron"—A Single Quantum Flux Superconducting Logic Device, World Scientific Publishing Co. Pte. Ltd., Singapore, 1991, pp. 23-41.
Inokuchi, "Analog Computation Using Quantum-Flux Parametron Devices," Physica C 357-360 :1618-1621, 2001.
Niepce, D., "Fabrication and Characterisation of Thin-Film Superconducting Nanowire Superconductors for Novel Quantum Devices", Master's Thesis in Nanoscience, Chalmers University of Technology, ISSN 1652-8557, 2014, 66 pages.
Semenov, et al., "Classical and Quantum Operation Modes of the Reversible Logic Circuits," Department of Physics and Astronomy, Stony Brook University, Stony Brook, New York, Presentation, Dec. 2006, 29 pages.
International Search Report and Written Opinion for PCT/US2022/037877 dated Nov. 7, 2022, 8 pages.

Mizuta, et al., "Quantum and Tunnelling Capacitance in Charge and Spin Qubits", arXiv:1604.02884v2 [cond-mat.mes-hall] Aug. 16, 2016, 9 pages.
Il'ichev et al., "Continuous Monitoring of Rabi Oscillations in a Josephson Flux Qubit," Physical Review Letters 91(9): 097906-1-097906-4, week ending Aug. 29, 2003.
Ioffe et al., "Environmentally decoupled sds—Wave Josephson junctions for quantum computing", Nature 398, pp. 679-681 (1999).
Jordan et al., "Quantum Nondemolition Measurement of a Kicked Qubit", arXiv:cond-mat/0406529, Jun. 22, 2004.
Kjaergaard et al., "Superconducting Qubits: Current State of Play", arXiv:1905.13641v1, May 31, 2019.
Korotkov et al., "Continuous weak measurement of quantum coherent oscillations", Physical Review B 64, Feb. 14, 2000.
Koval et al., "Narrow Long Josephson Junctions", IEEE, Jun. 1999. https://ieeexplore.ieee.org/document/783894.
Krantz et al., "A quantum engineer's guide to superconducting qubits", Appl. Phys. Rev. 6, 021318 (2019), Jan. 20, 2019.
Lanting et al., "Entanglement in a Quantum Annealing Processor," Physical Review X 4:021041, 2014. (14 pages).
Lanting et al., "Observation of Co-tunneling in pairs of coupled flux qubits", Physical Review B, Aug. 23, 2010. https://journals.aps.org/prb/abstract/10.1103/PhysRevB.82.060512.
Likharev et al., "Reversible Conveyor Computaion in Array of Parametric Quantrons", IEEE Transactions on Magnetics, Mar. 1, 1985.
Likharev, "Classical and Quantum Limitations on Energy Consumption in Computation," International Journal of Theoretical Physics 21(3/4):311-326, 1982.
Likharev, "Dynamics of Some Single Flux Quantum Devices: I. Parametric Quatron," IEEE Transactions on Magnetics MAG-13(1):242-244, 1977.
Majer, J.B., "Superconducting Quantum Circuits," Thesis, published by DUP Science, Dec. 13, 2002, 120 pages.
Makhlin et al., "Jospehson-Junction Qubits and the Readout Process by Single-Electron Transistors", arXiv:cond-mat/9811029 [cond-mat.mes-hall], Dec. 2, 1999.
Makhlin et al., "Quantum-state engineering with Josephson-junction devices," Reviews of Modern Physics 73 (2):357-400, Apr. 2001.
Manucharyan et al., "Fluxonium: single Cooper pair circuit free of charge offsets", arXiv:0906.0831v2, [cond-mat.mes-hall] Oct. 20, 2009, 13 pages.
Masluk et al., "Microwave Characterization of Josephson Junction Arrays: Implementing a Low Loss Superinductance", Phys. Rev. Lett. 109, 137002, Jun. 21, 2012.
Masluk, N., "Reducing the Losses of the Fluxonium Artificial Atom," Dissertation Presented to the Faculty of the Graduate School of Yale University, 2012, 223 pages.
Mooij et al., "Josephson Persistent-Current Qubit," Science 285:1036-1039, Aug. 13, 1999.
Nakamura et al., "Coherent control of macroscopic quantum states in a single-Cooper-pair-box," Nature 398:786-788, Apr. 29, 1999.
Nguyen et al., "The high-coherence fluxonium qubit", arXiv:1810.11006v1, Oct. 25, 2018.
Nielsen et al., Quantum Computation and Quantum Information, Cambridge University Press, Cambridge, 2000, "7.8 Other implementation schemes," pp. 343-345.
Nielsen. "The Fermionic canonical commutation relations and the Jordan-Wigner transform", School of Physical Sciences, Jul. 29, 2005.
Orlando et al., "Superconducting persistent-current qubit," Physical Review B 60(22):15398-15413, Dec. 1, 1999.
Paauw et al., "Spectroscopy on Two Coupled Superconducting Flux Qubits", Physical Review Letters, Mar. 9, 2005. https://journals.aps.org/prl/abstract/10.1103/PhysRevLett.94.090501.
Peil et al., "Observing the Quantum Limit of an Electron Cyclotron: QND Measurements of Quantum Jumps between Fock States", Physical Review Letters, Aug. 16, 1999.
Perdomo-Ortiz et al., "Opportunities and Challenges for Quantum-Assisted Machine Learning in Near-Term Quantum Computers," arXiv:1708.09757v1 [quant-ph]. Aug. 31, 2017, 14 pages.

(56) References Cited

OTHER PUBLICATIONS

Pop et al., "Coherent suppression of electromagnetic dissipation due to superconducting quasiparticles", Nature vol. 508, pp. 369-372 (2014), Apr. 16, 2014.
Pryde et al., "Measuring a Photonic Qubit without Destroying It", Physical Review Letters, May 14, 2004.
Schoelkopf et al., "The Radio-Frequency Single-Electron Transistor (RF-SET): A Fast and Ultrasensitive Electrometer", Science Magazine, May 22, 1998.
Shor, "Introduction to Quantum Algorithms," AT&T Labs—Research, arXiv:quant-ph/0005003 v2, pp. 1-17, Jul. 6, 2001.
Smith et al., "Quantization of inductively shunted superconducting circuits", Physical Review B 94, 144507 (2016), Feb. 4, 2016.
Travaglione et al., "Phase estimation as a quantum nondemolition measurement", arXiv:quant-ph/0203130, Mar. 27, 2002.
Vion et al., "Manipulating the quantum state of an electrical circuit", Science, 296, pp. 886-889 (2002).
Weber et al., "Coherent Coupled Qubits for Quantum Annealing," arXiv:1701.06544v2 [quant-ph], Jun. 6, 2017, 14 pages.
Zagoskin, "A scalable, tunable qubit, based on a clean DND or grain boundary D_D junction", Los Alamos National Laboratory preprint cond-mat/9903170, pp. 1-8, 1999.
Zhang, et al., "Universal Fast-Flux Control of a Coherent, Low-Frequency Qubit", Physical Review X 11, 011010 (2021), 13 pages.
Altshuler, et al., "Anderson localization casts clouds over adiabatic quantum optimization", arXiv:0912.0746v1 [quant-ph] Dec. 3, 2009, 14 pages.
Byrd, "A Limited-Memory Algorithm For Bound-Contrained Optimization". SIAM Journal on Scientific Computing, Jun. 17, 2005.
Chiorescu, et al. "Coherent Quantum Dynamics of a Superconducting Flux Qubit", Science Feb. 13, 2003, vol. 299, Issue 5614-pp. 1869-1871.
Dickson et al., "Thermally Assisted Quantum Annealing of a 16-Qubit Problem," Nature Communications, 2013, 6 pages.
Kerman et al., "Quantum Enhanced Optimization: Experimental Study Overview", IARPA, Oct. 26, 2015.
Mohseni, et al., "Environment-Assisted Quantum Walks in Photosynthetic Energy Transfer", arXiv: 0805.2741v2 [quant-ph] Oct. 14, 2008, 9 pages.
Oliver, "Quantum Enhanced Optimization: Experimental Study Overview", IARPA, Oct. 26, 2015.
Pudenz, et al., "Error corrected quantum annealing with hundreds of qubits", arXiv:1307.8190v1 [quant-ph] Jul. 31, 2013, 18 pages.

* cited by examiner

ERROR REDUCTION AND, OR, CORRECTION IN ANALOG COMPUTING INCLUDING QUANTUM PROCESSOR-BASED COMPUTING

FIELD

This disclosure generally relates to analog computing, for example quantum processor based computing, and in particular relates to reducing, correcting, or otherwise counteracting sources of error, via various hardware, and, or software techniques, designs, layouts, topologies, and architectures of analog processors, for example quantum processors, and to the operation of the same.

BACKGROUND

Quantum Devices

Quantum devices are structures in which quantum mechanical effects are observable. Quantum devices include circuits in which current transport is dominated by quantum mechanical effects. Such devices include spintronics, where electronic spin is used as a resource, and superconducting circuits. Both spin and superconductivity are quantum mechanical phenomena. Quantum devices can be used for measurement instruments, in computing machinery, and the like.

Quantum Computation
Circuit Quantum Electrodynamic

The field of quantum electrodynamics (QED) concerns interactions between electrons and quantized electromagnetic fields. Often systems of interest involve atoms and photons in a cavity or Cavity QED. Analogs to these systems have been implemented in electrical circuits or Circuit QED. Superconducting qubits, whose properties can be engineered, play the role of artificial atoms. These artificial atoms have a discrete set of quantized energy levels. Further, it is possible to put these atoms into coherent superpositions of different quantum states. The cavities in Circuit QED include resonators. QED experiments include measuring the state of the atoms (or qubits) to infer information about the state of the interacting photons or measuring the photons to infer information about the state of atoms (or qubits).

Superconducting Qubits

There are solid state qubits based on circuits of superconducting materials. There are two superconducting effects that underlie how superconducting qubits operate: magnetic flux quantization, and Josephson tunneling.

Flux is quantized via the Aharonov-Bohm effect where electrical charge carriers accrue a topological phase when traversing a conductive loop threaded by a magnetic flux. For superconducting loops, the charge carriers are pairs of electrons called Cooper pairs. For a loop of sufficiently thick superconducting material, quantum mechanics dictates that the Cooper pairs accrue a phase that is an integer multiple of $2\pi$. This then constrains the allowed flux in the loop. The flux is quantized. The current in the loop is governed by a single wave function and, for the wave function to be single-valued at any point in the loop, the flux within is quantized. In other words, superconductivity isn't simply the absence of electrical resistance but rather a quantum mechanical effect.

Josephson tunneling is the process by which Cooper pairs cross an interruption, such as an insulating gap of a few nanometers, between two superconducting electrodes. The amount of current is sinusoidally dependent on the phase difference between the two populations of Cooper pairs in the electrodes. That is, the phase difference across the interruption.

These superconducting effects are present in different configurations and give rise to different types of superconducting qubits including flux, phase, charge, and hybrid qubits. These different types of qubits depend on the topology of the loops, placement of the Josephson junctions, and the physical parameters of the parts of the circuits, such as, inductance, capacitance, and Josephson junction critical current.

Superconducting Quantum Processor

A plurality of superconducting qubits may be included in a superconducting quantum processor. A superconducting quantum processor may include a number of qubits and associated local bias devices, for instance two or more superconducting qubits. A superconducting quantum processor may also employ coupling devices (i.e., "couplers") that selectively provide communicative coupling between qubits. In some implementations, a qubit and a coupler may resemble each other but differ in physical parameters. One difference is the screening parameter, $\beta$. Consider an rf-SQUID, which includes a superconducting loop interrupted by Josephson junction. The screening parameter $\beta$ is defined as the ratio of the geometrical inductance of the loop to the so called Josephson inductance of the junction. The screening parameter $\beta$ is defined a $2\pi L/c/\Phi_0$. That is, $\beta$ is proportional to the product of inductance and critical current. A design with lower values of $\beta$, below and about 1, behaves more like an inductive loop whose magnetic susceptibility is altered by the presence of the Josephson junction. This is a monostable device. A design with higher values of $\beta$ is more dominated by the Josephson junctions and produces a multistable behavior, such as, bistable behavior. Flux qubits are typically desired to be bistable wherein there are two wells in the potential and often with degenerate ground state configurations for the supercurrent flowing in the loop. For SQUIDs with sufficiently low capacitance, quantum tunneling lifts the degeneracy of the ground states. Couplers are typically monostable such as there is a single ground state. Both qubits and couplers may have more devices associated with them. Further details and embodiments of example quantum processors that may be used in conjunction with the present systems and devices are described in, for example, U.S. Pat. Nos. 7,533,068; 8,008,942; 8,195,596; 8,190,548; and 8,421,053.

A superconducting quantum processor may also include devices to read-out and control the state of one or more qubits.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is a linear interpolation between initial Hamiltonian and final Hamiltonian. An example is given by:

$$H_e = (1-s)H_i + sH_f \quad (1)$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can transition to a higher energy state, such as the first excited state. In the present systems and devices an "adiabatic" evolution is an evolution that satisfies the adiabatic condition:

$$\dot{s}|\langle 1|dH_e/ds|0\rangle|=\delta g^2(s) \quad (2)$$

where $\dot{s}$ is the time derivative of s, g(s) is the difference in energy between the ground state and first excited state of the system (also referred to herein as the "gap size") as a function of s, and δ is a coefficient much less than 1. Generally, the initial Hamiltonian $H_i$ and the final Hamiltonian $H_f$ do not commute. That is, $[H_i, H_f]\neq 0$.

The process of changing the Hamiltonian in adiabatic quantum computing may be referred to as evolution. If the rate of change, for example, change of s, is slow enough that the system is always in the instantaneous ground state of the evolution Hamiltonian, then transitions at anti-crossings (i.e., when the gap size is smallest) are avoided. The example of a linear evolution schedule is given above. Other evolution schedules are possible including non-linear, parametric, and the like. Further details on adiabatic quantum computing systems, methods, and apparatus are described in, for example, U.S. Pat. Nos. 7,135,701; and 7,418,283.

Quantum Annealing

Quantum annealing is a computation method that may be used to find a low-energy state, typically preferably the ground state, of a system. Similar in concept to classical simulated annealing, the method relies on the underlying principle that natural systems tend towards lower energy states because lower energy states are more stable. However, while classical annealing uses classical thermal fluctuations to guide a system to a low-energy state and ideally its global energy minimum, quantum annealing may use quantum effects, such as quantum tunneling, as a source of disordering to reach a global energy minimum more accurately and/or more quickly than classical annealing. In quantum annealing thermal effects and other noise may be present to annealing. The final low-energy state may not be the global energy minimum.

Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. An objective function, such as an optimization problem, is encoded in a Hamiltonian $H_P$, and the algorithm introduces quantum effects by adding a disordering Hamiltonian $H_D$ that does not commute with $H_P$. An example case is:

$$H_E \propto A(t)H_D+B(t)H_P \quad (3)$$

where A(t) and B(t) are time dependent envelope functions. For example, A(t) changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing A(t)). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system may settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of disordering Hamiltonian $H_D$ (i.e., reducing A(t)) in quantum annealing may follow a defined schedule known as an annealing schedule. Unlike adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem. The removal of the disordering Hamiltonian $H_D$ may occur after the same Hamiltonian has been added. That, is turn on the disordering Hamiltonian and then off.

Simulating Physics

Adiabatic quantum computation may also be used for quantum simulation. Quantum simulation was the original application of quantum computers, see for example, R. P. Feynman, 1982, *International journal of theoretical physics* 21(6), 467. The Hamiltonian of a quantum system is mapped on the Hamiltonian of a multi-qubit system and defines the final or problem Hamiltonian. An initial or disordering Hamiltonian is present per adiabatic computing model. The ground state of the problem Hamilton, reached via adiabatic evolution. Reading out the final state then provides information about the ground state of the simulated system. A ground-state energy is the lowest eigenvalue of a time-independent Schrödinger equation for the system. The Phase-Estimation Algorithm (PEA) provides the spectra of the system being simulated via the application of various gates and measurements in accordance with the gate model of quantum computing. See D. S. Abrams and S. Lloyd, 1997, *Phys. Rev. Lett.* 79, 2586; and D. S. Abrams and S. Lloyd, 1999, *Phys. Rev. Lett.* 83, 5162.

Intrinsic Control Errors/Background Susceptibility

In a quantum computation, couplers are often used to provide communicative paths between physical qubits. However, due to the non-ideality of qubits, the bias of a qubit may affect neighboring qubits by inducing nearby couplers to cause indirect communicative coupling that is not characterized by the problem Hamiltonian. This phenomenon is called background susceptibility which is a source of intrinsic control error that can lead to loss of fidelity, limit control precision, and sub-optimal solutions. The errors resulting from background susceptibility tend to propagate when solving problems involving large clusters of qubits because the interactions or indirect communicative coupling is localized.

One approach to correcting errors caused by background susceptibility is compensating for the expected error by hand calculations. However, this solution is only feasible for certain types of cluster problems which include only a very small subset of qubits. Generally, problems solved on a quantum processor will involve many qubits. If a large number of qubits are clustered, significant errors may arise that cannot be adequately compensated for by hand. Additionally, manual methods of addressing background susceptibility are vulnerable to random errors and can have inconsistent results. An alternative option is to ignore the errors resulting from background susceptibility at the risk of allowing the system Hamiltonian to misrepresent the problem of interest and provide an improper solution. There is thus a general desire for systems and methods for compensating for background susceptibility in a quantum processor.

BRIEF SUMMARY

The systems, devices, articles, and methods described herein generally relate to analog computers, for example quantum processors comprising qubits, couplers, and, or cavities. Analog computers, for example quantum processor based computers, are the subject of various sources of error which can hinder operation, potentially reducing computational accuracy and speed. Sources of error can be broadly characterized, for example as i) a background susceptibility do to inherently characteristics of the circuitry design, ii) as an h/J ratio imbalance, iii) bit flip errors, iv) fidelity, and v) Anderson localization, and various combinations of the aforesaid.

SUMMARY

A method of operation in a computational annealing device is described. The computational annealing device comprises both a quantum processor and at least one processor-based device communicatively coupled to one another, the quantum processor comprising a plurality of qubits and a plurality of coupling devices, wherein each coupling device is operable to provide controllable communicative coupling between two of the plurality of qubits. The method may be summarized as comprising: identifying a problem type of a first submitted problem; determining whether the identified problem type of the first submitted problem is a problem type that is relatively sensitive to background susceptibility error $\chi$ or is a problem type that is relatively insensitive to background susceptibility error $\chi$; and in response to a determination that the problem type of the first submitted problem is one that is relatively sensitive to background susceptibility error $\chi$, employing existing hardware of the quantum processor to compensate for background susceptibility error $\chi$ when generating solutions to the first submitted problem via the quantum processor.

Employing the existing hardware of the quantum processor to compensate for background susceptibility error $\chi$ when generating solutions to the first submitted problem via the quantum processor may include employing a number of the qubits of the quantum processor as ancilla qubits to compensate for background susceptibility error $\chi$ when generating solutions to the first submitted problem via the quantum processor. Employing a number of the qubits of the quantum processor as ancilla qubits to compensate for background susceptibility error $\chi$ when generating solutions to the first submitted problem via the quantum processor may include embedding a problem graph of the first submitted problem in a hardware graph of the quantum processor along with setting one or more values of one or more ancilla qubits to compensate for the background susceptibility error $\chi$ without contributing to the solution of the first submitted problem. Setting one or more values of one or more ancilla qubits to compensate for the background susceptibility error $\chi$ without contributing to the solution of the first submitted problem may include setting a bias H of one or more ancilla qubits to zero.

Employing the existing hardware of the quantum processor to compensate for background susceptibility error $\chi$ when generating solutions to the first submitted problem via the quantum processor may include determining which pairs of a plurality of problem qubits need to be coupled by a respective ancilla qubit; and recasting a problem graph of the first submitted problem for embedding the first submitted problem in a hardware graph of the quantum processor based at least in part on the determination of which pairs of a plurality of problem qubits need to be coupled by a respective ancilla qubit.

The method may further comprise: in response to a determination that the problem type is one that is relatively insensitive to background susceptibility error $\chi$, employing the existing hardware to embed a problem graph of the first submitted in a hardware graph of the quantum processor without using the existing hardware of the quantum processor to compensate for background susceptibility error $\chi$. Employing the existing hardware to embed a problem graph of the first submitted in a hardware graph of the quantum processor without using the existing hardware of the quantum processor to compensate for background susceptibility error $\chi$ may include embedding the problem graph of the first submitted problem in the hardware graph of the quantum processor without any ancilla qubits to compensate for background susceptibility error $\chi$.

Determining whether the identified problem type of the first submitted problem is a problem type that is relatively sensitive to background susceptibility error $\chi$ or is a problem type that is relatively insensitive to background susceptibility error $\chi$ may include determining whether the first submitted problem is an optimization problem and hence is relatively sensitive to background susceptibility error $\chi$.

Determining whether the identified problem type of the first submitted problem is a problem type that is relatively sensitive to background susceptibility error $\chi$ or is a problem type that is relatively insensitive to background susceptibility error $\chi$ may include determining whether the first submitted problem is a machine learning problem and hence is relatively insensitive to background susceptibility error $\chi$.

Determining whether the identified problem type of the first submitted problem is a problem type that is relatively sensitive to background susceptibility error $\chi$ or is a problem type that is relatively insensitive to background susceptibility error $\chi$ may include querying at least one of a data schema or a piece of metadata, logically associated with the first submitted problem via one or more stored relationships.

Determining whether the identified problem type of the first submitted problem is a problem type that is relatively sensitive to background susceptibility error $\chi$ or is a problem type that is relatively insensitive to background susceptibility error $\chi$ may include analyzing the first submitted problem to determine a broad class of problems to which the first submitted problem belongs.

The method may further comprise: identifying a problem type of a second submitted problem; determining whether the identified problem type of the second submitted problem is a problem type that is relatively sensitive to background susceptibility error $\chi$ or is a problem type that is relatively insensitive to background susceptibility error $\chi$; and in response to a determination that the problem type of the second submitted problem is a problem type that is relatively insensitive to background susceptibility error $\chi$, employing the existing hardware of the quantum processor to embed the problem graph of the second submitted problem without using the existing hardware to compensate for background susceptibility error $\chi$ when generating solutions to the second submitted problem via the quantum processor. Employing the existing hardware of the quantum processor to embed the a problem graph of the second submitted problem without using the existing hardware to compensate for background susceptibility error $\chi$ when generating solutions to the second submitted problem via the quantum processor may include embedding the problem graph of the second submitted in the hardware graph of the quantum processor without any ancilla qubits to compensate for background susceptibility error $\chi$. Employing the existing hardware of the quantum processor to embed the a problem graph of the second submitted problem without using the existing hardware to compensate for background susceptibility error $\chi$ when generating solutions to the second submitted problem via the quantum processor may include embedding the problem graph of the second submitted in the hardware graph of the quantum processor employing one or more of the qubits of the quantum processor that were used as ancilla qubits when generating solutions for the first submitted problem as problem qubits when generating solutions for the second submitted problem.

A computational annealing system may be summarized as comprising: a quantum processor, the quantum processor comprising a plurality of qubits and a plurality of coupling devices, wherein each coupling device is operable to provide controllable communicative coupling between two of the plurality of qubits; and at least one processor-based device communicatively coupled to the quantum processor; at least one non-transitory processor-readable medium that stores at least one of processor-executable instructions or data. The processor-executable instructions or data, when executed, may cause at least one processor to: identify a problem type of a first submitted problem; determine whether the identified problem type of the first submitted problem is a problem type that is relatively sensitive to background susceptibility error $\chi$ or is a problem type that is relatively insensitive to background susceptibility error $\chi$; and in response to a determination that the problem type of the first submitted problem is one that is relatively sensitive to background susceptibility error $\chi$, employ existing hardware of the quantum processor to compensate for background susceptibility error $\chi$ when generating solutions to the first submitted problem via the quantum processor.

The computational annealing system may execute any portion of all of the methods described above.

A method for compensating for background susceptibility in a quantum processor is described. The quantum processor may include a set of qubits and a set of couplers that provide communicative coupling between pairs of qubits. The method may be summarized as comprising: communicatively coupling a first qubit to a second qubit via a first coupler, the first coupler set to a first coupling strength; communicatively coupling a third qubit to the second qubit via a second coupler, the second coupler set to a second coupling strength; communicatively coupling a fourth qubit to the third qubit via a third coupler, the third coupler set to a third coupling strength; communicatively coupling the fourth qubit to the first qubit via a fourth coupler, the fourth coupler set to a fourth coupling strength; wherein communicatively coupling the fourth qubit to the third qubit includes strongly communicatively coupling the fourth qubit and the third qubit to operate as a logical qubit; and the fourth coupling strength is proportional to background susceptibility and at least the first coupling strength and the second coupling strength.

Communicatively coupling the first qubit to the second qubit may include communicatively coupling the first qubit directly to the second qubit. Communicatively coupling the second qubit to the third qubit may include communicatively coupling the first qubit directly to the third qubit.

The method may further comprise: applying a first bias to the first qubit; applying a second bias to the second qubit; applying a third bias to the third qubit; applying a fourth bias to the fourth qubit, wherein applying the fourth bias includes applying a bias that is smaller than at least one of: the first bias, the second bias, and the third bias. Applying the fourth bias may include applying a bias that is equal to zero. The first qubit and the third qubit may be indirectly communicatively coupled with a fifth coupling strength proportional to background susceptibility and at least the first coupling strength and the second coupling strength. Communicatively coupling the fourth qubit to the third qubit may compensate for background susceptibility caused by the indirect communicative coupling between the first qubit and the third qubit. Communicatively coupling the fourth qubit to the first qubit may compensate for background susceptibility caused by the indirect communicative coupling between the first qubit and the third qubit. The third coupling strength may, for example, be at least as strong as the first, the second, and the fourth coupling strengths.

The set of qubits and the set of couplers may correspond to a set of vertices and a set of edges of a bipartite graph. The first qubit and the third qubit may correspond to vertices in a first subset of the set of vertices of the bipartite graph. The second qubit and the fourth qubit may correspond to vertices in a second subset of the set of vertices of the bipartite graph.

A method of operation in a computational system that comprises both a specific instance of a quantum processor and at least one processor-based device communicatively coupled to one another is described. The quantum processor may comprise a plurality of qubits and a plurality of coupling devices, wherein each coupling device is operable to provide controllable communicative coupling between two of the plurality of qubits, the quantum processor having a background susceptibility error $\chi$, that is specific to the specific instance of the quantum processor. The method may be summarized as comprising: receiving a first submitted problem; modifying the first submitted problem to compensate for a background susceptibility error $\chi$, of the specific instance of the quantum processor on which the first submitted problem will be run; producing a problem graph representation of the modified first submitted problem; embedding the problem graph representation of the modified first submitted problem in a hardware graph of the quantum processor; and generating solutions to the first submitted problem via the quantum processor with the problem graph representation of the modified first submitted problem embedded therein.

Modifying the first submitted problem to compensate for a background susceptibility error $\chi$, of the specific instance of the quantum processor on which the first submitted problem will be run may include modifying the first submitted problem to compensate for a background susceptibility error $\chi$, of the specific instance of the quantum processor on which the problem will be run or evolved such that a target solution to the problem formulation will also be a solution with a lowest background susceptibility error $\chi$ possible.

Modifying the first submitted problem to compensate for a background susceptibility error $\chi$, of the specific instance of the quantum processor on which the first submitted problem will be run may include modifying the first submitted problem to compensate for a background susceptibility error $\chi$, of the specific instance of the quantum processor on which the problem will be run or evolved such that an optimal solution to the problem formulation will also be a solution with a lowest background susceptibility error $\chi$ possible.

Modifying the first submitted problem to compensate for a background susceptibility error $\chi$, of the specific instance of the quantum processor on which the first submitted problem will be run may include applying a first function to a chosen nominal Hamiltonian or to a vector $\theta$ that represents a set of terms of chosen nominal Hamiltonian to obtain a putative Hamiltonian.

Modifying the first submitted problem to compensate for a background susceptibility error $\chi$, of the specific instance of the quantum processor on which the first submitted problem will be run further may include applying a second function to the putative Hamiltonian to obtain a logical putative Hamiltonian. Applying a second function to the putative Hamiltonian to obtain a logical putative Hamiltonian may include applying a second function that represents a native-to-logical conversion to the putative Hamiltonian to obtain a logical putative Hamiltonian.

Applying at least a first function to a chosen nominal Hamiltonian or to a vector $\theta$ that represents a set of terms of chosen nominal Hamiltonian to obtain a putative Hamiltonian may include applying at least a first function to the chosen nominal Hamiltonian that minimizes a difference between the logical target Hamiltonian and the logical putative Hamiltonian. Applying at least a first function to the chosen nominal Hamiltonian that minimizes a difference between the logical target Hamiltonian and the logical putative Hamiltonian includes applying an L-BFGS optimization algorithm to minimize the difference between the logical target Hamiltonian and the logical putative Hamiltonian.

A computational system may be summarized as comprising: a specific instance of a quantum processor, the quantum processor comprising a plurality of qubits and a plurality of coupling devices, wherein each coupling device is operable to provide controllable communicative coupling between two of the plurality of qubits, the quantum processor having a background susceptibility error $\chi$, that is specific to the specific instance of the quantum processor; and at least one processor-based device communicatively coupled to the quantum processor; at least one non-transitory processor-readable medium that stores at least one of processor-executable instructions or data. The processor-executable instructions or data, when executed, may cause at least one processor to: receive a first submitted problem; modify the first submitted problem to compensate for a background susceptibility error $\chi$, of the specific instance of the quantum processor on which the first submitted problem will be run; produce a problem graph representation of the modified first submitted problem; embed the problem graph representation of the modified first submitted problem in a hardware graph of the quantum processor; and generate solutions to the first submitted problem via the quantum processor with the problem graph representation of the modified first submitted problem embedded therein.

The computational annealing system may perform a portion of all of the methods described above.

A method of operation in a computational system that comprises both a specific instance of a quantum processor and at least one processor-based device communicatively coupled to one another, the quantum processor comprising a plurality of qubits and a plurality of coupling devices, wherein each coupling device is operable to provide controllable communicative coupling between two of the plurality of qubits, sets of two or more qubits coupleable as chains of qubits which function as a respective logical qubit, the quantum processor having a background susceptibility error $\chi$, that is specific to the specific instance of the quantum processor The method may be summarized as comprising: receiving a first submitted problem; modifying the first submitted problem to compensate for a background susceptibility error $\chi$, of the specific instance of the quantum processor on which the first submitted problem will be run; producing a problem graph representation of the modified first submitted problem; embedding the problem graph representation of the modified first submitted problem in a hardware graph of the quantum processor; and generating solutions to the first submitted problem via the quantum processor with the problem graph representation of the modified first submitted problem embedded therein.

Modifying the first submitted problem to compensate for a background susceptibility error $\chi$, of the specific instance of the quantum processor on which the first submitted problem will be run may include scaling each coupler between different chains of qubits with a background susceptibility error $\chi$ compensation factor. Modifying the first submitted problem to compensate for a background susceptibility error $\chi$, of the specific instance of the quantum processor on which the first submitted problem will be run may include applying a function f(h,J,chi) that adds a set of background susceptibility error $\chi\_$ terms to a problem Hamiltonian (h,J). Modifying the first submitted problem to compensate for a background susceptibility error $\chi$, of the specific instance of the quantum processor on which the first submitted problem will be run may include finding a hardware input (h_hw,J_hw) where a function f(h_hw,J_hw, $\chi$) is at least within a threshold a problem Hamiltonian (h,J).

Finding a hardware input (h_hw,J_hw) where a function f(h_hw,J_hw, $\chi$) is at least within a threshold a problem Hamiltonian (h,J) may include finding a hardware input (h_hw,J_hw) where a function f(h_hw,J_hw, $\chi$) is at least within a threshold a problem Hamiltonian (h,J) in which a number of states of the problem Hamiltonian (h,J) without broken chains has the same energy in a function f(h_hw, J_hw, $\chi$) as those states have in the problem Hamiltonian (h,J). Finding a hardware input (h_hw,J_hw) where a function f(h_hw,J_hw, $\chi$) is at least within a threshold a problem Hamiltonian (h,J) may include applying a first-order compensation. Applying a first-order compensation may include refining the first-order compensation via a gradient descent or another convex optimization.

Modifying the first submitted problem to compensate for a background susceptibility error $\chi$, of the specific instance of the quantum processor on which the first submitted problem will be run may include solving a problem on chains of qubits. Modifying the first submitted problem to compensate for a background susceptibility error $\chi$, of the specific instance of the quantum processor on which the first submitted problem will be run further may include at least one of: i) ignoring any ghost couplings between two qubits on a same one of the chains, and, or ii) ignoring any ghost couplings arising from two incident couplings, to simplify the problem on chains of qubits, and then solving the problem on chains of qubits, where the ghost couplings are couplings between a respective pairs of qubits that are not specified by a problem Hamiltonian. The the background susceptibility error $\chi$, that is specific to the specific instance of the quantum processor may be different than a respective background susceptibility error $\chi$, that is specific to a different specific instance of another quantum processor.

A computational system may be summarized as comprising: a specific instance of a quantum processor, the quantum processor comprising a plurality of qubits and a plurality of coupling devices, wherein each coupling device is operable to provide controllable communicative coupling between two of the plurality of qubits, the quantum processor having a background susceptibility error $\chi$, that is specific to the specific instance of the quantum processor; and at least one processor-based device communicatively coupled to the quantum processor; at least one non-transitory processor-readable medium that stores at least one of processor-executable instructions or data. The processor-executable instructions or data, when executed, may cause at least one processor to: receive a first submitted problem; modify the first submitted problem to compensate for a background susceptibility error $\chi$, of the specific instance of the quantum processor on which the first submitted problem will be run; produce a problem graph representation of the modified first submitted problem; embed the problem graph representation of the modified first submitted problem in a hardware graph of the quantum processor; and generate solutions to the first submitted problem via the quantum processor with the problem graph representation of the modified first submitted problem embedded therein. The computational annealing system may execute a portion or all of any of the described methods.

A method of operation in a computational system is described. The computational system may comprises both a quantum processor and at least one processor-based device communicatively coupled to one another, the quantum processor comprising a plurality of qubits and a plurality of coupling devices, wherein each coupling device is operable to provide controllable communicative coupling between two of the plurality of qubits. The method may be summarized as comprising: producing a problem graph representation of a first problem; identifying each of the qubits that will be operated as a problem qubit when generating solutions to a first problem; for each of at least a number of the qubits that will be operated as problem qubits, identifying a respective ancilla qubit to apply an external flux bias to the respective problem qubits; embedding the problem graph representation of the first problem into the problem qubits of the quantum processor; applying an external flux bias to each problem qubit to at least partially reduce an h/J ratio misbalance of the respective qubit; and generating solutions to the first problem via the quantum processor by evolving the quantum processor with the problem graph representation embedded therein.

The method may further comprise: identifying a problem type of a first problem; determining whether the identified problem type of the first problem is a problem type that is relatively sensitive to h/J misbalance error or is a problem type that is relatively insensitive to h/J misbalance error; and wherein the identifying each of the qubits that will be operated as a problem qubit when generating solutions to a first problem and the identifying a respective ancilla qubit to apply an external flux bias to the respective problem qubits is responsive to a determination that the problem type of the first problem is one that is relatively sensitive to h/J misbalance, employing existing hardware of the quantum processor to compensate for h/J misbalance when generating solutions to the first problem via the quantum processor.

The method may further comprise: in response to a determination that the problem type is one that is relatively insensitive to h/J misbalance error, employing the existing hardware to embed a problem graph of the first in a hardware graph of the quantum processor without using the existing hardware of the quantum processor to compensate for h/J misbalance error. Employing the existing hardware to embed a problem graph of the first in a hardware graph of the quantum processor without using the existing hardware of the quantum processor to compensate for h/J misbalance error may include embedding the problem graph of the first problem in the hardware graph of the quantum processor without any ancilla qubits to compensate for h/J misbalance error.

Determining whether the identified problem type of the first problem is a problem type that is relatively sensitive to h/J misbalance error or is a problem type that is relatively insensitive to h/J misbalance error may include determining whether the first problem is an optimization problem and hence is relatively sensitive to h/J misbalance error. Determining whether the identified problem type of the first problem is a problem type that is relatively sensitive h/J misbalance error or is a problem type that is relatively insensitive to h/J misbalance error may include determining whether the first problem is a machine learning problem and hence is relatively insensitive to h/J misbalance error. Determining whether the identified problem type of the first problem is a problem type that is relatively sensitive to h/J misbalance error or is a problem type that is relatively insensitive to h/J misbalance error may include querying at least one of a data schema or a piece of metadata, logically associated with the first problem via one or more stored relationships. Determining whether the identified problem type of the first problem is a problem type that is relatively sensitive to h/J misbalance error $\chi$ or is a problem type that is relatively insensitive to h/J misbalance error may include analyzing the first problem to determine a broad class of problems to which the first problem belongs.

The method may further comprise: identifying a problem type of a second problem; determining whether the identified problem type of the second problem is a problem type that is relatively sensitive to h/J misbalance error or is a problem type that is relatively insensitive to h/J misbalance error; and in response to a determination that the problem type of the second problem is a problem type that is relatively insensitive to h/J misbalance error, employing the existing hardware of the quantum processor to embed the a problem graph of the second problem without using the existing hardware to compensate for h/J misbalance error when generating solutions to the second problem via the quantum processor.

Employing the existing hardware of the quantum processor to embed the problem graph of the second problem without using the existing hardware to compensate for h/J misbalance error when generating solutions to the second problem via the quantum processor may include embedding the problem graph of the second in the hardware graph of the quantum processor without any ancilla qubits to compensate for h/J misbalance error. Employing the existing hardware of the quantum processor to embed the a problem graph of the second problem without using the existing hardware to compensate for h/J misbalance error when generating solutions to the second problem via the quantum processor may include embedding the problem graph of the second in the hardware graph of the quantum processor employing one or more of the qubits of the quantum processor that were used as ancilla qubits when generating solutions for the first problem as problem qubits when generating solutions for the second problem.

A computational annealing system may be summarized as comprising: a quantum processor, the quantum processor comprising a plurality of qubits and a plurality of coupling devices, wherein each coupling device is operable to provide controllable communicative coupling between two of the plurality of qubits; and at least one processor-based device communicatively coupled to the quantum processor; at least one non-transitory processor-readable medium that stores at least one of processor-executable instructions or data. The processor-executable instructions or data, when executed, may cause at least one processor to: produce a problem graph representation of a first problem; identify each of the qubits that will be operated as a problem qubit when generating solutions to a first problem; for each of at least a number of the qubits that will be operated as problem qubits, identify a respective ancilla qubit to apply an external flux bias to the respective problem qubits; embed the problem graph representation of the first problem into the problem qubits of the quantum processor; and generate solutions to the first problem via the quantum processor by evolving the quantum processor with the problem graph representation embedded therein. The computational annealing system may execute a portion or all of any of the described methods.

A method of operation in a computational system is described. The computational system may comprises both a quantum processor and at least one processor-based device communicatively coupled to one another, the quantum processor comprising a plurality of qubits and a plurality of coupling devices, wherein each coupling device is operable to provide controllable communicative coupling between two of the plurality of qubits. The method may be summarized as comprising: identifying each of the qubits that will be operated as a problem qubit when generating solutions to a first problem; identifying a plurality of qubits to be operated as ancilla qubits to encode a number of penalty terms to at least mitigate bit flip error in the qubits that will be operated as the problem qubits; producing a problem graph representation of the first problem with the ancilla qubits; embedding the problem graph representation of the first problem with the ancilla qubits in a hardware graph of the quantum processor; and generating solutions to the first problem via the quantum processor with the problem graph representation of the first problem with the ancilla qubits embedded therein.

Producing a problem graph representation of the first problem with the ancilla qubits may include producing a problem graph representation of the first problem that couples ancilla qubits to both the problem qubits and to other ones of the ancilla qubits to reinforce couplers that couple respective pairs of problem qubits together. Producing a problem graph representation of the first problem with the ancilla qubits may include producing a problem graph representation of the first problem that reinforces couplers between respective pairs of the problem qubits.

The method may further comprise: identifying a problem type of a first problem; determining whether the identified problem type of the first problem is a problem type that is relatively sensitive to bit flip error or is a problem type that is relatively insensitive to bit flip error; and wherein the identifying each of the qubits that will be operated as a problem qubit when generating solutions to a first problem and the identifying a respective ancilla qubit to apply an external flux bias to the respective problem qubits is responsive to a determination that the problem type of the first problem is one that is relatively sensitive to bit flip error, employing existing hardware of the quantum processor to compensate for bit flip error when generating solutions to the first problem via the quantum processor.

The method may further comprise: in response to a determination that the problem type is one that is relatively insensitive to bit flip error, employing the existing hardware to embed a problem graph of the first in a hardware graph of the quantum processor without using the existing hardware of the quantum processor to compensate for bit flip error. Employing the existing hardware to embed a problem graph of the first in a hardware graph of the quantum processor without using the existing hardware of the quantum processor to compensate for bit flip error may include embedding the problem graph of the first problem in the hardware graph of the quantum processor without any ancilla qubits to compensate for bit flip error. Determining whether the identified problem type of the first problem is a problem type that is relatively sensitive to bit flip error or is a problem type that is relatively insensitive to bit flip error may include querying at least one of a data schema or a piece of metadata, logically associated with the first problem via one or more stored relationships. Determining whether the identified problem type of the first problem is a problem type that is relatively sensitive to bit flip error or is a problem type that is relatively insensitive to bit flip error may include analyzing the first problem to determine a broad class of problems to which the first problem belongs.

The method may further comprise: identifying a problem type of a second problem; determining whether the identified problem type of the second problem is a problem type that is relatively sensitive to bit flip error or is a problem type that is relatively insensitive to bit flip error; and in response to a determination that the problem type of the second problem is a problem type that is relatively insensitive to bit flip error, employing the existing hardware of the quantum processor to embed the problem graph of the second problem without using the existing hardware to compensate for bit flip error when generating solutions to the second problem via the quantum processor. Employing the existing hardware of the quantum processor to embed the a problem graph of the second problem without using the existing hardware to compensate for bit flip error when generating solutions to the second problem via the quantum processor may include embedding the problem graph of the second in the hardware graph of the quantum processor without any ancilla qubits to compensate for bit flip error. Employing the existing hardware of the quantum processor to embed the a problem graph of the second problem without using the existing hardware to compensate for bit flip error when generating solutions to the second problem via the quantum processor may include embedding the problem graph of the second in the hardware graph of the quantum processor employing one or more of the qubits of the quantum processor that were used as ancilla qubits when generating solutions for the first problem as problem qubits when generating solutions for the second problem.

A computational annealing system may be summarized as comprising: a quantum processor, the quantum processor comprising a plurality of qubits and a plurality of coupling devices, wherein each coupling device is operable to provide controllable communicative coupling between two of the plurality of qubits; and at least one processor-based device communicatively coupled to the quantum processor; at least one non-transitory processor-readable medium that stores at least one of processor-executable instructions or data. The processor-executable instructions or data, when executed, may cause at least one processor to: identify each of the qubits that will be operated as a problem qubit when generating solutions to a first problem; identify a plurality of qubits to be operated as ancilla qubits to encode a number of penalty terms to at least mitigate bit flip error in the qubits that will be operated as the problem qubits; produce a problem graph representation of the first problem with the ancilla qubits; embed the problem graph representation of the first problem with the ancilla qubits in a hardware graph of the quantum processor; and generate solutions to the first problem via the quantum processor with the problem graph representation of the first problem with the ancilla qubits embedded therein. The computational annealing system may execute a portion or all of any of the described.

A method for mitigating bit flip errors in a quantum processor is described. The quantum processor may include a set of qubits, a set of couplers that communicatively couple pairs of qubits, a set of reinforcement couplers, and a set of ancilla qubits The method may be summarized as comprising: communicatively coupling a first qubit to a second qubit via a first coupler set to have a first coupling strength; communicatively coupling the second qubit to a first ancilla qubit via a first reinforcement coupler; communicatively coupling the first ancilla qubit to a second ancilla qubit via second reinforcement coupler; communicatively coupling the second ancilla qubit to the first qubit via a third reinforcement coupler; wherein each reinforcement coupler in the set of reinforcement couplers is set to have at a coupling strength that is at least as strong as the first coupling strength; and each ancilla qubit in the set of ancilla qubits encodes a respective penalty term from a penalty function.

The method may further comprise a third ancilla qubit encoding a penalty term, the third ancilla qubit interposed between the third reinforcement coupler and the first qubit, wherein the third ancilla qubit is communicatively coupled to the second ancilla qubit via the third reinforcement coupler; and the third ancilla qubit is further communicatively coupled to the first qubit via a fourth reinforcement coupler, the fourth reinforcement coupler set to have a coupling strength that is at least as strong as the first coupling strength. The method may further comprises a fourth ancilla qubit encoding a penalty term, the fourth ancilla qubit interposed between the fourth reinforcement coupler and the first qubit, wherein the fourth ancilla qubit is communicatively coupled to the third ancilla qubit via the fourth reinforcement coupler; and the fourth ancilla qubit is further communicatively coupled to the first qubit via a fifth reinforcement coupler, the fifth reinforcement coupler set to have a coupling strength that is at least as strong as the first coupling strength.

The method may further comprise a chain of additional ancilla qubits that each encode a penalty term, the chain of additional ancilla qubits interposed between the fifth reinforcement coupler and the first qubit, wherein the chain of additional ancilla qubits is communicatively coupled to the fourth ancilla qubit via a sixth the fifth reinforcement coupler; the chain of additional ancilla qubits is further communicatively coupled to the first qubit via a sixth reinforcement coupler, the sixth reinforcement coupler set to have a coupling strength that is at least as strong as the first coupling strength; and the chain of ancilla qubits includes additional reinforcement couplers that each couple a pair of ancilla qubits in the chain of ancilla qubits, the additional reinforcement couplers each having a coupling strength that is at least as strong as the first coupling strength.

A method of operation in a computational annealing device is described. The computational annealing device may comprise both a quantum processor and at least one processor-based device communicatively coupled to one another, the quantum processor comprising a plurality of qubits, a plurality of cavities, and a plurality of coupling devices, wherein each coupling device provides controllable communicative coupling between two of the plurality of cavities, and the each qubit provides a non-linear element to each cavity in the plurality of cavities. The method may be summarized as comprising: loading a plurality of photons into the plurality of cavities; tuning each qubit in the plurality of qubits into resonance with a respective cavity in the plurality of cavities; adjusting a coupling between cavities at the couplers; and reading out a total number of photons in each cavity.

The method may further comprise: receiving a number of parameters that define a loading process by one or more elements of the computational annealing device, the parameters including a photon number (i.e., defined number of photons to be loaded); iteratively executing a loop over the photon number: tuning the qubit to resonance with a respective cavity; holding the qubit tuned for a defined second period of time; updating a counter of the loop; determining whether at least one an exit condition has been satisfied. The method may further comprise: in response to the at least one exit condition being satisfied, exiting the loop; presenting the quantum processor with the defined number of photons loaded into the cavities of the quantum processor. The method may further comprise: in response to the at least one exit condition not being satisfied, continue executing the loop.

Reading out a total number of photons in each cavity may include: move a plurality of qubits off resonance with respective cavities; adjust or set a plurality of inter-cavity couplers to an ON state; and adjust or set a plurality of inter-cavity couplers to an OFF state. Reading out a total number of photons in each cavity may include: move a plurality of qubits off resonance with respective cavities; adding noise; adjust or set a plurality of inter-cavity couplers to an ON state; and adjust or set a plurality of inter-cavity couplers to an OFF state.

A computational annealing system may be summarized as comprising: a quantum processor, the quantum processor comprising a plurality of qubits and a plurality of coupling devices, wherein each coupling device is operable to provide controllable communicative coupling between two of the plurality of qubits; and at least one processor-based device communicatively coupled to the quantum processor; at least one non-transitory processor-readable medium that stores at least one of processor-executable instructions or data. The processor-executable instructions or data, when executed, may cause at least one processor to: load a plurality of photons into the plurality of cavities; tune each qubit in the plurality of qubits into resonance with a respective cavity in the plurality of cavities; adjust a coupling between cavities at the couplers; and read out a total number of photons in each cavity. The computational annealing system may execute all or a portion of any of the described methods.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

The patent or application file contains at least one drawing executed in color. Copies of this patent or patent application publication with color drawing(s) will be provided by the Office upon request and payment of the necessary fee.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims which follow, the word "comprise"

and variations thereof, such as, "comprises" and "comprising" are to be construed in an open, inclusive sense, that is as "including, but not limited to."

Reference throughout this specification to "one embodiment" "an embodiment", "another embodiment", "one example", "an example", or "another example" means that a particular referent feature, structure, or characteristic described in connection with the embodiment or example is included in at least one embodiment or example. Thus, the appearances of the phrases "in one embodiment", "in an embodiment", "another embodiment" or the like in various places throughout this specification are not necessarily all referring to the same embodiment or example. Furthermore, the particular features, structures, or characteristics may be combined in any suitable manner in one or more embodiments or examples.

It should be noted that, as used in this specification and the appended claims, the singular forms "a", "an", and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

The present systems, devices, articles, and methods relate to quantum processors comprising qubits, couplers, and optionally cavities. This disclosure includes designs, layouts, and architectures for quantum processors comprising qubits, couplers, and, or cavities, and techniques for operating the same.

Figure 1:
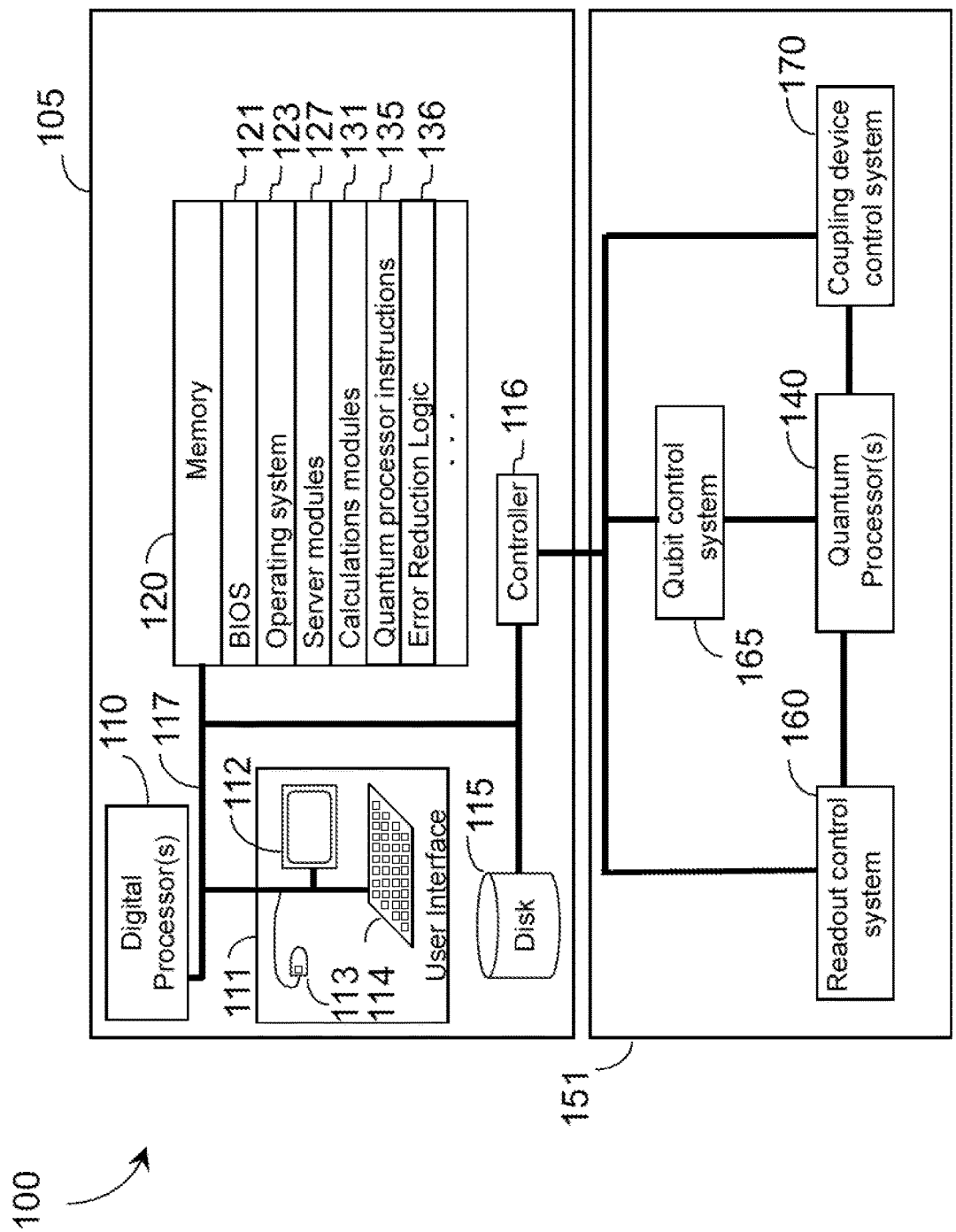
FIG. 1 is a schematic diagram illustrating an example hybrid computing system including a digital processor and a quantum processor, in accordance with the present systems, devices, and methods.

FIG. 1 is a schematic diagram illustrating a hybrid computing system 100 including a digital computer 102 coupled to an analog computer 104. The example digital computer 102 includes one or more digital processors 106 that may be used to perform classical digital processing tasks. Digital computer 102 may further include at least one system memory 108, and at least one system bus 110 coupling various system components, including system memory 108 to digital processor(s) 106. System memory 108 may store error correction instructions module 112.

The digital processor(s) 106 may be any logic processing unit or circuitry (e.g., integrated circuits), such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc., and/or combinations of the same.

In some implementations, analog computer 104 includes one or more quantum processors 114.

Digital computer 102 may include a user input/output subsystem 116. In some implementations, the user input/output subsystem includes one or more user input/output components such as a display 118, mouse 120, and/or keyboard 122.

System bus 110 can employ any known bus structures or architectures, including a memory bus with a memory controller, a peripheral bus, and a local bus. System memory 108 may include non-volatile memory, such as read-only memory ("ROM"), static random access memory ("SRAM"), Flash NAND; and volatile memory such as random access memory ("RAM") (not shown).

Digital computer 102 may also include other non-transitory computer- or processor-readable storage media or non-volatile memory 124. Non-volatile memory 124 may take a variety of forms, including: a hard disk drive for reading from and writing to a hard disk (e.g., magnetic disk), an optical disk drive for reading from and writing to removable optical disks, and/or a solid state drive (SSD) for reading from and writing to solid state media (e.g., NAND-based Flash memory). The optical disk can be a CD-ROM or DVD, while the magnetic disk can be a rigid spinning magnetic disk or a magnetic floppy disk or diskette. Non-volatile memory 124 may communicate with digital processor(s) via system bus 110 and may include appropriate interfaces or controllers 126 coupled to system bus 110. Non-volatile memory 124 may serve as long-term storage for processor- or computer-readable instructions, data structures, or other data (sometimes called program modules) for digital computer 102.

Although digital computer 102 has been described as employing hard disks, optical disks and/or solid state storage media, those skilled in the relevant art will appreciate that other types of nontransitory and non-volatile computer-readable media may be employed, such magnetic cassettes, flash memory cards, Flash, ROMs, smart cards, etc. Those skilled in the relevant art will appreciate that some computer architectures employ nontransitory volatile memory and nontransitory non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 108. For example, system memory 108 may store instruction for communicating with remote clients and scheduling use of resources including resources on the digital computer 102 and analog computer 104. Also for example, system memory 108 may store at least one of processor executable instructions or data that, when executed by at least one processor, causes the at least one processor to execute the various algorithms described elsewhere herein, including machine learning related algorithms.

In some implementations system memory 108 may store processor- or computer-readable calculation instructions and/or data to perform pre-processing, co-processing, and post-processing to analog computer 104. As described above, system memory 108 may store a VAE instructions module that includes processor- or computer-readable instructions to perform VAE. System memory 108 may store at set of analog computer interface instructions to interact with analog computer 104. When executed, the stored instructions and/or data cause the system to operate as a special purpose machine.

Analog computer 104 may include at least one analog processor such as quantum processor 114. Analog computer 104 can be provided in an isolated environment, for example, in an isolated environment that shields the internal elements of the quantum computer from heat, magnetic field, and other external noise (not shown). The isolated environment may include a refrigerator, for instance a dilution refrigerator, operable to cryogenically cool the analog processor, for example to temperature below approximately 1° Kelvin.

Adiabatic quantum computation utilizes minor embedding to solve problems on a quantum processor. A graph representing the problem must be mapped onto the hardware graph such that the vertices and edges of the problem graph correspond respectively to the qubits and couplers in a topological minor-embedding on the hardware graph.

Figure 2:
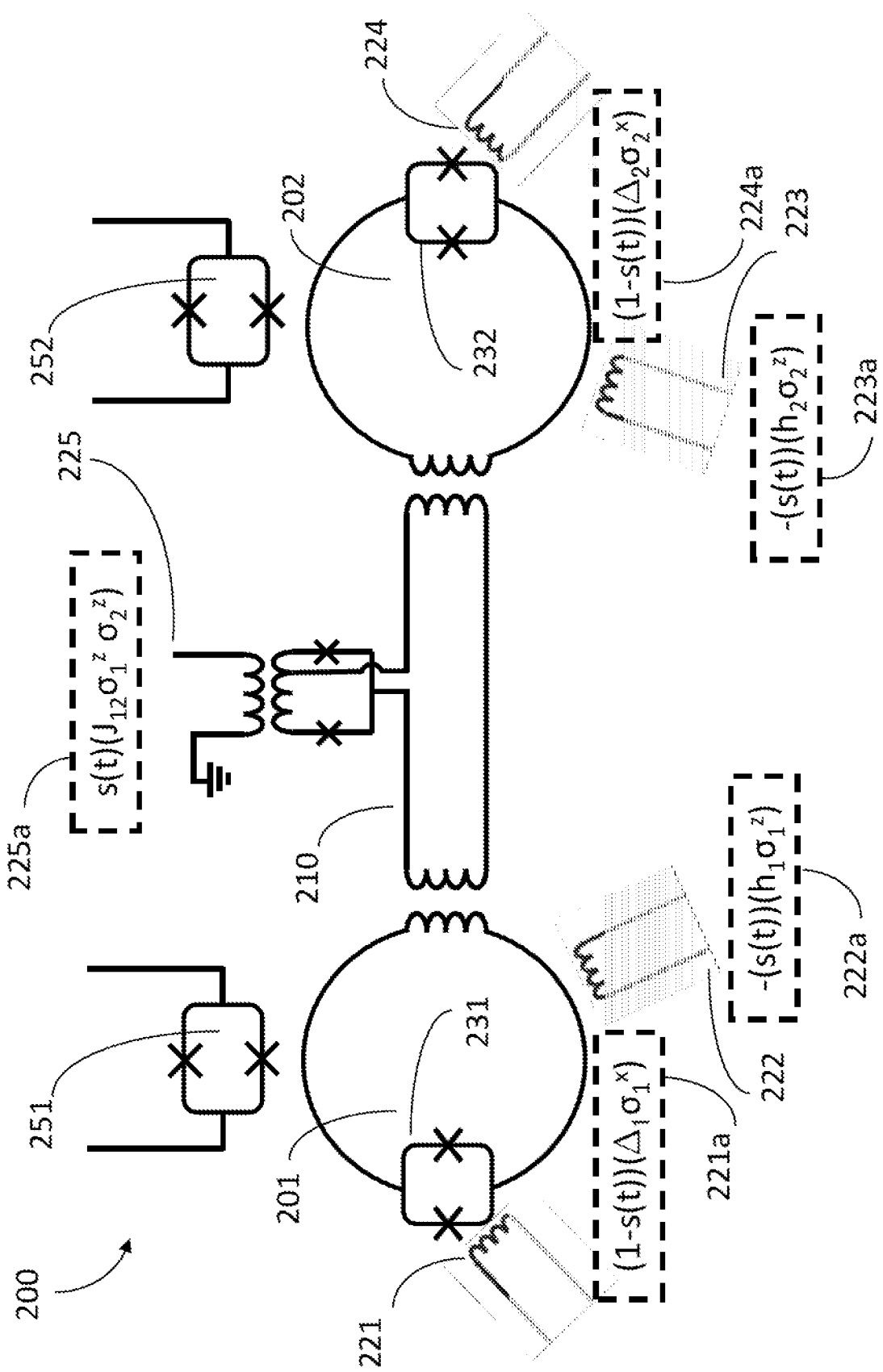
FIG. 2 is a schematic diagram illustrating a portion of an example superconducting quantum processor, in accordance with the present systems, devices, and methods.

FIG. 2 is a schematic diagram illustrating of a portion of an example superconducting quantum processor 200 designed for quantum annealing (and/or adiabatic quantum computing) components from which may be used to implement the present systems and devices. The portion of superconducting quantum processor 200 shown in FIG. 2 includes two superconducting qubits 201, and 202. Also shown is a tunable $\sigma_i^z \sigma_j^z$ coupling (diagonal coupling) via coupler 210 therebetween qubits 201 and 202 (i.e., providing 2-local interaction). While the portion of quantum processor 200 shown in FIG. 2 includes only two qubits 201, 202 and one coupler 210, those of skill in the art will appreciate that quantum processor 200 may include any number of qubits and any number of couplers coupling information therebetween.

The portion of quantum processor 200 shown in FIG. 2 may be implemented to physically realize quantum annealing and/or adiabatic quantum computing. Quantum processor 200 includes a plurality of interfaces 221-225 that are used to configure and control the state of quantum processor 200. Each of interfaces 221-225 may be realized by a respective inductive coupling structure, as illustrated, as part of a programming subsystem and/or an evolution subsystem. Such a programming subsystem and/or evolution subsystem may be separate from quantum processor 200, or it may be included locally (i.e., on-chip with quantum processor 200) as described in, for example, U.S. Pat. Nos. 7,876,248 and 8,035,540.

In the operation of quantum processor 200, interfaces 221 and 224 may each be used to couple a flux signal into a respective compound Josephson junction 231 and 232 of qubits 201 and 202, thereby realizing a tunable tunneling term (the $\Delta_i$ term) in the system Hamiltonian. This coupling provides the off-diagonal $\sigma^x$ terms of the Hamiltonian and these flux signals are examples of "delocalization signals".

In some implementations, the tunneling term is selected to make a first portion of the qubits on the quantum processor more classical relative a second portion of the qubits. For example, qubit 201 may be a hidden unit in a Boltzmann machine and have a smaller tunneling term relative to qubit 202.

Similarly, interfaces 222 and 223 may each be used to apply a flux signal into a respective qubit loop of qubits 201 and 202, thereby realizing the $h_i$ terms in the system Hamiltonian. This coupling provides the diagonal $\sigma^z$ terms in the system Hamiltonian. Furthermore, interface 225 may be used to couple a flux signal into coupler 210, thereby realizing the $J_{ij}$ term(s) in the system Hamiltonian. This coupling provides the diagonal $\sigma_i^z \sigma_j^z$ terms in the system Hamiltonian.

In FIG. 2, the contribution of each of interfaces 221-225 to the system Hamiltonian is indicated in boxes 221a-225a, respectively. As shown, in the example of FIG. 2, the boxes 221a-225a are elements of time-varying Hamiltonians for quantum annealing and/or adiabatic quantum computing.

Throughout this specification and the appended claims, the term "quantum processor" is used to generally describe a collection of physical qubits (e.g., qubits 201 and 202) and couplers (e.g., coupler 210). The physical qubits 201 and 202 and the coupler 210 are referred to as the "programmable elements" of the quantum processor 200 and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 222, 223, and 225) used to apply the programmable parameters (e.g., the $h_i$ and $J_{ij}$ terms) to the programmable elements of the quantum processor 200 and other associated control circuitry and/or instructions.

As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions. Similarly, in the context of a quantum processor, the term "evolution subsystem" generally includes the interfaces (e.g., "evolution interfaces" 221 and 224) used to evolve the programmable elements of the quantum processor 200 and other associated control circuitry and/or instructions. For example, the evolution subsystem may include annealing signal lines and their corresponding interfaces (221, 224) to the qubits (201, 202).

Quantum processor 200 also includes readout devices 251 and 252, where readout device 251 is associated with qubit 201 and readout device 252 is associated with qubit 202. In some embodiments, such as shown in FIG. 2, each of readout devices 251 and 252 includes a DC-SQUID inductively coupled to the corresponding qubit. In the context of quantum processor 200, the term "readout subsystem" is used to generally describe the readout devices 251, 252 used to read out the final states of the qubits (e.g., qubits 201 and 202) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication WO2012064974.

While FIG. 2 illustrates only two physical qubits 201, 202, one coupler 210, and two readout devices 251, 252, a quantum processor (e.g., processor 200) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Examples of superconducting qubits include superconducting flux qubits, superconducting charge qubits, and the like. In a superconducting flux qubit the Josephson energy dominates or is equal to the charging energy. In a charge qubit it is the reverse. Examples of flux qubits that may be used include rf-SQUIDs, which include a superconducting loop interrupted by one Josephson junction, persistent current qubits, which include a superconducting loop interrupted by three Josephson junctions, and the like. See, examples of rf-SQUID qubits in Bocko, et al., 1997, *IEEE Trans. on Appl. Supercond.* 7, 3638; Friedman, et al., 2000, *Nature* 406, 43; and Harris, et al., 2010, *Phys. Rev. B* 81, 134510; or persistent current qubits, Mooij et al., 1999, *Science* 285, 1036; and Orlando et al., 1999, *Phys. Rev. B* 60, 15398. In addition, hybrid charge-phase qubits, where the energies are equal, may also be used. Further details of superconducting qubits may be found in Makhlin, et al., 2001, *Rev. Mod. Phys.* 73, 357; Devoret et al., 2004, arXiv:cond-mat/0411174; Zagoskin and Blais, 2007, *Physics in Canada* 63, 215; Clarke and Wilhelm, 2008, *Nature* 453, 1031; Martinis, 2009, *Quantum Inf. Process.* 8, 81; and Devoret and Schoelkopf, 2013, *Science* 339, 1169. In some embodiments, the qubits and couplers are controlled by on chip circuitry. Examples of on-chip control circuitry can be found in U.S. Pat. Nos. 7,876,248; 7,843,209; 8,018,244; 8,098,179; 8,169,231; and 8,786,476. Further details and implementations of example quantum processors that may be used in conjunction with the present systems and devices are described in, for example, U.S. Pat. Nos. 7,533,068; 8,008,942; 8,195,596; 8,190,548; and 8,421,053.

The qubits and coupling devices in a quantum processor may be arranged according to an architecture into a topology such that a certain number of qubits may be laid out in a cell of qubits (hereinafter, "cell"), for example as described in International Patent Application PCT/US2016/057208, published as WO 2017/066695. A cell is a portion of a quantum processor topology comprising qubits and coupling devices. A cell or plurality of cells may be repeated or tiled (or otherwise directly communicatively coupled to one another) over an area of a quantum processor to produce a certain quantum processor topology.

In some implementations, each cell in a topology is identical to each other cell in the same topology. In other implementations, one or more cells in the topology comprises a different configuration of qubits and coupling devices than another cell in the same topology.

Each qubit in a cell may be included in only one cell such that no qubit may be included in multiple cells and no qubit may be shared among multiple cells. As used herein and in the claims, the term "cross," and variants thereof such as "crosses" or "crossing," includes "overlie," "underlie," and "overlap." Thus, "crosses" includes, for example, the situation where an outline of a portion of a first qubit on one layer or substrate is projected perpendicularly from that portion, layer, or substrate and the projection intersects an outline of a respective portion of a second qubit on another layer or substrate. A sub-topology may comprise of at least two qubits.

Background Susceptibility Error χ (CHI) Compensation Via Ancilla Qubits

Optimization problems are an example of a problem type that is suitable for being solved on a quantum processor that has the previously described topology. Many optimization problems can be defined in binary terms as an objective function or an Ising model. Ising models can be represented as an input graph or a problem graph wherein each vertex of the problem graph can correspond to a logical qubit. Logical qubits that correspond to vertices of the problem graph can be mapped or embedded into a set of qubits in the quantum processor. The problem graph can be embedded into the quantum processor by directly coupling qubits to form qubit chains, wherein each qubit chain acts as a single logical qubit. Directly coupling qubits can include ferromagnetically coupling qubits to form a qubit chain. Qubits that capture the system Hamiltonian throughout its evolution from initial to final state may be referred to as "problem qubits" throughout this specification.

Due to imperfections in qubits of a quantum processor, indirect communicative coupling and indirect applied biases can affect problem qubits that are not directly coupled. Such indirect interactions can lead to an effect characterized as "background susceptibility". Background susceptibility is a time-dependent error that can lead to loss of fidelity and sub-optimal solutions. The effect of background susceptibility is particularly apparent when qubits are neighboring or close in proximity (i.e., clustered). One method of addressing this problem is by programming additional or existing qubits, referred to as "ancilla qubits" throughout this specification, to compensate for background susceptibility. Ancilla qubits may also compensate for other types of error correction as described, for example, by U.S. Pat. No. 7,307,275. In the present methods and systems, logical qubits that correspond to vertices of the problem graph are generally not mapped to or embedded into ancilla qubits on the quantum processor.

Figure 3:
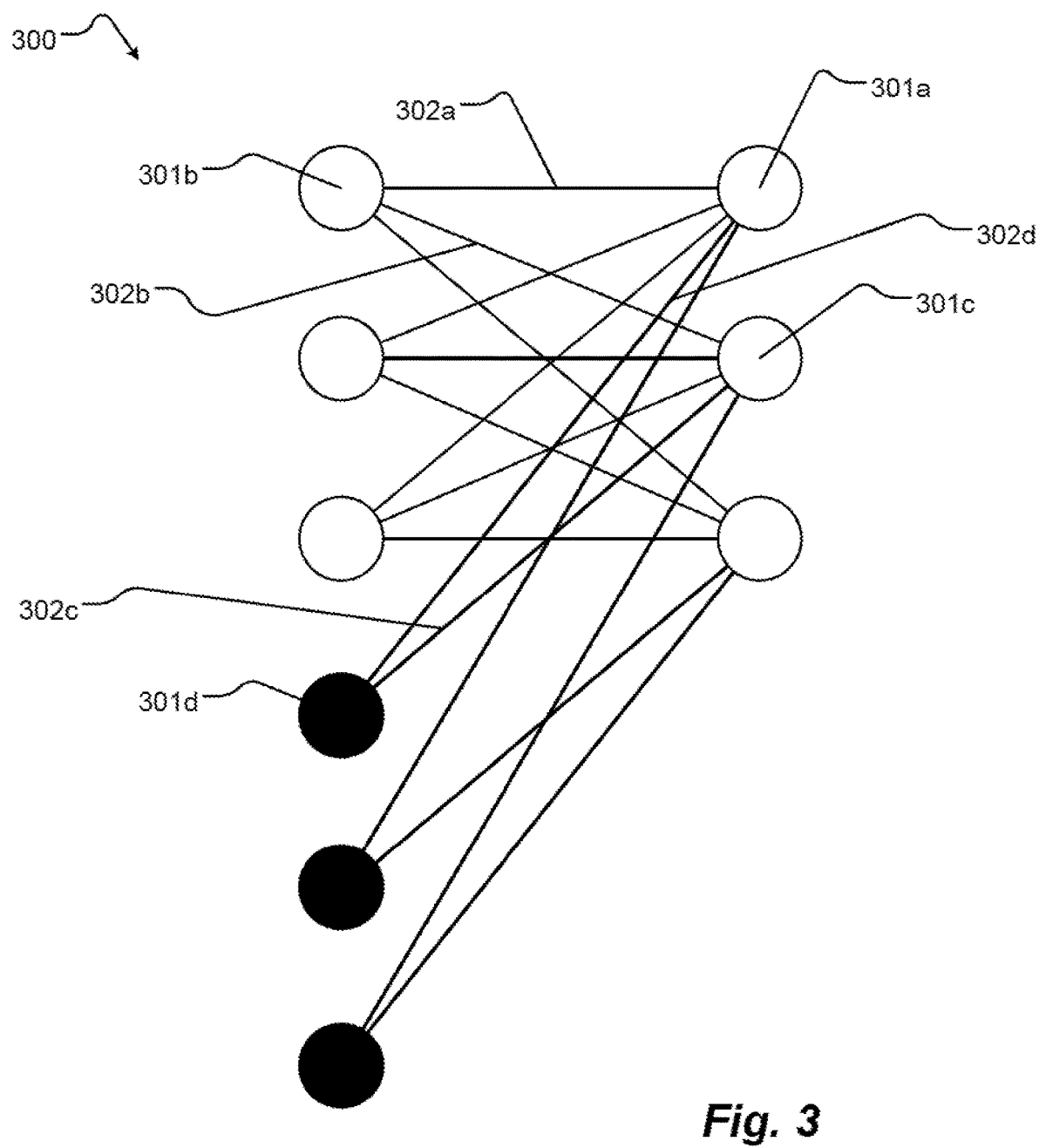
FIG. 3 is a schematic diagram illustrating an example coupling scheme of qubits communicatively coupled compensate for background susceptibility, in accordance with the present systems, devices, and methods.

FIG. 3 is a schematic diagram illustrating an example coupling scheme 300 of qubits communicatively coupled to compensate for background susceptibility. A first qubit 301*a*, a second qubit 301*b*, and a third qubit 301*c* (collectively 301) are problem qubits that capture the system Hamiltonian. A first bias can be applied to first qubit 301*a*, a second bias can be applied to second qubit 301*b*, and a third bias can be applied to third qubit 301*c*. First qubit 301*a* is directly communicatively coupled to second qubit 301*b* via a first coupler 302*a*. Second qubit 301*b* is directly communicatively coupled to third qubit 301*c* via a second coupler 302*b*. First qubit 301*a* and third qubit 301*c* can each have a bias applied by at least one control device such as a digital-to-analog converter. However, an applied bias on a qubit can affect a bias on a neighboring qubit. For example, a bias that is applied on first qubit 301*a* can affect a bias applied on second qubit 301*b*. Additionally, a qubit can induce a coupling to a next-nearest neighbor qubit via a neighboring qubit. For example, a first qubit 301*a* and third qubit 301*c* can be indirectly communicatively coupled via second qubit 301*b*, thereby causing background susceptibility. An ancilla qubit 301*d* can be used to compensate, at least in part, for background susceptibility on at least one of first qubit 301*a* and third qubit 301*c*. A fourth bias can be applied to ancilla qubit 301*d*. In some implementations, the fourth bias is equal to or close to zero (i.e., h=0). In some implementations, the fourth bias can be smaller than at least one of: the first bias, the second bias, and the third bias.

While only six problem qubits and three ancilla qubits from the topology are shown in FIG. 3, those skilled in the art will recognize that scheme 300 may include any number of problem qubits and the corresponding number of ancilla qubits. In some implementations, scheme 300 can include twelve problem qubits and twelve ancilla qubits.

In general, at least one ancilla qubit is necessary to compensate for background susceptibility caused by each indirect communicative coupling between two problem qubits. For example, to compensate for background susceptibility resulting from indirect communicative coupling between first qubit 301*a* and third qubit 301*c*, ancilla qubit 301*d* can be directly communicatively coupled to first qubit 301*a* via fourth coupler 302*d* and ancilla qubit 301*d* can also be directly communicatively coupled to third qubit 301*c* via third coupler 302*c*. Directly communicatively coupling ancilla qubit 301*d* and first qubit 301*a* via fourth coupler 302*d* can include setting fourth coupler 302*d* to have a coupling strength $K_{ij}$ that is based on the following formula:

$$K_{ij} = \chi \Sigma J_{im} J_{jm}$$

where χ is the background susceptibility, $J_{im}$ and $J_{jm}$ are the coupling strengths of couplers communicating with the ancilla qubit m and problem qubits i and j.

Directly communicatively coupling ancilla qubit 301*d* and third qubit 301*c* via third coupler 302*c* can include setting third coupler 302*c* to have a coupling strength that is strongly ferromagnetic. Third coupler 302*c* can strongly ferromagnetically couple third qubit 301*c* and ancilla qubit 301*d* to effectively chain third qubit 301*c* and ancilla qubit 301*d* to operate as a logical qubit. Those who are skilled in the art will appreciate that coupling strengths are interdependent due to qubit connectivity and thus may not be exactly as specified. In some implementations, qubits can be coupled anti-ferromagnetically via one or more couplers.

In scheme 300, couplers 302a to 302d are internal couplers that couple qubits within the same cell. In some implementations, couplers 302a to 302d can be external couplers that couple qubits between different cells. In scheme 300, communicative coupling between qubits 301 can be direct or indirect. In some implementations, qubits can be further coupled to other qubits in cells not shown in FIG. 3.

Figure 4:
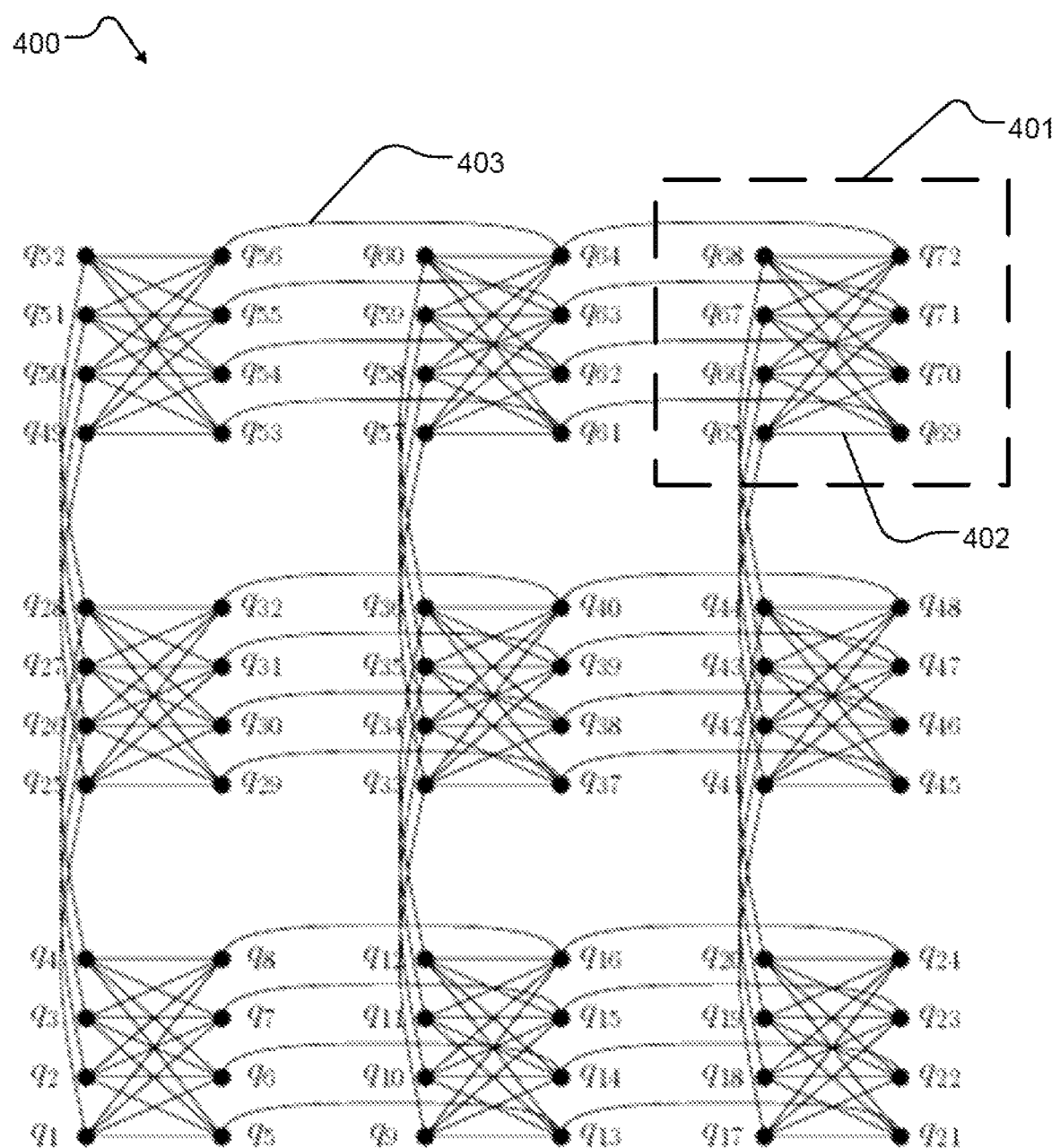
FIG. 4 is a schematic diagram illustrating an example logical topology of a quantum processor, in accordance with the present systems, devices, and methods.

FIG. 4 is a schematic diagram illustrating an example logical topology of a quantum processor. Topology 400 includes nine cells, each of which are identical or similar to cell 401. Cell 401 comprises eight qubits. Each qubit can be communicatively coupled to at least one other qubit within the cell via an internal coupler 402. Each qubit can be further communicatively coupled to at least one other qubit in another cell via an external coupler 403.

Figure 5:
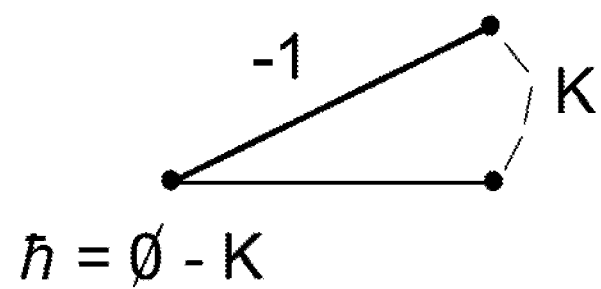
FIG. 5 is a schematic diagram illustrating an example error $\chi$ generated by a "ghost coupling" effect in a computation system, in accordance with the present systems, devices, and methods.

FIG. 5 is a schematic diagram illustrating an example background susceptibility error $\chi$. Due to the non-ideality of qubits (e.g., fabrication imperfections), qubits have an associated background susceptibility error denominated as Chi or $\chi$. The background susceptibility error $\chi$ may result in some qubits working somewhat like couplers. If a first qubit (e.g., $qubit_1$) is directly communicatively coupled to two other qubits (e.g., $qubit_4$ and $qubit_6$), the background susceptibility error $\chi$ can result in the other qubits ($qubit_4$, $qubit_6$) being indirectly communicatively coupled to one another via the first qubit ($qubit_1$) with strength of $K46=\chi*J14*J16$, as illustrated by dashed lines on FIG. 5, and denominated herein as "ghost coupling."

Ghost coupling is a problem when there is no explicit coupler between pairs of qubits to directly couple pairs of qubits and unintentionally indirectly communicative coupling occurs instead. Ghost coupling can be a common occurrence in certain processor topologies (e.g., a topology structured as tiled bipartite graphs). Ghost coupling can be difficult to cancel out using existing approaches.

Ghost coupling can limit precision and can be particularly concerning in situations where the quantum processor(s) will be used to solve optimization problems, since the combined effect of all these "ghost couplings" can make an apparent ground state of a problem far away (in Hamming distance) from the true ground state of the original problem of interest. Other types of applications, for example machine learning applications, may be less adversely affected by the lack of precision as long as the background susceptibility error is taken into account when training neural networks. In some implementations, problems that can be solved by embedding a complete bipartite graph may be less adversely affected since every vertex in a first set of vertices is coupled to every vertex in a second set of vertices so background susceptibility is inherently at least partially compensated for.

The present systems, devices, and methods describe an approach for at least partially canceling ghost couplings. In some implementations, the approach may be limited to canceling out ghost couplings within a cell and may be less effective at canceling out ghost couplings between qubits in different cells (i.e., where at least one external coupler between cells is involved). Rather than employ new types of dedicated or problem specific devices, the present systems and methods employ existing devices (e.g., qubits) as background susceptibility $\chi$-compensators.

Figure 6:
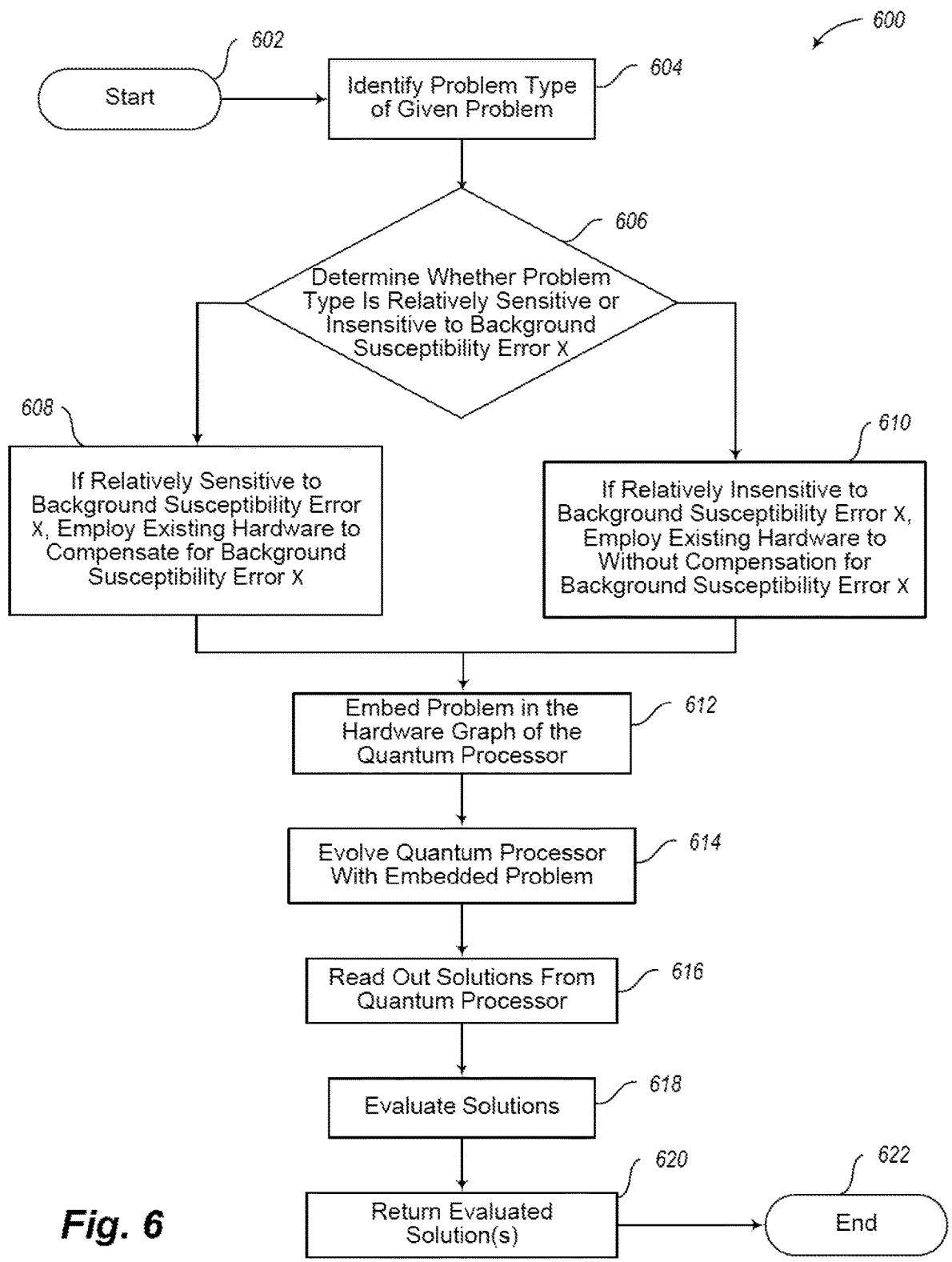
FIG. 6 is a flow diagram illustrating a method of operation to cancel out at least some "ghost couplings" in a computation system, in accordance with the present systems, devices, and methods.

FIG. 6 is a flow diagram illustrating a method 600 of operation to cancel out at least some ghost couplings in a computation system, in accordance with the present systems, devices, and methods.

Method 600 starts at 602, for example in response to a submission of a problem, a call from a routine, or other invocation.

At 604, one or more elements (e.g., digital processor(s), quantum processor(s)) of a system identifies a problem type of a given problem. The problems may be submitted with an assigned problem type, which can be stored in a data schema (e.g., relational database, lookup table, record) and, or as metadata which may, for example, be logically associated with the problem via one or more stored relationship. Alternatively, one or more elements may analyze the submitted problem to determine a broad class of problems to which the particular problem belongs.

At 606, one or more elements (e.g., user(s), digital processor(s), quantum processor(s)) of a system determines whether the problem type is one that is relatively sensitive to background susceptibility error $\chi$ (e.g., optimization problems) or is relatively insensitive to background susceptibility error $\chi$ (e.g., machine learning problems). Problem types may be classified or categorized as being either relatively sensitive or relatively insensitive to background susceptibility error $\chi$. Such information may, for example, be stored in a data schema (e.g., relational database, lookup table, record) and, or as metadata which may, for example, be logically associated with the problem via one or more stored relationship.

If the problem type is one that is relatively sensitive to background susceptibility error $\chi$ (e.g., optimization problems), then at 608, one or more elements (e.g., digital processor(s), quantum processor(s)) of a system employs the existing hardware (e.g., qubits) to compensate for background susceptibility error $\chi$ for those problems identified as being relative sensitive to background susceptibility error $\chi$. For example, the digital processor may cause portions of the quantum computer to embed the problem in the hardware graph of the quantum processor along with setting the values of one or more ancilla qubits accordingly to compensate for background susceptibility error $\chi$ without contributing to the solution (i.e., bias h=0). As part of doing such, the at least one element may determine which pairs of problem qubits need to be coupled by ancilla qubits, and recast the problem graph for embedding based on the same. In some implementations, one or more elements of a system can employ method 2400 of FIG. 24 to compensate for background susceptibility error $\chi$.

If the problem type is one that is relatively insensitive to background susceptibility error $\chi$ (e.g., machine learning problems), at 610, one or more elements (e.g., digital processor(s), quantum processor(s)) of a system employs the existing hardware (e.g., qubits) to embed the problem for those problems identified as being relatively insensitive to background susceptibility error $\chi$ without using the existing hardware to compensate for background susceptibility error $\chi$. For example, the digital processor may omit recasting the problem graph to cause portions of the quantum computer to embed the problem in the hardware graph of the quantum processor with no ancilla qubits and no compensation for background susceptibility error $\chi$. Thus, all of the problem qubits contribute to the solution (i.e., bias h≠0). For example, the digital processor may cause portions of the quantum computer to embed the problem in the hardware graph of the quantum processor, possibly employing qubits as problem qubits that might otherwise have been employed as ancilla qubits. As part of doing such, the at least one element may embed the problem graph into the hardware graph without any use of ancilla qubits in such a way to compensate for background susceptibility error without contributing to the solution.

Thus, some qubits may be used as problem qubits in one or more runs for a first type of problem, the same qubits used as ancilla qubits in one or more runs of a second type of problem.

At 612, one or more elements (e.g., digital processor(s), quantum processor(s)) of a system embeds the problem graph, whether re-casted or not, in the hardware graph of the quantum processor. Embedding includes applying signals to the physical qubits and physical couplers, for example via various hardware interfaces (e.g., inductive interfaces).

At 614, one or more elements (e.g., digital processor(s), quantum processor(s)) of a system evolves the quantum processor with the embedded problem or otherwise produces solutions to the problem either with or without the qubits acting as background susceptibility error $\chi$-compensators. Evolution is explained elsewhere herein and in the various patents and patent applications incorporated by reference herein.

At 616, one or more elements (e.g., digital processor(s), quantum processor(s)) of a system reads out solutions from the quantum processor. For example, one or more readout devices (e.g., SQUIDS) may read out the state of the qubits. Readout is explained elsewhere herein and in the various patents and patent applications incorporated by reference herein.

At 618, one or more elements (e.g., digital processor(s), quantum processor(s)) of a system evaluates the solutions. Solution evaluation is explained in the various patents and patent applications incorporated by reference herein.

At 620, one or more elements (e.g., digital processor(s), quantum processor(s)) of a system returns the evaluated solution(s). Solution return is explained in the various patents and patent applications incorporated by reference herein.

The method 600 terminates at 622. Alternatively, the method 600 may repeat for one or more iterations. In some implementations, the method 600 may be executed in parallel on a plurality of instances of a physical machine or physical processor or a plurality of instances of a virtual machine or virtual processor.

Thus, while using the existing multi-use hardware to compensate for background susceptibility error incurs a reduction by a factor of 2 in qubit count and connectivity, that only occurs when attempting to solve problems which are sensitive to the background susceptibility error (e.g., optimization type problems), but the same hardware can advantageously be used with full energy scales and qubit count when attempting to solve problems that are insensitive to the background susceptibility error (e.g., machine learning type problems).

Figure 7A:
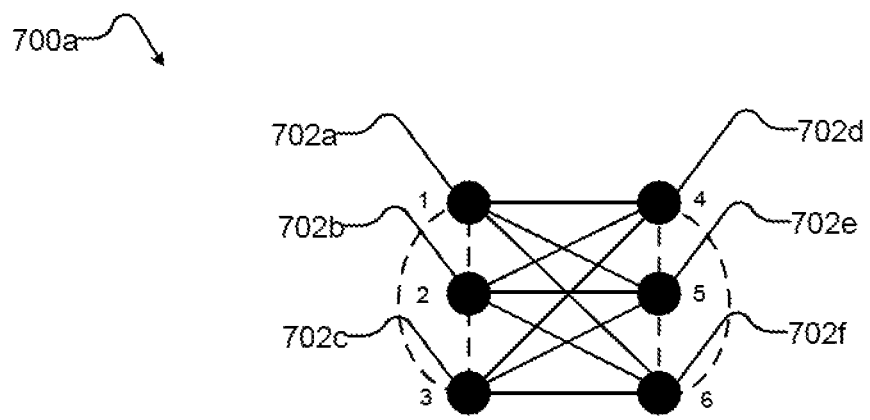
FIG. 7A is a schematic diagram illustrating an example coupling scheme for a problem or sub-problem posed on a K3,3 unit tile, in accordance with the present systems, devices, and methods.
Figure 7B:
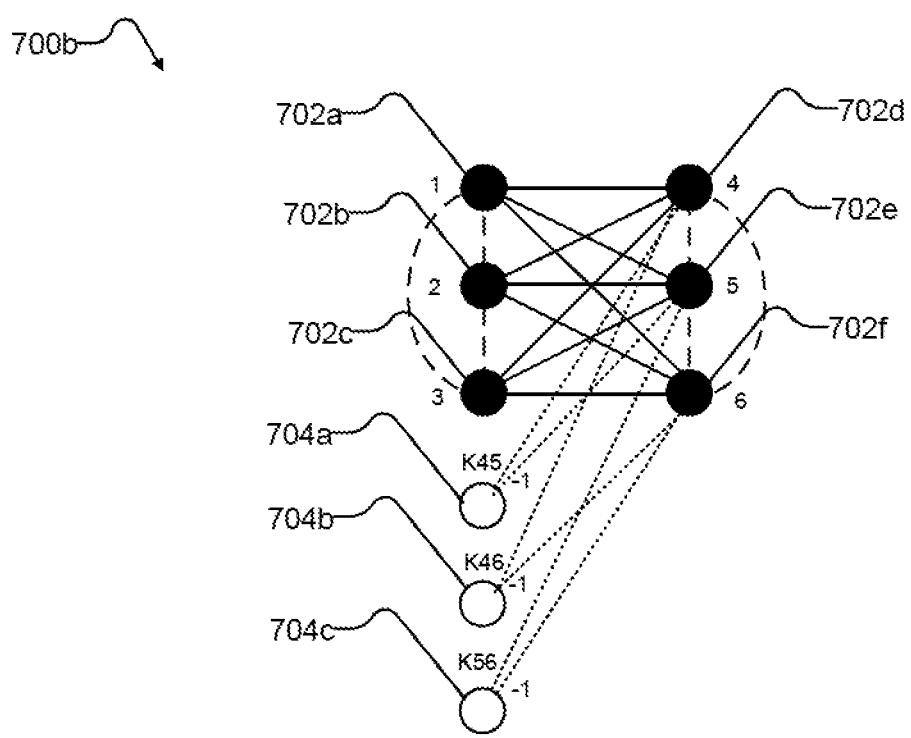
FIG. 7B is a schematic diagram illustrating an example coupling scheme for a problem or sub-problem posed on a K3,3 unit tile including three additional ancilla qubits to compensate for ghost couplings, in accordance with the present systems, devices, and methods.

FIGS. 7A and 7B illustrate the use of qubits in existing hardware, denominated as ancilla qubits, to compensate for at least some background susceptibility error $\chi$.

FIG. 7A is a schematic diagram illustrating an example coupling scheme 700a for problem or sub-problem posed on a K3,3 unit tile 700a (e.g., a cell comprising three vertical qubits and three horizontal qubits). Unit tile 700a includes a set of problem qubits including a first problem qubit 702a, a second problem qubit 702b, a third problem qubit 702c, a fourth problem qubit 702d, a fifth problem qubit 702e, and a sixth problem qubit 702f (individually and collectively 702). Problem qubits are qubits that are operable to encode at least a portion of a problem submitted to a quantum processor. Problem qubits 702a, 702b, and 702c can be included in a first set of problem qubits. Problem qubits 702d, 702e, 702f can be included in a second set of problem qubits. Broken lines represent indirect couplings (also referred to herein as ghost couplings) between problem qubits of a respective set. A ghost coupling strength of a respective ghost coupling $K_{ij}$ of qubit i to qubit j (e.g., a first problem qubit to a problem second qubit) can be approximated by $$K_{ij} = \chi \Sigma J_{im} J_{jm}$$

where $\chi$ is background susceptibility error, $J_{im}$ is a coupling strength of a coupling of problem qubit i to problem qubit m, and $J_{jm}$ is a coupling strength of a coupling of problem qubit j to problem qubit m, where m is an integer.

FIG. 7B is a schematic diagram illustrating an example coupling scheme 700b for problem or sub-problem posed on a K6,6 unit tile including a set of ancilla qubits. Scheme 700b includes a first ancilla qubit 704a, a second ancilla qubit 704b, and a third ancilla qubit 704c (collectively and individually 704). Ancilla qubits 704 can indirectly affect at least a portion of a problem submitted to a quantum processor by at least partially compensating for ghost couplings. Ancilla qubits 704 may not necessarily encode a problem submitted to quantum processor.

Ancilla qubits 704 are each coupled to at least one problem qubit 702 to compensate for ghost couplings. Ancilla qubits 704a, 704b, 704c are coupled to problem qubits 702d, 702e, 702f to compensate for ghost couplings between problem qubits 702d, 702e, 702f.

Fourth problem qubit 702d can be indirectly coupled to fifth problem qubit 702e with a ghost coupling strength of K45. To at least partially compensate the indirect coupling, first ancilla qubit 704a is directly coupled to fourth problem qubit 702d with a coupling strength of K45 and further directly coupled to fifth problem qubit 702e with a coupling strength of −1. Thus, first ancilla qubit 704a at least partially compensates a ghost coupling between fourth problem qubit 702d and fifth problem qubit 702e. In one implementation, first ancilla qubit effectively cancels out the indirect coupling of fourth problem qubit 702d to fifth problem qubit 702e. Ancilla qubits 704 can have bias h=0 applied to them. In such cases, ancilla qubits may not change ground state of the problem as submitted to the quantum processor, and final states of ancilla qubits 704 can be ignored.

Second ancilla qubit 704b at least partially compensates a respective ghost coupling between fourth problem qubit 702d and sixth problem qubit 702f in a similar way. Third ancilla qubit 704c at least partially compensates a respective ghost coupling between fifth problem qubit 702e and sixth problem qubit 702f in a similar way.

A second set of ancilla qubits comprising three ancilla qubits (not illustrated) can at least partially compensate ghost couplings between the second set of problem qubits comprising problem qubits 702a, 702b, 702c.

Scheme 700b is an implementation on a K6,6 unit tile (e.g., six horizontal qubits and six vertical qubits) to compensate for problem qubits 702 on a K3,3 tile (e.g., scheme 700a in FIG. 7A) without intra-tile background susceptibility $\chi$ terms.

Figure 7C:
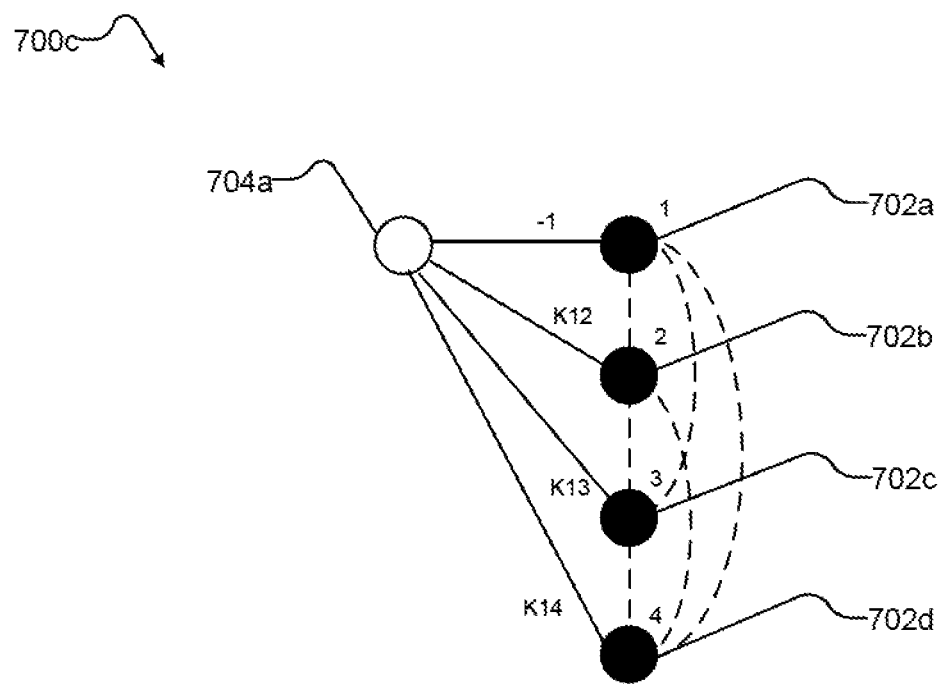
FIG. 7C is a schematic diagram illustrating an example coupling scheme for a larger unit tile including an ancilla qubit compensating for ghost couplings between problem qubits, in accordance with the present systems, devices, and methods.

FIG. 7C is a schematic diagram illustrating an example coupling scheme 700c for a larger unit tile including an ancilla qubit 704a compensating for ghost couplings between problem qubits 702. Note that FIG. 7C illustrates only a portion of problem qubits 702 and ancilla qubits 704 to avoid drawing clutter.

Coupling scheme 700c can include quadratically more ghost couplings (i.e., N(N−1)12 for KN,N unit tile where N is the number of vertical qubits or horizontal qubits), in reference to coupling scheme 700b of FIG. 7B. In one implementation, each ghost coupling can be compensated for by a one coupling of an ancilla qubit to a first problem qubit and a second coupling of the ancilla qubit to a second problem qubit. Thus, a K2N,2N cell of physical qubits can comprise a KN,N cell of ancilla qubits that compensate for ghost coupling in a KN,N cell of problem qubits. Any additional ghost couplings or indirect communicative couplings resulting from ancilla qubits should be included when calculating Kij (e.g., when compensating for K12 and K13 add an additional K23 term).

Programmatic Background Susceptibility Error χ (CHI) Compensation

Background susceptibility results from communication between qubits that are not intentionally or directly communicatively coupled. Background susceptibility is particularly significant in cluster problems where problem qubits (i.e., qubits where are programmed to represent nodes of graph of the problem) are in close proximity of one another. A software-based technique to reduce or at least partially compensate for background susceptibility error (Chi) χ is described immediately below. The value of background susceptibility error is typically processor dependent (e.g., chip-dependent, dependent on the individual instance of the processor) and known by the user before the problem is run or evolved on the quantum processor. Hence, the present systems and methods describe a software-based technique that may, in some implementations, be characterized as a pre-processing technique, in that the software-based technique is implemented before a respective iteration of the problem is run or evolved on the specific instance of the quantum processor.

The problem submitted to the quantum processor is modified to compensate for the background susceptibility error χ, for example a background susceptibility error χ of the specific instance of the quantum processor on which the problem will be run or evolved. The compensation is made such that the solution (e.g., optimal solution or close to optimal) will be one with the lowest background susceptibility error χ possible. A chosen nominal Hamiltonian has terms that can be controlled. These terms may be specified in a vector, for instance a vector denoted by θ.

To apply the adjustment to compensate for background susceptibility error χ, a first function is applied to the chosen nominal Hamiltonian or vector θ to obtain the putative Hamiltonian. A second function (e.g., a native-to-logical conversion) is applied to the putative Hamiltonian to obtain the logical putative Hamiltonian. The chosen nominal Hamiltonian will ideally minimize the difference between the logical target Hamiltonian and the logical putative Hamiltonian. This results in a parameter estimation problem where the parameter to be optimized, which is the vector θ, already contains the background susceptibility error χ compensated Hamiltonian.

Define vectors N, P, L, and T, where
N is the nominal Hamiltonian
P is the putative Hamiltonian
L is the logical putative Hamiltonian
T is the (logical) target Hamiltonian,
and function f which applies the χ adjustment, i.e., $f(N)=P$. L is obtained from P by summing native Hamiltonian terms according to known chains/clusters; and the function g is defined as this native-to-logical conversion such that $g(P)=L$.

A value of N that minimizes $\|T-L\|_2^2$ is chosen. Doing so leaves the best match possible in terms of the putative logical Hamiltonian versus the target logical Hamiltonian, which is particularly significant when solving embedded problems on the D-Wave quantum processor hardware.

Using θ to denote the vector of terms of N which are controllable, i.e., the fields and couplings, and modifying notation so that $f(\theta)=P$, this can be restated as:

$$\arg\min_\theta \|T-L\|_2^2 = \arg\min_\theta \|T-g(P)\|_2^2 = \arg\min_\theta \|T-g(f(\theta))\|_2^2$$

This is now a straightforward parameter estimation problem because T and the functions f and g are known. The parameter estimation problem can be solved using standard techniques.

In one implementation, unconstrained nonlinear optimization can be used to solve the parameter estimation problem which includes finding at least one optimal or close to optimal value of θ. An example of a suitable technique includes the L-BFGS algorithm. To perform the optimization, both the Jacobian (i.e., the gradient) and Hessian (essentially the second derivative) of the cost function ($\|T-L\|_2^2$) with regard to the input parameters (fields and couplings we can use in N) are derived. Since the cost function is a multivariate polynomial, the Jacobian and Hessian are derived analytically. The Jacobian and Hessian functions are provided to the optimization algorithm (e.g., L-BFGS), which returns an optimal or near-optimal parameter vector θ, which contains the χ-compensated Hamiltonian.

A pseudo-code representation of an algorithm form performing the above is presented immediately below.

---
Algorithm 1: χ (Chi) compensation for a given Hamiltonian (h, J) with given chains and a given level of chi.

---
Input: h, J, chains, chi
define f which applies chi to θ to obtain P;
define g which obtains L from P based on chains;
calculate T based on h, J, and chains;
define cost(θ) = $\|T - g(f(\theta))\|_2^2$;
define jacobian(θ) = $\nabla cost_\theta$;
define hessian(θ) = $\nabla^2 cost_\theta$;
initialize $\theta_0$ from the starting point of h and J;
optimize $\theta_{opt}$ := LBFGS($\theta_0$, cost, jacobian, hessian);
extract h' and J' from $\theta_{opt}$;
Output: h', J'

---

Software-Based Background Susceptibility Error χ (CHI) Compensation for Qubit Chains Another software-based technique to reduce or at least partially compensate for background susceptibility error (Chi) χ is described immediately below, which is particularly suitable for situations where chains of strongly coupled qubits are employed. In particular, this approach or technique employs "pre-processing" (i.e., processing the problem before a respective iteration of the problem is run or evolved on the instance of the quantum processor). In particular, the present systems and methods compensate for background susceptibility error χ resulting from chain edge to non-chain edge interactions in problems where applied biases to qubits are equal to or close to zero, i.e. h=0. Qubits within chains are strongly ferromagnetically coupled (e.g., coupling strength J can have a negative value in the context of a quantum processor). As previously noted, the value of background susceptibility error χ is chip-dependent, and typically known (e.g., provided by the user/client software/ etc.) before a given iteration of a problem is run or evolved. In this approach, the input to the quantum processor is modified to compensate for the background susceptibility error $\chi$, for example a background susceptibility error $\chi$ of the specific instance of the quantum processor on which the problem will be run or evolved. The modification is implemented by scaling each coupler between different chains with a background susceptibility error $\chi$ compensation factor.

To compensate for background susceptibility error $\chi$, consider a function f(h,J,chi) that adds background susceptibility error $\chi\_$ terms to the Hamiltonian (h,J). The goal, given background susceptibility error and a nominal Hamiltonian (h,J), is to find a hardware input (h_hw,J_hw) so that f(h_hw,J_hw, $\chi$) is close to (h,J). In the case of chain-embedded problems, the hardware input is considered close to the Hamiltonian if the states of (h,J) without broken chains have the same energy in f(h_hw,J_hw, $\chi$) as those states have in (h,J). This approach achieves this through a first-order compensation. The first-order compensation can be refined using gradient descent or other convex optimization tools.

Figure 8:
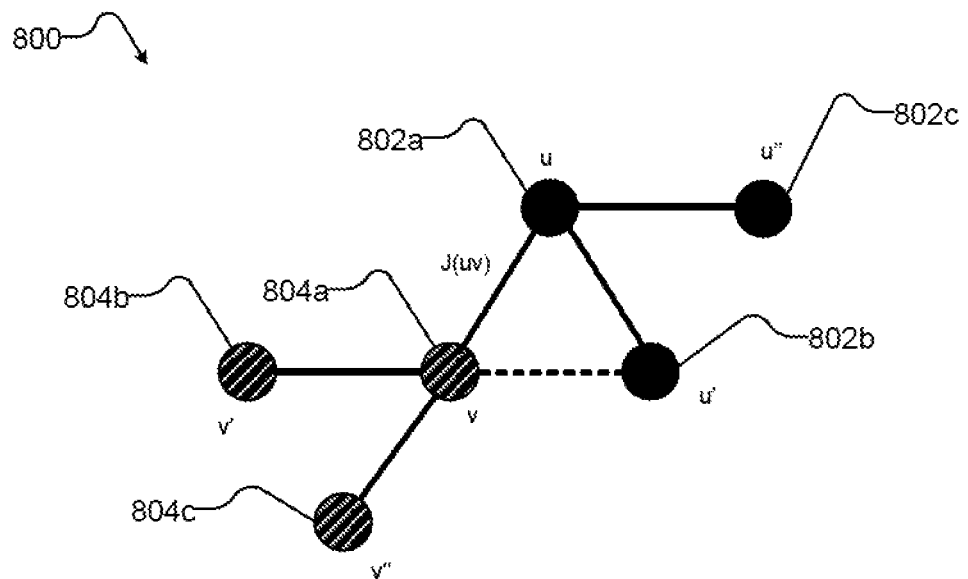
FIG. 8 is a schematic diagram illustrating an example of ghost coupling between qubit u' and v, each with two in-chain neighbors, in accordance with the present systems, devices, and methods.

FIG. 8 is a schematic diagram illustrating an example coupling scheme 800 including ghost coupling between qubits that each belong to different chains, each with two in-chain neighbors, in accordance with the present systems, devices, and methods. Scheme 800 includes a first qubit chain, denominated herein as the "u-chain", comprising a first u-chain qubit 802a (qubit u), a second u-chain qubit 802b (qubit u'), and a third u-chain qubit 802c (qubit u"). Scheme 800 further includes a second qubit chain, denominated herein as the "v-chain", comprising a first v-chain qubit 804a (qubit v), a second v-chain qubit 804b (qubit v'), and a third v-chain qubit 804c (qubit v"). First u-chain qubit 802a is directly coupled to first v-chain qubit 804a with a coupling strength of J(uv). First u-chain qubit 802a and first v-chain qubit 804a each have two in-chain neighboring qubits. Coupling scheme 800 can include a ghost coupling (illustrated by the dash line) between second u-chain qubit 802b and first v-chain qubit 804a. In one implementation, u-chain qubits 802 and v-chain qubits 804 each have an applied bias h equal to zero.

Figure 9:
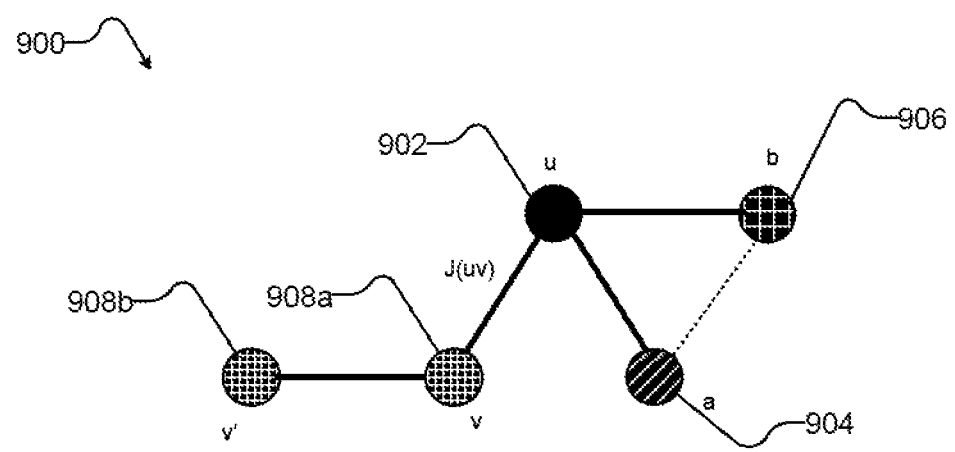
FIG. 9 is a schematic diagram illustrating an example coupling scheme including a minor ghost coupling, in accordance with the present systems, devices, and methods.

FIG. 9 is a schematic diagram illustrating an example coupling scheme 900 including a minor ghost coupling, in accordance with the present systems, methods, and devices.

Scheme 900 includes a first qubit 902 (qubit u), a second qubit 904 (qubit a), a third qubit 906 (qubit b), and a qubit chain comprising a first v-chain qubit 908a and a second v-chain qubit 908b. First qubit 902, second qubit 904, and third qubit 906 are not included in a qubit chain. First qubit 902 is directly coupled to second qubit 904, third qubit 906, and first v-chain qubit 908a. A minor ghost coupling can exist between second qubit 904 and third qubit 906. In some implementations, first qubit 902, second qubit 904, third qubit 906, and v-chain qubits 908 can each have an applied bias h equal to zero. In such cases, the minor ghost coupling between second qubit 904 (qubit a) and third qubit 906 (qubit b) can be ignored.

Referring to scheme 800 in FIG. 8 and scheme 900 in FIG. 9 together, solving a problem for which all qubit biases are equal to or close to zero (h=0) can be greatly simplified by ignoring: i) ghost couplings between two qubits in the same chain, since these ghost couplings reinforce the chain, and ii) ghost couplings arising from two incident couplings for qubits that do not belong to chains. Typically, these ghost couplings will be very small compared to the ghost couplings that are of concern. The nominal coupling J"(uv) values for each non-chain coupler can be determined as follows:

Ghost coupling between second u-chain qubit 802b (qubit u') and first v-chain qubit 804a (qubit v) can be equal to the coupling strength between First u-chain qubit 802a (qubit u) and first v-chain qubit 804a (qubit v) scaled by background susceptibility $\chi$. First u-chain qubit 802a (qubit u) and second u-chain qubit 802b (qubit u') can take the same spin (e.g., −1 or +1) since they are in the same chain. Therefore, the ghost coupling $J_{ghost,u'v}$ between second u-chain qubit 802b (qubit u') and first v-chain qubit 804a (qubit v) includes the coupling between first u-chain qubit 802a (qubit u) and first v-chain qubit 804a (qubit v) and background susceptibility effect $\chi$ as follows:

$$J_{ghost,u'v} = -J(uv)\chi$$

Effective ghost coupling $J_{eghost,uv}$ accounts for ghost coupling between in-chain neighbours and is a function of the number of in-chain neighbors of qubit$_u$ $d_c(u)$ and the number of in-chain neighbors of qubit$_v$ $d_c(v)$ as follows:

$$J_{eghost,uv} = J_{ghost,uv}[d_c(u) + d_c(v)]$$
$$= -J(uv)\chi[d_c(u) + d_c(v)]$$

The effective coupling or effective direct coupling J'(uv) between first u-chain qubit 802a (qubit u) and first v-chain qubit 804a (qubit v) thus includes the effective ghost coupling $J_{eghost,uv}$ and coupling (uv). Background susceptibility effect $\chi$ can be converted into a scalable compensation factor $F_{comp,uv}$ that compensates a coupling between first u-chain qubit 802a (qubit u) and first v-chain qubit 804a (qubit v) as follows:

$$J'(uv) = J(uv) + J_{eghost,uv}$$
$$= J(uv) - J(uv)\chi[d_c(u) + d_c(v)]$$
$$= J(uv)(1 - \chi[d_c(u) + d_c(v)])$$
$$= J(uv)F_{comp,uv}$$

where $F_{comp,uv} = 1 - \chi[d_c(u) + d_c(v)]$.

The nominal coupling between first u-chain qubit 802a (qubit u) and first v-chain qubit 804a (qubit v) that is sent to a quantum processor can be calculated as:

$$J''(uv) = \frac{b}{F_{comp,uv}} = \frac{J(uv)}{F_{comp,uv}}$$

Thus, background susceptibility is compensated for in the nominal coupling in the aforementioned software-based approach for reducing the effect of ghost couplings between qubits in different chains when applied biases are equal to or close to zero (i.e., h=0).

Figure 10:
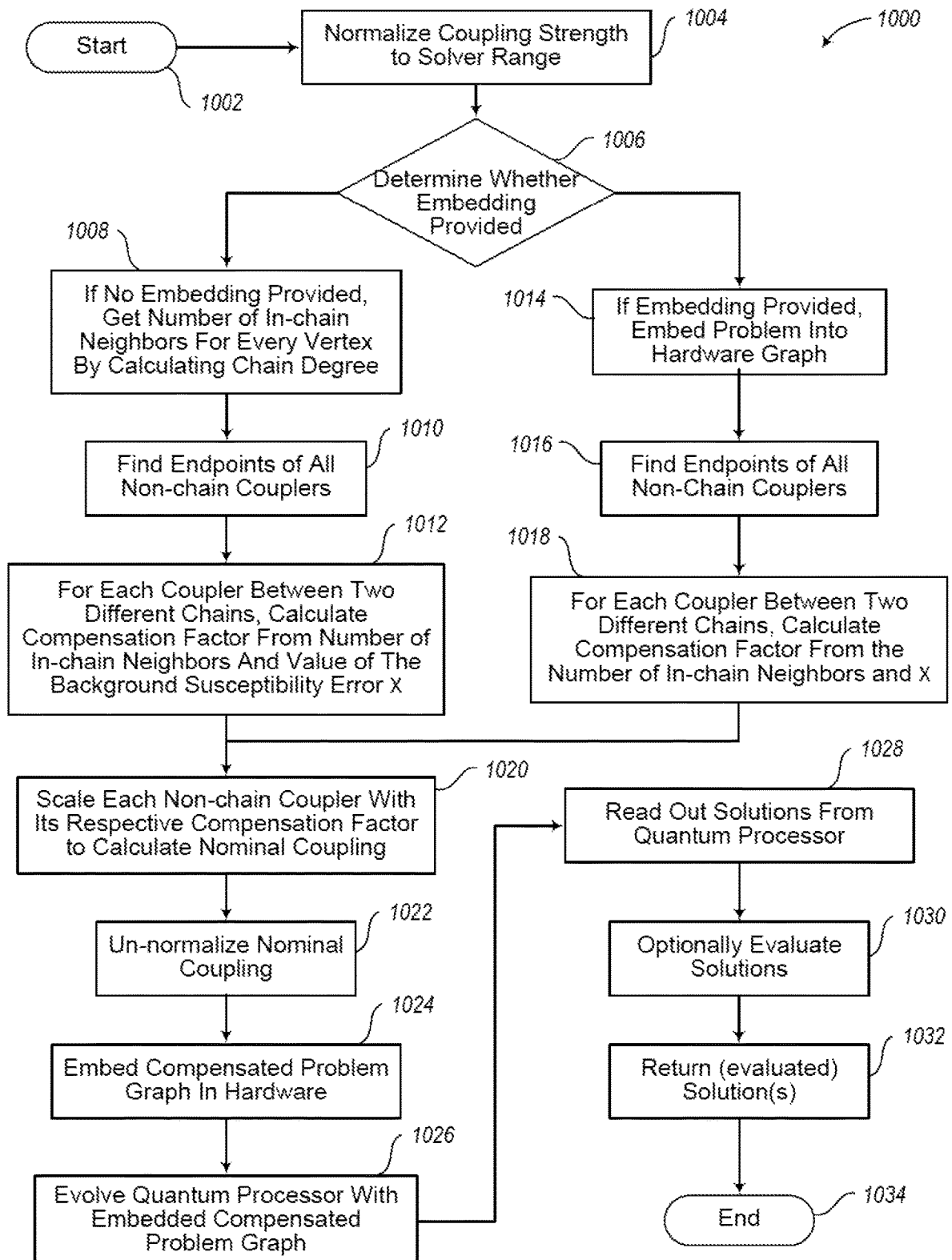
FIG. 10 is a flow diagram illustrating a method of operation in a computational system to reduce or eliminate the effect of ghost coupling, in accordance with the present systems, devices, and methods.

FIG. 10 is a flow diagram illustrating a method 1000 of operation of a coupling scheme to reduce or eliminate the effect of ghost coupling as illustrated in FIG. 8 and FIG. 9, in accordance with the present systems, devices, and methods.

The method 1000 starts at 1002, for example in response to a submission of a problem, a call from a routine, or other invocation.

At 1004, one or more elements (e.g., digital processor(s), quantum processor(s)) of a system normalize a coupling strength to a solver range by dividing by a maximum coupling strength.

At 1006, one or more elements (e.g., digital processor(s), quantum processor(s)) of the system determines whether an embedding was provided.

If no embedding is provided by one or more elements (e.g., a digital processor(s), quantum processor(s), or another element of the system, at 1008, one or more elements (e.g., digital processor(s), quantum processor(s)) of the system determines the number of in-chain neighbors for every vertex by calculating the chain degree. At 1010, one or more elements (e.g., digital processor(s), quantum processor(s)) of the system find the endpoints of all non-chain couplers by identifying couplers with coupling strengths not equal to zero and not equal to minimum chain strength. At 1012, for each coupler between two different chains, one or more elements (e.g., digital processor(s), quantum processor(s)) of the system calculates a compensation factor from the number of in-chain neighbors and the value of the background susceptibility error $\chi$.

If an embedding was provided, at 1014, one or more elements (e.g., digital processor(s), quantum processor(s)) of a system embeds the problem into the hardware graph (e.g., the physical quantum processor). At 1016, one or more elements (e.g., digital processor(s), quantum processor(s)) of the system find the endpoints of all non-chain couplers by identifying couplers with coupling strengths not equal to zero and not part of an embedded chain. At 1018, for each coupler between two different chains, one or more elements (e.g., digital processor(s), quantum processor(s)) of the system calculates a compensation factor from the number of in-chain neighbors and value of background susceptibility $\chi$. At 1020, one or more elements (e.g., digital processor(s), quantum processor(s)) of the system scales each non-chain coupler with its respective compensation factor to calculate the nominal coupling. At 1022, one or more elements (e.g., digital processor(s), quantum processor(s)) of a system un-normalizes the nominal coupling.

At 1024, one or more elements (e.g., digital processor(s), quantum processor(s)) of the hybrid computer system 100 (FIG. 1) embeds the compensated problem graph in hardware (e.g., hardware graph of quantum processor).

At 1026, one or more elements (e.g., digital processor(s), quantum processor(s)) of the system cause evolution of the quantum processor with the embedded compensated problem graph.

At 1028, one or more elements (e.g., digital processor(s), quantum processor(s)) of a system reads out solutions from the quantum processor. For example, one or more readout devices (e.g., SQUIDS) may read out the state of the qubits. Readout is explained in the various patents and patent applications incorporated by reference herein.

At 1030, one or more elements (e.g., digital processor(s), quantum processor(s)) of a system evaluates the solutions. Solution evaluation is explained in the various patents and patent applications incorporated by reference herein.

At 1032, one or more elements (e.g., digital processor(s), quantum processor(s)) of a system returns the evaluated solution(s). Solution return is explained in the various patents and patent applications incorporated by reference herein.

The method 1000 terminates at 1034. Alternatively, the method 1000 may repeat for one or more iterations. In some implementations, the method 1000 may be executed in parallel on a plurality of instances of a physical machine or physical processor or a plurality of instances of a virtual machine or virtual processor.

Qubit Mediated Bias Application for Generating Longitudinal Field

An h/J ratio misbalance is another type of error that can adversely affect the performance of an analog processor, for example the performance of a quantum processor. The h/J ratio misbalance results from distortions to time-dependent analog signals supplied to the processor (e.g., quantum processor) which may be the result of small variations in the physical size of qubits relative to one another, or from attempts to homogenize electrical properties (e.g., Lq, Cq, and Ic) across all physical qubits. Existing techniques to reduce h/J ratio misbalance includes applying a persistent current compensator signal ($I_p$ compensator signal) align h-terms and J-terms so that both terms have the same time dependence in the Hamiltonian. However, applying an $I_p$ compensator signal requires persistent current to be known during the entire anneal and persistent current can be difficult to measure, particularly during the early parts of the anneal. A technique to at least partially reduce or compensate for h/J ratio without the need for an $I_p$ compensator signal is discussed immediately below.

The present systems and methods can at least partially reduce or compensate for h/J ratio misbalance employs ancilla qubits to apply external flux biases to problem qubits (i.e., qubits exposed to an end user for use in embedding a problem formulation) to make biases and couplers have the same time-dependence, rather than relying on a potentially incorrect $I_p$ compensator signal. Each ancilla qubit has a Josephson inductance rather than a magnetic inductance since each ancilla qubit is only coupled to one problem qubit. Ancilla qubits may be annealed in the same way as problem qubits. As a result, the bias energy would scale the same way as the coupling energy. Implementation of ancilla qubits in this manner eliminates the need for $I_p$ compensator signals and reduces the probability of the system going into local minima.

Similar to a previously described implementation, such can allow some qubits to be used for compensation (i.e., ancilla qubits) when solving certain problems (e.g., relatively h/J ratio misbalance sensitive problems), while those same qubits can be used to embed the problem (i.e., problem qubits) when solving other problems (e.g., relatively h/J ratio misbalance insensitive problems).

Figure 11:
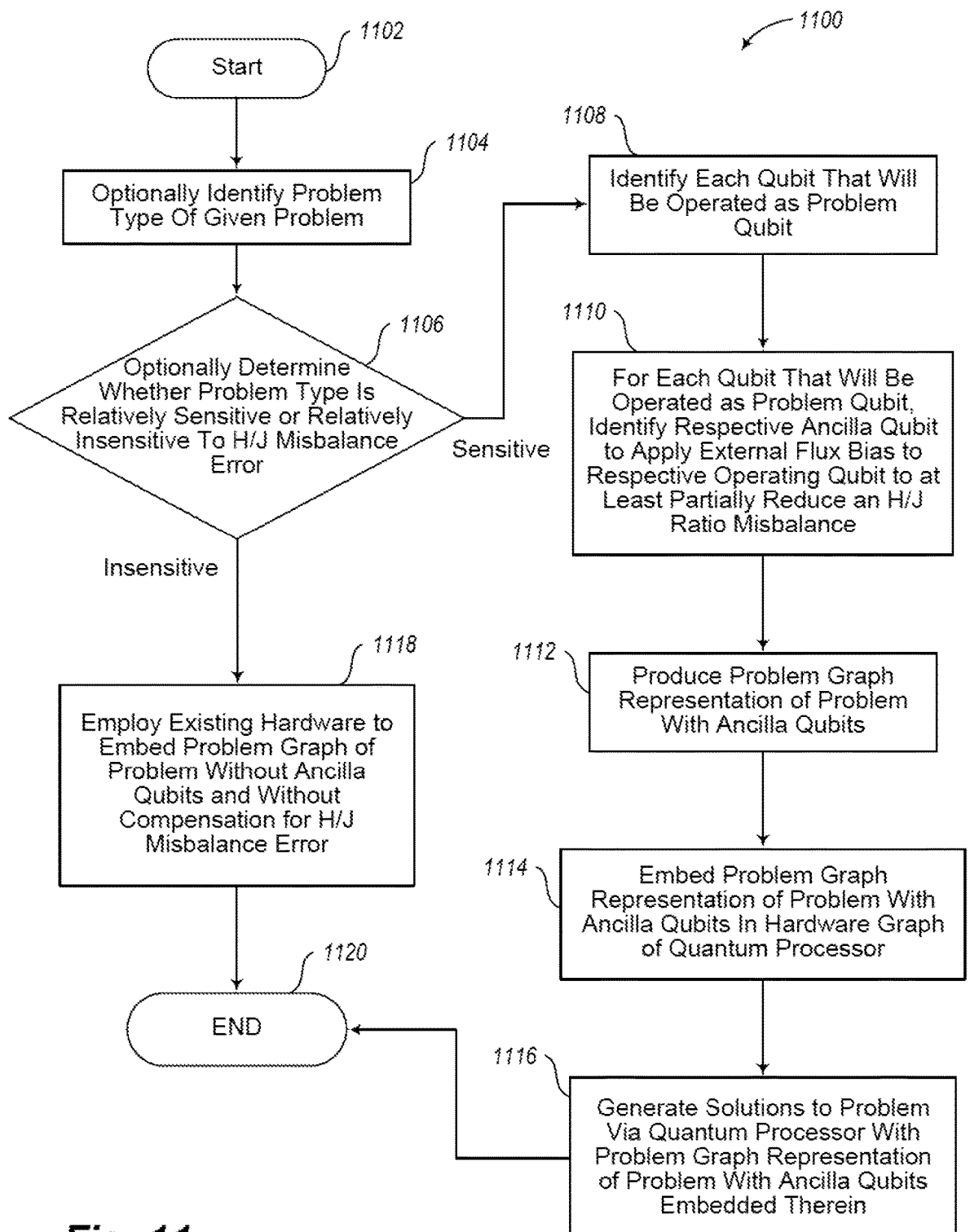
FIG. 11 is a flow diagram illustrating a method of operation in a computational system to compensate h/J ratio misbalance sensitivity, in accordance with the present systems, devices, and methods.

FIG. 11 is a flow diagram illustrating a method 1110 of operation in a computational system to address h/J ratio misbalance sensitivity, in accordance with at least one illustrated embodiment.

The method 1100 starts at 1102, for example in response to a submission of a problem, a call from a routine, or other invocation.

Optionally at 1104, one or more elements (e.g., digital processor(s), quantum processor(s)) of a system identifies a problem type of a given problem. The problems may be submitted with an assigned problem type, which can be stored in a data schema (e.g., relational database, lookup table, record) and, or as metadata which may, for example, be logically associated with the problem via one or more stored relationship. Alternatively, one or more elements may analyze the submitted problem to determine a broad class of problems to which the particular problem belongs.

Optionally at 1106, one or more elements (e.g., digital processor(s), quantum processor(s)) of the system determines whether the problem type is one that is relatively sensitive to h/J misbalance error or is a problem type that is relatively insensitive to h/J misbalance error. Problem types may be classified or categorized as being either relatively sensitive or relatively insensitive to h/J misbalance error. Such information may, for example, be stored in a data schema (e.g., relational database, lookup table, record) and, or as metadata which may, for example, be logically associated with the problem via one or more stored relationship. In response to a determination that the identified problem type of the first problem is a problem type that is relatively sensitive to h/J misbalance error, one or more elements (e.g., digital processor(s), quantum processor(s)) of the system perform acts 1108 through 1116. If neither acts 1104 nor 1106 are performed, the one or more elements (e.g., digital processor(s), quantum processor(s)) of the system can perform acts 1108 through 1116 on for any submitted problem.

At 1108, one or more elements (e.g., digital processor(s), quantum processor(s)) of the system produce a problem graph representation of the given problem.

At 1110, one or more elements (e.g., digital processor(s), quantum processor(s)) of the system identify each of the qubits in a quantum processor that will be operated as a problem qubit.

At 1112, for each problem qubit, one or more elements (e.g., digital processor(s), quantum processor(s)) of the system identify a respective qubit in the quantum processor that will operate as an ancilla qubit.

At 1114, one or more elements (e.g., digital processor(s), quantum processor(s)) of the system embed the problem graph into the problem qubits of the quantum processor.

At 1115, one or more elements (e.g., digital processor(s), quantum processor(s)) of the system apply an external flux bias to each problem qubit via a corresponding respective ancilla qubit in the quantum processor.

At 1116, one or more elements (e.g., digital processor(s), quantum processor(s)) of the system generate solutions to the problem by evolving the quantum processor with the problem graph embedded therein.

In response to a determination that the identified problem type of the problem is a problem type that is relatively insensitive to h/J misbalance error, at 1118 one or more elements (e.g., digital processor(s), quantum processor(s)) of the system employ the existing hardware to embed a problem graph of the first problem in a hardware graph of the quantum processor without using the existing hardware of the quantum processor to compensate for h/J misbalance error.

Thus, while using the existing multi-use hardware to compensate for h/J misbalance error incurs a reduction in qubits available as operational qubits and connectivity, that only occurs when attempting to solve problems which are sensitive to the h/J misbalance error, but the same hardware can advantageously be used with full energy scales and qubit count when attempting to solve problems that are insensitive to the h/J misbalance error.

The method 1100 terminates at 1120. Alternatively, the method 1100 may repeat for one or more iterations. In some implementations, the method 1100 may be executed in parallel on a plurality of instances of a physical machine or physical processor or a plurality of instances of a virtual machine or virtual processor.

Hard-Coding Quantum Error Correction

Bit flip error is another type of error that adversely affects performance of analog computers, for example performance of quantum computers. Bit flip errors occur during computation due to decoherence and noise. A software-based technique to reduce or at least partially compensate for bit flip error is described immediately below.

A value of bit flip error is typically processor dependent (e.g., chip-dependent, dependent on the individual instance of the processor). The present system and methods describe a software-based technique that may, in some implementations, be characterized as a pre-processing technique, in that the software-based technique is implemented before a respective iteration of the problem is run or evolved on the specific instance of the quantum processor.

The present systems and methods can at least partially reduce or compensate for bit flip error by employing ancilla qubits to encode penalty terms during calibration of a quantum processor. For example, a quantum processor maybe have approximately 2000 functional qubits on the chip, of which 1000 are operating qubits or problem qubits (i.e., qubits not exposed to the user for computation) and 1000 are non-operating qubits that can include ancilla qubits (i.e., qubits not exposed to the user for computation, but which are technically functional). Ancilla qubits can be coupled in a manner that can mitigate error in a set of problem qubits. The present approach includes coupling ancilla qubits to problem qubits and coupling ancilla qubits to one another to reinforce couplers that couple problem qubits to one another. By reinforcing couplers coupling problem qubits, bit flip errors can be mitigated and performance can be improved.

Figure 12A:
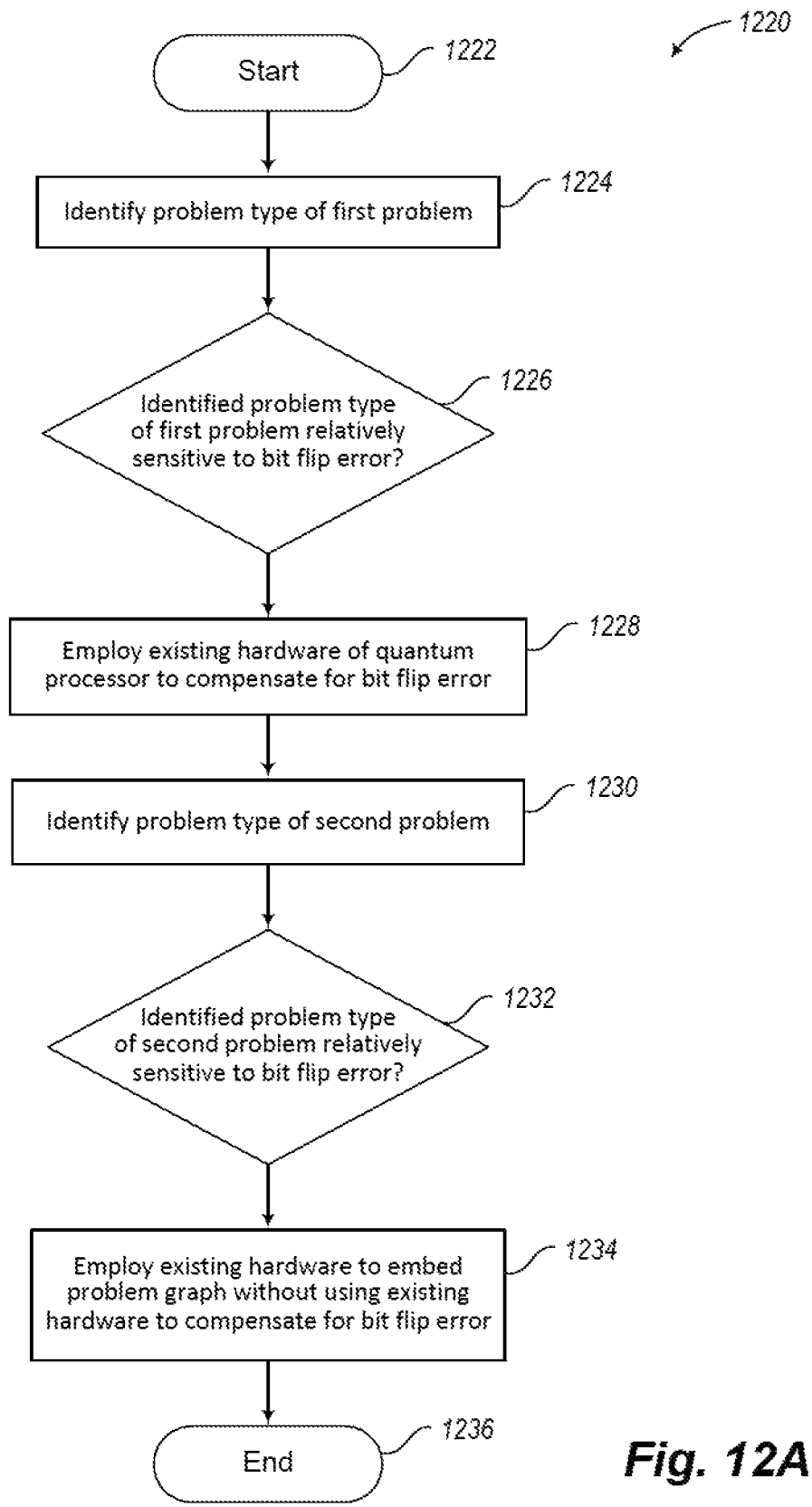
FIG. 12A is a flow diagram illustrating a method of operation to compensate for bit flip error, in accordance with the present systems, devices, and methods.

FIG. 12A is a flow diagram illustrating a method 1220 of operation to compensate for bit flip error, in accordance with the present systems, devices, and methods.

The method 1220 starts at 1222, for example in response to a submission of a problem, a call from a routine, or other invocation.

At 1224, one or more elements (e.g., user(s), digital processor(s), quantum processor(s)) of a system identifies a problem type of a first problem to be processed. For example, one or more elements (e.g., user(s), digital processor(s), quantum processor(s)) of a system may query at least one of a data schema or a piece of metadata, logically associated with the first problem via one or more stored relationships. Also for example, one or more elements (e.g., user(s), digital processor(s), quantum processor(s)) of a system may analyze the first problem to determine a broad class of problems to which the first problem belongs.

At 1226, one or more elements (e.g., user(s), digital processor(s), quantum processor(s)) of a system determines whether identified problem type of first problem relatively sensitive to bit flip error.

In response to a determination at 1226 that identified problem type of first problem is relatively sensitive to bit flip error, one or more elements (e.g., user(s), digital processor(s), quantum processor(s)) of a system employ existing hardware of the quantum processor at 1228 to compensate for bit flip error when generating solutions to the first problem via the quantum processor. For example, one or more elements (e.g., user(s), digital processor(s), quantum processor(s)) of a system may identify each of a number of qubits that will be operated as a problem qubit when generating solutions to a first problem and the identify a respective ancilla qubit to apply an external flux bias to the respective problem qubits.

At 1230, one or more elements (e.g., user(s), digital processor(s), quantum processor(s)) of a system identifies a problem type of a second problem to be processed. For example, one or more elements (e.g., user(s), digital processor(s), quantum processor(s)) of a system may query at least one of a data schema or a piece of metadata, logically associated with the second problem via one or more stored relationships. Also for example, one or more elements (e.g., user(s), digital processor(s), quantum processor(s)) of a system may analyze the second problem to determine a broad class of problems to which the second problem belongs.

At 1232, one or more elements (e.g., user(s), digital processor(s), quantum processor(s)) of a system determines whether an identified problem type of the second problem is relatively sensitive to bit flip error. In response to a determination at 1232 that the identified problem type of the second problem is relatively insensitive to bit flip error, one or more elements (e.g., user(s), digital processor(s), quantum processor(s)) of a system employ existing hardware to embed a problem graph of the second problem in a hardware graph of the quantum processor at 1234 without using the existing hardware of the quantum processor to compensate for bit flip error. For example, one or more elements (e.g., user(s), digital processor(s), quantum processor(s)) of a system one or more elements (e.g., user(s), digital processor(s), quantum processor(s)) of a system may embed the problem graph of the second problem in the hardware graph of the quantum processor without any ancilla qubits to compensate for bit flip error.

The method 1220 terminates at 1236. Alternatively, the method 1220 may repeat for one or more iterations. In some implementations, the method 1220 may be executed in parallel on a plurality of instances of a physical machine or physical processor or a plurality of instances of a virtual machine or virtual processor.

Figure 12B:
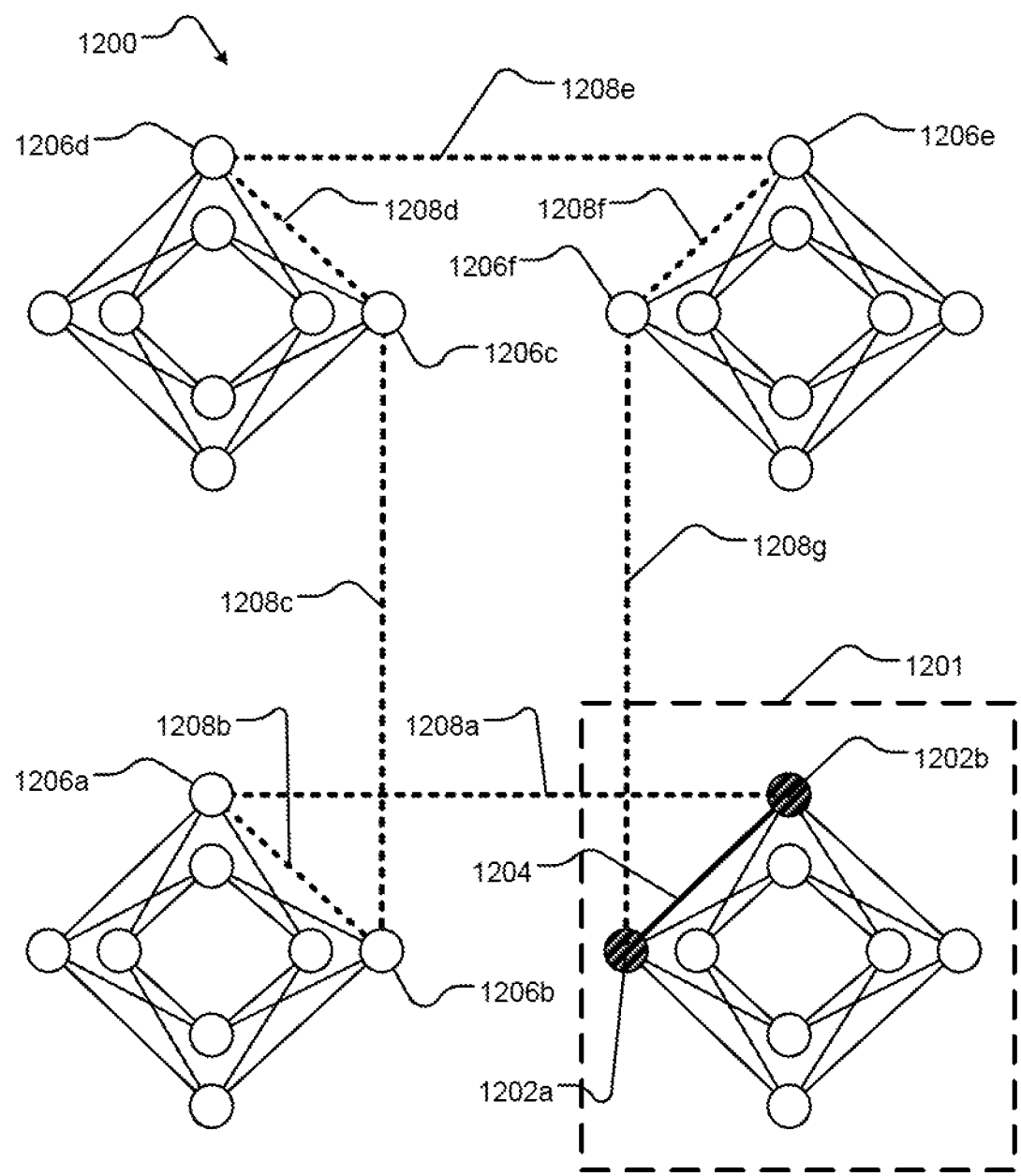
FIG. 12B is a schematic diagram illustrating a coupling scheme that includes reinforcement couplers and ancilla qubits, in accordance with the present systems, devices, and methods.

FIG. 12B is a schematic diagram illustrating a coupling scheme 1200 that includes reinforcement couplers and ancilla qubits to mitigate bit flip errors.

Coupling scheme 1200 includes four unit tiles or cells 1201 (only one called out to avoid drawing clutter) that each consist of four vertical qubits and four horizontal qubits. Qubits are represented by vertices of a bipartite graph in each cell 1201. In scheme 1200, cell 1201 includes a first problem qubit 1202a that is directly communicatively coupled to a second problem qubit 1202b via a coupler 1204 (only one called out to avoid drawing clutter). First problem qubit 1202a and second problem qubit 1202b have at least a portion of a problem graph embedded. The problem graph can be a graphical representation of a problem that is sent from an element of a system (e.g., user, digital processor, etc.) to a quantum processor. First problem qubit 1202a and second problem qubit 1202b can be affected by decoherence and noise, thus causing bit flip errors to occur. To mitigate or reduce the effect of bit flip errors, problem qubits 1202 are coupled to an intermediate length chain of ancilla qubits 1206 to form a loop. For example, problem qubits 1202 can be directly communicatively coupled to a chain of six ancilla qubits 1206 to form a loop. During calibration of a quantum processor, ancilla qubits 1206 can each encode a penalty term or multiple penalty terms to correct against bit flip errors that occur during computation. Penalty terms can come from a penalty function that reduces the likelihood of falling into a false ground state when annealing the quantum processor by penalizing energy increases caused by thermal excitations or noise. In one implementation, a penalty term can be encoded into an ancilla qubit 1206a-1206f after calibrating a quantum processor.

First problem qubit 1202a is coupled to second problem qubit 1202b within the same cell 1201 via coupler 1204. In some implementations, first problem qubit 1202a and second problem qubit 1202b can be in different cells. Second problem qubit 1202b is also coupled to a first ancilla qubit 1206a via a reinforcement coupler 1208a. Second problem qubit 1202b and first ancilla qubit 1206a are in different cells. First ancilla qubit 1206a is also coupled to a second ancilla qubit 1206b via reinforcement coupler 1208b within the same cell. Second ancilla qubit 1206b is also coupled to a third ancilla qubit 1206c via reinforcement coupler 1208c. Second ancilla qubit 1206b and third ancilla qubit 1206c are in different cells. Third ancilla qubit 1206c is also coupled to a fourth ancilla qubit 1206d via reinforcement coupler 1208d within the same cell. Fourth ancilla qubit 1206d is coupled to a fifth ancilla qubit 1206e via reinforcement coupler 1208e. Fourth ancilla qubit 1206d and fifth ancilla qubit 1206e are in different cells. Fifth ancilla qubit 1206e is also coupled to a sixth ancilla qubit 1206f via reinforcement coupler 1208f within the same cell. Sixth ancilla qubit 1206f is also coupled to first problem qubit 1202a via reinforcement coupler 1208g. Sixth ancilla qubit 1206f and first problem qubit 1202a are in different cells. Each ancilla qubit 1206a to 1206f encodes a penalty term from a penalty function that can be represented as a part of a problem Hamiltonian captured by problem qubits 1202. Reinforcement couplers 1208 are set to have a coupling strength that is at least as strong as or equal to the coupling strength of coupler 1204.

Thus, to mitigate bit flip errors, penalty terms from a penalty function are encoded in ancilla qubits 1206 and coupler 1204 is reinforced by a chain formed from reinforcement couplers 1208. Coupling strengths of reinforcement couplers 1208 are at least as strong as or equal to the coupling strength of coupler 1204. In some implementations, some ancilla qubits can be within the same cell as some problem qubits. In some implementations, at least one ancilla qubit can be in a different cell. In other implementations, all ancilla qubits can be in the same cell. Although FIG. 12B illustrates a chain length of six ancilla qubits that encode penalty terms and reinforce coupler 1204, it can be advantageous for certain problem types to implement a shorter chain length (e.g., four ancilla qubits) or a longer chain length (e.g., eight ancilla qubits) to reinforce coupler 1204. For example, such a coupling scheme may include a chain comprising four ancilla qubits and five reinforcement couplers.

The appropriate penalty function is implemented into the analog processor (e.g., quantum processor or chip) during a calibration process. The values for the inputs to the penalty function will typically be calculated each time a user runs a problem on the quantum processor. For example, the user will assign the same coupling strength to coupler 1204 coupling problem qubits 1204 and reinforcement couplers 1208 that couple ancilla qubits 1206 to one another and to problem qubits 1202.

A quantum processor can include approximately 2000 functional qubits, of which approximately 1000 qubits can be exposed to the user. The other approximately 1000 qubits can provide redundancy to, for example, accommodate for imperfect fabrication. This technique takes advantage of the unused qubits to achieve a computational effect. However, the technique may be implemented in implementations where there are no qubits designated as non-operating. For instance, to implement this technique in a quantum computing system that has 2000 operating qubits or problem qubits 1202 and no non-operating qubits, some operating qubits could function as ancilla qubits. This would reduce graph connectivity, but also potentially reduce error. While using some of the problem qubits 1202 to terms to mitigate bit flip errors incurs a penalty of a factor of 2 in qubit count and connectivity, that may only occur when attempting to solve problems which are sensitive to the bit flip errors, but the problem qubits 1202 could be used with full energy scales and qubit count when attempting to solve problems that are insensitive to bit flip errors. Thus, a method may determine a problem type for a particular problem and determine to use one or more qubits as ancilla qubits 1206 to reinforce couplers 1204 where the type of problem is one that is relatively sensitive to bit flip errors, or to use the same qubit to embed the problem graph for problems that are relatively insensitive to bit flip errors.

Quantum Error Correcting Qubit Cliques as QPU Architecture Primitives

Low fidelity and low performance of a single qubit can be a source of noise that adversely affect performance of analog computers, for example performance of quantum computers. Fidelity is the probability that that logical qubit behavior will be the same as Ising spin behavior and that the embedded problem Hamiltonian is a good approximation of the physical Hamiltonian. A technique to reduce or at least partially compensate for low fidelity is described immediately below.

The technique to reduce or at least partially compensate for low fidelity involves forming a clique using any combination of $\sigma_{XZ}$, $\sigma_{ZX}$ and/or $\sigma_{XX}$ couplers such that the clique behaves logically as $\sigma_Z$ spins but with quantum error correction and improved fidelity. The clique can be used as the "logical primitive" (i.e., the building block) of the processor. The $\sigma_{XZ}$ and $\sigma_{ZX}$ couplers boost tunneling dynamics when the qubits the $\sigma_{XZ}$ and $\sigma_{ZX}$ couplers are coupled to disagree with each other. This can increase $\sigma_Z$ fidelity and the likelihood of finding a ground state where the qubits agree with each other.

Tunneling dynamics can be boosted in one or more ways. For example, tunneling dynamics can be boosted by increasing the energy barrier to undesired states using direct energy encodings (local field bias or coupling energies). In one implementation, tunneling dynamics can be boosted by using ancilla qubits to increase degeneracy of a desired qubit configuration which causes an increase in the energy barrier mid-anneal. In one implementation, tunneling dynamics can be boosted by, for example, using XZ-, ZX-, or XX-couplers to encode a ground state that has more desirable logical properties, by for instance enforcing a particular coupling or retarding the annealing progress of the local variable).

Figure 13:
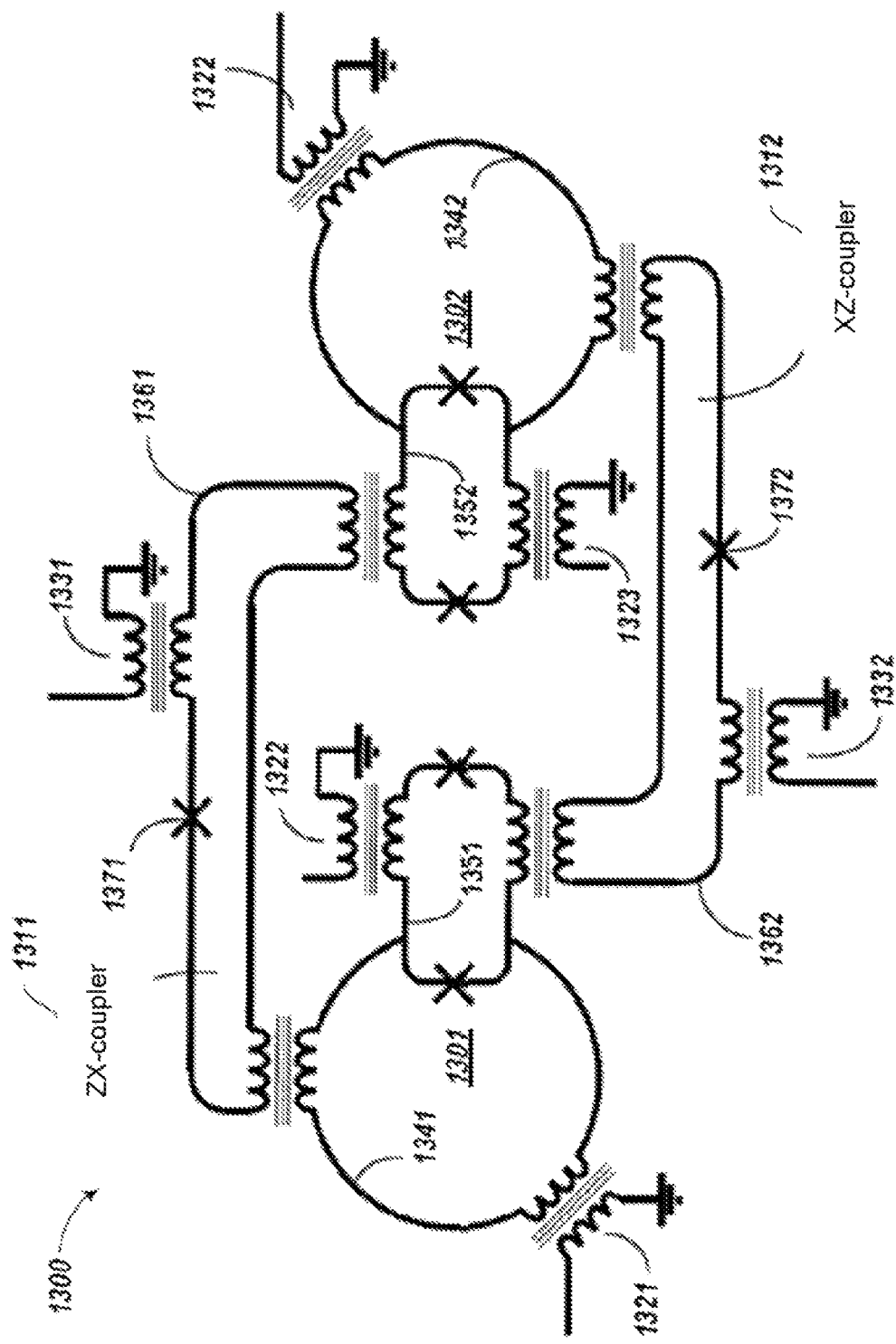
FIG. 13 is a schematic diagram illustrating an example of logical primitive comprising two qubits and two couplers, in accordance with the present systems, devices, and methods.

FIG. 13 is a schematic diagram illustrating an example of a logical primitive comprising two qubits and two couplers, in accordance with the present systems, devices, and methods. The logical primitive comprising two qubits and two couplers (1 ZX-, 1 XZ-) may be employed in lieu of a single qubit.

The two Hamiltonians presented in Biamonte et al. are given in equations 4 and 5:

$$H = \sum_i^n h_i \sigma_i^z + \sum_i^n \Delta_i \sigma_i^x + \sum_{i,j}^n J_{ij} \sigma_i^z \sigma_j^z + \sum_{i,j}^n K_{ij} \sigma_i^x \sigma_j^x \quad (4)$$

$$H = \sum_i^n h_i \sigma_i^z + \sum_i^n \Delta_i \sigma_i^x + \sum_{i,j}^n J_{ij} \sigma_i^z \sigma_j^z + \sum_{i,j}^n K_{ij} \sigma_i^x \sigma_j^z \quad (5)$$

Logical primitive 1300 includes two superconducting qubits 1301, 1302, a ZX-coupler 1311, and an XZ-coupler 1312. ZX-coupler 1311 and XZ-coupler 1312 are each configured to communicatively couple qubits 1301 and 1302. Qubit 1301 includes a qubit loop 1341 formed by a closed superconducting current path that is interrupted by a compound Josephson junction 1351. Similarly, qubit 1302 includes a qubit loop 1342 formed by a closed superconducting current path that is interrupted by a compound Josephson junction 1352. Similar to portion of superconducting quantum processor 200 shown in FIG. 2, system 1300 shown in FIG. 13 includes programming interfaces 1321-1324 which may be used to realize the $\sigma^z$ and $\sigma^x$ terms of the universal Hamiltonian described by Equation 5.

Each of programming interfaces 1321-1324 may be realized by a respective inductive coupling, as illustrated, to a programming system (not shown). Programming interfaces 1321 and 1324 may each be used to couple a flux signal into a respective compound Josephson junction 1351, 1352 of qubits 1301 and 1302, thereby realizing the $\Delta_i$ terms in the system Hamiltonian. This coupling provides the $\sigma^x$ terms of equation 5. Similarly, programming interfaces 1322 and 1323 may each be used to couple a flux signal into a respective qubit loop of qubits 1301 and 1302, thereby realizing the $h_i$ terms in the system Hamiltonian. This coupling provides the $\sigma^z$ terms of equation 5.

In accordance with the present systems, methods and apparatus, system 1300 shown in FIG. 13 includes an example embodiment of a ZX-coupler 1311 and an example embodiment of an XZ-coupler 1312. ZX-coupler 1311 includes a closed superconducting current path 1361 that is inductively coupled to both the qubit loop 1341 of qubit 1301 and the compound Josephson junction 1352 of qubit 1302. Thus, ZX-coupler 1311 provides coupling between the Z-degree of freedom in qubit 1301 and the X-degree of freedom in qubit 1302 by inductively coupling qubit loop 1341 of qubit 1301 into compound Josephson junction 1352 of qubit 1302. If qubit 1301 is bi-stable, then the direction of persistent current flow in qubit loop 1341 will influence the magnitude of the tunneling rate in compound Josephson junction 1352 of qubit 1302.

In many applications, it is preferred to have "tunable" control over the coupling strength between qubits. In the case of ZX-coupler 1311, tunability is realized by two tuning elements: closed superconducting current path 1361 is interrupted by at least one Josephson junction 1371 and closed superconducting current path 1361 is inductively coupled to a programming interface 1331. These tuning elements allow the susceptibility of ZX-coupler 1311 to be tuned as described in A. Maassen van den Brink et al., New J. Phys. 7, 230 (2005).

Those of skill in the art will appreciate that the structure and operation of XZ-coupler 1312 is effectively the "mirror-image" of the structure and operation of ZX-coupler 1311. That is, XZ-coupler 1312 includes a closed superconducting current path 1362 that is inductively coupled to qubit loop 1342 of qubit 1302 and compound Josephson junction 1351 of qubit 1301. Thus, XZ-coupler 1312 provides coupling between the X-degree of freedom in qubit 1301 and the Z-degree of freedom in qubit 1302 by inductively coupling qubit loop 1342 of qubit 1302 to compound Josephson junction 1351 of qubit 1301. If qubit 1302 is bi-stable, then the direction of persistent current flow in qubit loop 1342 will influence the magnitude of the tunneling rate in compound Josephson junction 1351 of qubit 1301. XZ-coupler 1312 may also be made tunable by the combination of two tuning elements. Closed superconducting current path 1362 is interrupted by at least one Josephson junction 1372 and closed superconducting current path 1362 is inductively coupled to a programming interface 1332.

Those of skill in the art will appreciate that the embodiments of ZX- and XZ-couplers shown in FIG. 13 are, for the purposes of the present systems, methods and apparatus, intended to serve as example devices only and do not limit the scope of the present systems, methods and apparatus to implementations of XZ- and ZX-couplers exactly as drawn in FIG. 13.

As previously stated, those of skill in the art will appreciate that a similar coupling architecture may be applied in a quantum processor involving a different number of qubits. However, it is recognized in U.S. patent application Ser. No. 12/013,192 that the operation of a single qubit device may be adversely affected if it is connected too many couplers. In such instances, it is possible to combine two or more individual qubit devices as one effective qubit such that the desired number of couplers may be applied without adversely affecting the operation of the qubit devices.

Figure 14:
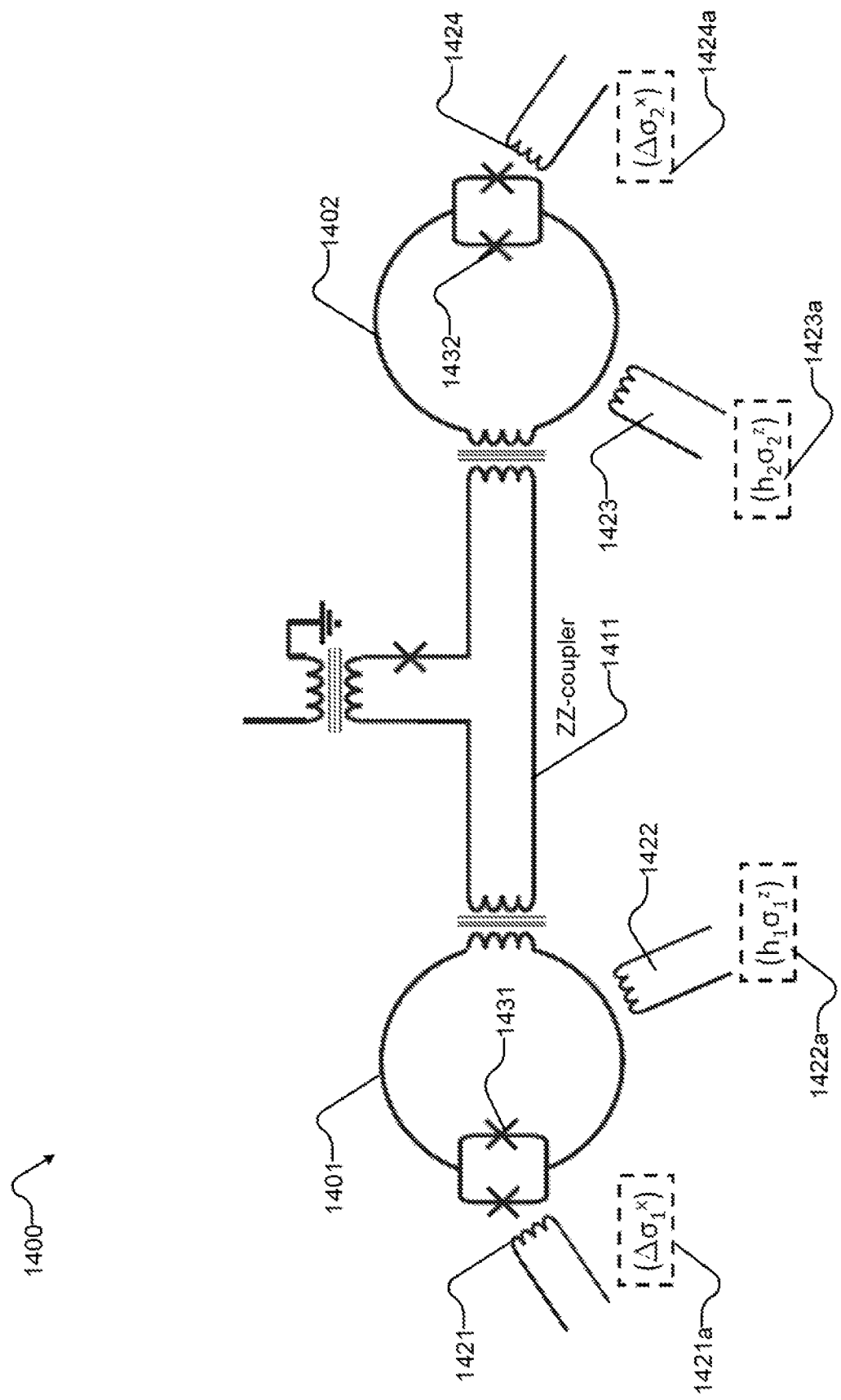
FIG. 14 is a schematic diagram illustrating a portion of an example logical primitive comprising a ZZ-coupler, in accordance with the present systems, devices, and methods.

FIG. 14 is a schematic diagram illustrating a portion of an example logical primitive comprising a ZZ-coupler (referred to herein as a logical primitive portion 1400), in accordance with the present systems, devices, and methods.

Logical primitive portion 1400 include two superconducting qubits 1401, 1402 and a tunable ZZ-coupler 1411 coupling information therebetween. While the portion of logical primitive portion 1400 shown in FIG. 1400 includes only two qubits 1401, 1402 and one coupler 1411, those of skill in the art will appreciate that logical primitive portion 1400 may include any number of qubits, and any number of coupling devices coupling information therebetween.

Logical primitive portion 1400 shown in FIG. 14 may be implemented to physically realize the Hamiltonian described by equation 1, which includes the same $\sigma^z$ and $\sigma^x$ terms as in the Hamiltonians described by equations 4 and 5. In order to provide these $\sigma^z$ and $\sigma^x$ terms, a quantum processor includes programming interfaces 1421-1424 that are used to configure and control the state of logical primitive portion 1400. Each of programming interfaces 1421-1424 may be realized by a respective inductive coupling, as illustrated, to a programming system (not shown). Such a programming system may be separate from logical primitive portion 1400, or it may be included locally (i.e., on-chip with quantum processor 600) as described in U.S. patent application Ser. No. 11/950,276. In some implementations, each of programming interfaces 1421 and 1422 may be coupled via an inductive coupler such as ZZ-coupler 1411 of FIG. 14 to form a logical primitive. In other implementations, each of programming interfaces 1422 and 1423 may be coupled via a capacitive coupler such as XX-coupler 1502 of FIG. 15 to form a logical primitive.

In the programming of quantum processor, programming interfaces 1421 and 1424 may each be used to couple a flux signal into a respective compound Josephson junction 1431, 1432, of qubits 1401 and 1402, thereby realizing the $\Delta_i$ terms in the system Hamiltonian. This coupling provides the $\sigma^x$ terms of equations 1-5. Similarly, programming interfaces 1422 and 1424 may each be used to couple a flux signal into a respective qubit loop of qubits 1401 and 1402, thereby realizing the $h_i$ terms in the system Hamiltonian. This coupling provides the $\sigma^z$ terms of equations 1-5. In FIG. 14, the contribution of each of programming interfaces 1421-1424 to the system Hamiltonian is indicated in boxes 1421a-1424a, respectively.

Figure 15:
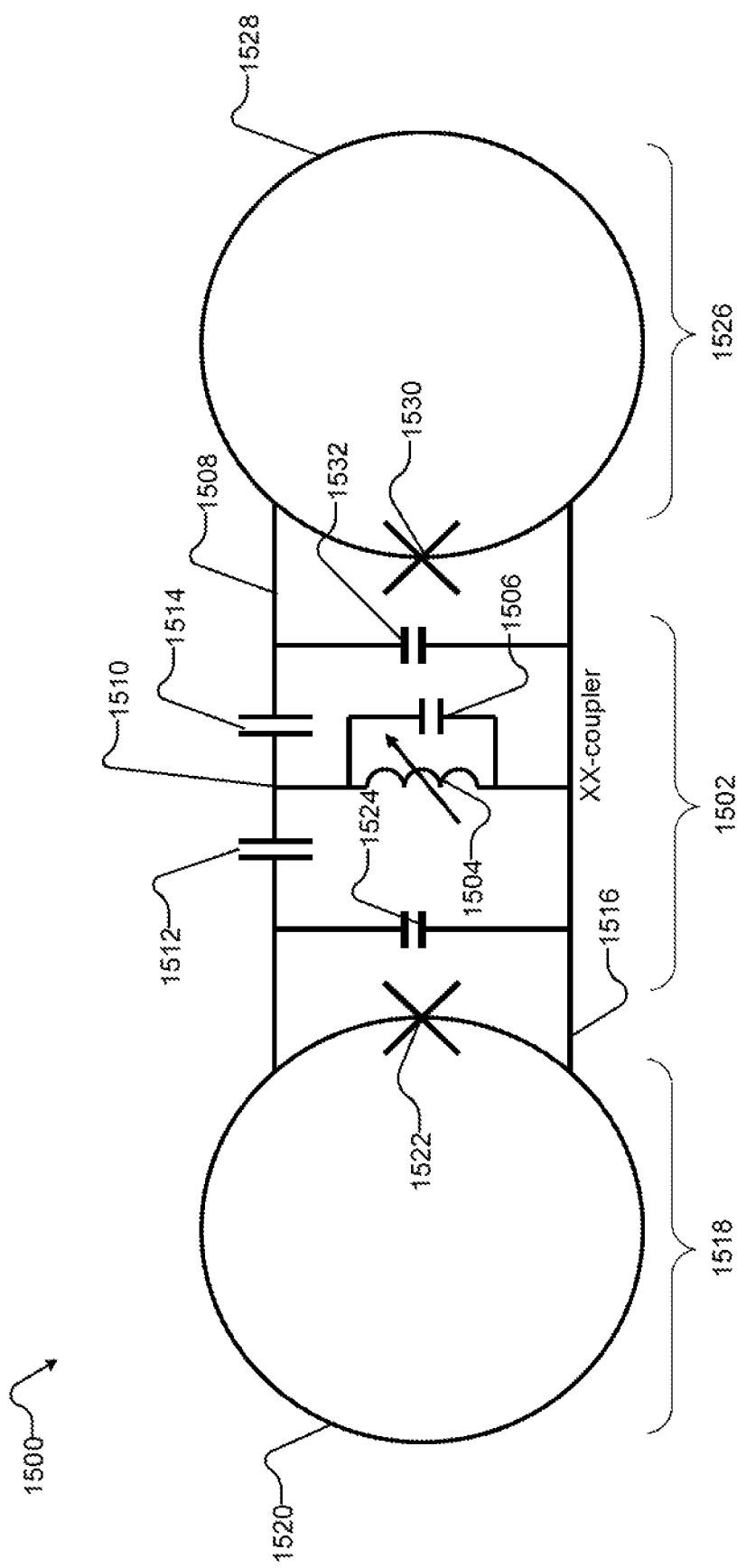
FIG. 15 is a schematic diagram illustrating a portion of an example logical primitive comprising an XX-coupler, in accordance with the present systems, devices, and methods.

FIG. 15 is a schematic diagram illustrating a portion of an example logical primitive comprising an XX-coupler (referred to herein as a logical primitive portion 1500), in accordance with the present systems, devices, and methods.

Logical primitive portion 1500 has a controllable transverse coupler 1502 capable of providing transverse XX-coupling between a qubit 1518 and a qubit 1526 and is used to transversely couple qubit 1518 and qubit 1526. Qubit 1518 may be comprised of a loop of superconducting material 1520 interrupted by at least one Josephson junction 1522 having an intrinsic capacitance graphically represented by a capacitor symbol 1524. Qubit 1526 may be comprised of a loop of superconducting material 1528 interrupted by at least one Josephson junction 1530 having an intrinsic capacitance graphically represented by a capacitor symbol 1532. Qubit 1518 and qubit 1526 are connected by a conductive path 1508 and a conductive path 1516. The conductive paths 1508, 1516 may, for example, take the form of one or more wires or traces of material that are superconducting below a critical temperature, to form superconductive paths. Superconducting path 1508 includes a coupling capacitance 1512 and a coupling capacitance 1514. The coupling capacitances 1512, 1514 may take the form of discrete capacitors. Alternatively, coupling capacitances 1512, 1514 may take the form of inherent, intrinsic or parasitic capacitances (commonly referred to as parasitic capacitance herein) associated with the first superconducting path 1508. Tunable inductance 1504 and capacitance 1506 connect superconducting path 1508, at a node 1510 located between coupling capacitors 1512, 1514, to superconducting path 1516. The tunable inductance 1504 may, for example, be provided by a tunable or adjustable inductor.

The tunability of controllable transverse coupler 1502 is achieved by adjusting the impedance shunting the path through coupling capacitors 1512, 1514. This is achieved by varying the tunable impedance 1504.

A clique with a combination of these couplers could be used in lieu of individual qubits as the building blocks of a quantum processing unit (QPU). This approach advantageously allows physical devices (i.e., individual qubits) that have limited fidelity, precision, or control to be used in larger QPU architectures.

Referring to FIG. 13, FIG. 14, and FIG. 15 together, a logical primitive comprises two qubits and two couplers communicatively coupling the two qubits. Several combinations of coupler types can exist for the two couplers of the logical primitive that are not illustrated in the present specification. In one implementation, the logical primitive can include a ZX-coupler and a ZZ-coupler, such as coupler 1311 in FIG. 13 and coupler 1411 in FIG. 14, respectively. The ZX-coupler can couple a respective body loop of a first qubit to a Josephson junction of a second qubit. The ZZ-coupler can couple the body loop of the first qubit to a respective body loop of the second qubit. In one implementation, the logical primitive can include a ZX-coupler and an XX-coupler, such as coupler 1311 in FIG. 13 and coupler 1502 in FIG. 15, respectively. The ZX-coupler can couple a respective body loop of a first qubit to a Josephson junction of a second qubit. The XX-coupler can couple a respective Josephson junction of the first qubit to a respective Josephson junction of the second qubit. In one implementation, the logical primitive can include an XZ-coupler and a ZZ-coupler, such as coupler 1312 in FIG. 13 and coupler 1411 in FIG. 14, respectively. The XZ-coupler can couple a respective Josephson junction of a first qubit to a respective body loop of a second qubit. The ZZ-coupler can couple the body loop of the first qubit to the body loop of the second qubit. In one implementation, the logical primitive can include an XZ-coupler and an XX-coupler, such as coupler 1312 in FIG. 13 and coupler 1502 in FIG. 15, respectively. The XZ-coupler can couple a respective Josephson junction of a first qubit to a respective body loop of a second qubit. The XX-coupler can couple the Josephson junction of the first qubit to a respective Josephson junction of the second qubit.

Those of skill in the art will appreciate that the Hamiltonian described by equation 4 may be physically realized by coupling architectures that differ from coupling architectures and logical primitive portions illustrated in FIG. 13, FIG. 14, and FIG. 15. For instance, in some embodiments it may be appropriate to include XX-coupling between some qubits and ZZ-coupling between some qubits, but not necessarily both XX- and ZZ-coupling between every pair of coupled qubits. In some embodiments, it may be preferred to use only one type of coupling between any given pair of qubits, thereby providing a coupling architecture in which XX-coupling and ZZ-coupling are both present but never shared between the same pair of qubits.

In accordance with the present systems, methods and apparatus, quantum processor architectures that provide physical realizations of the universal Hamiltonian described by equation 4 have been described. However, in a further aspect of the present systems, methods and apparatus, quantum processor architectures that provide physical realizations of the universal Hamiltonian described by equation 5 are also described.

The universal Hamiltonian described by equation 5 includes the same $\sigma^z$ and $\sigma^x$ terms as described for equation 4, but substitutes $\sigma^z\sigma^x$ and $\sigma^x\sigma^z$ terms for the $\sigma^z\sigma^z$ and $\sigma^x\sigma^x$ terms of equation 4. In accordance with the present systems, methods and apparatus, the universal Hamiltonian that is described by equation 5 may be physically implemented by a qubit-coupling architecture that includes ZX- and XZ-coupling between qubits (in addition to coupling the $\sigma^z$ and $\sigma^x$ terms into each qubit). To this end, ZX- and XZ-couplers may be used. Descriptions of XZ- and ZX-couplers are provided in U.S. patent application Ser. No. 12/098,347, issued as U.S. Pat. No. 7,605,600, and entitled "SYSTEMS, METHODS AND APPARATUS FOR ANTI-SYMMETRIC QUBIT-COUPLING".

Adiabatic Quantum Architecture Design to Model Quantum Gates

A quantum processor can present some intrinsic control errors that adversely affect performance. A technique to reduce or at least partially compensate for intrinsic control errors is described immediately below.

Arbitrary problems can be mapped to a quantum processor having a certain topology (e.g., a topology structured as a bipartite graph). For example, circuit elements can be mapped to Ising spin glass problems that are structured with a similar topology. Mapping circuit elements can be considered a hardware-based technique to reduce intrinsic control errors in programmable couplers. The technique involves three specially constructed qubits and three fixed-value couplers which can be used to model logic gates. Logic gates can be modeled by implementing the values set out in Table B for the logic gate qubit biases and couplers:

TABLE B

Coupler and bias values for three logic gates.

| Gate | $J_{AB}$ | $J_{AC}$ | $J_{BC}$ | $h_A$ | $h_B$ | $h_C$ |
|------|----------|----------|----------|-------|-------|-------|
| AND  | 1        | −2       | −2       | −1    | −1    | 2     |
| OR   | 1        | −2       | −2       | 1     | 1     | −2    |
| NAND | 1        | 2        | 2        | −1    | −1    | −2    |
| NOR  | 1        | 2        | 2        | 1     | 1     | 2     |

Figure 16:
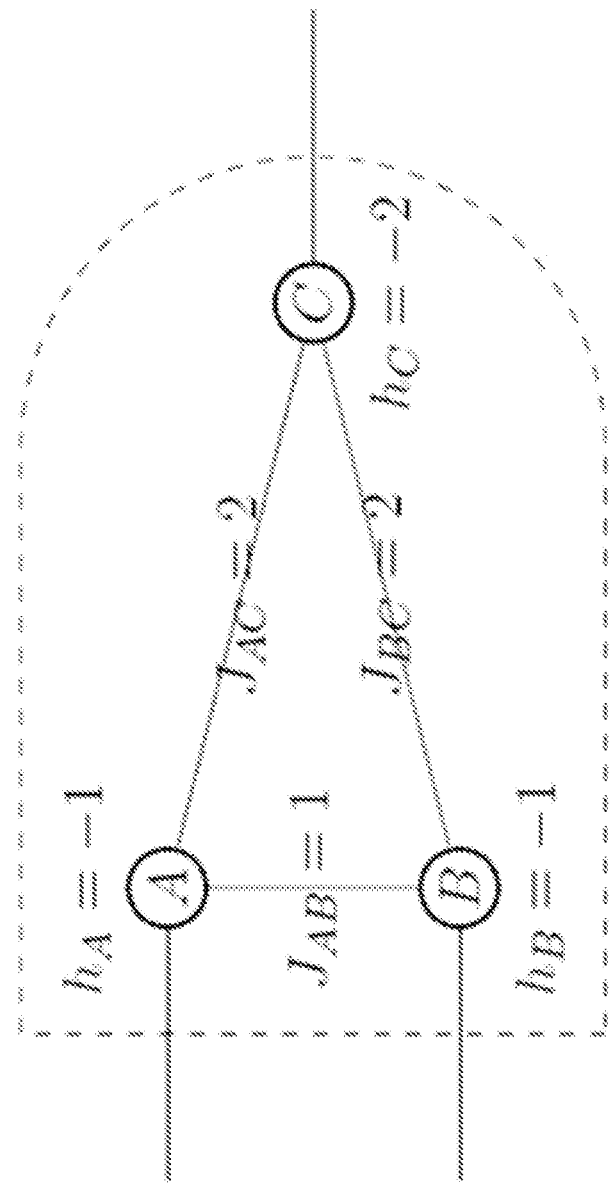
FIG. 16 is a schematic diagram illustrating an example Ising problem representing a NAND gate, in accordance with the present systems, devices, and methods.

FIG. 16 is a schematic diagram illustrating an example Ising problem representing a NAND gate 1600, in accordance with the present systems, devices, and methods. Table 2 shows an energy landscape for the Ising problem of FIG. 16.

TABLE 2

| $\sigma_A$ | $\sigma_B$ | $\sigma_C$ | E  |
|------------|------------|------------|-----|
| −1         | −1         | −1         | 9   |
| −1         | −1         | 1          | −3  |
| −1         | 1          | −1         | 1   |
| −1         | 1          | 1          | −3  |
| 1          | −1         | −1         | 1   |
| 1          | −1         | 1          | −3  |
| 1          | 1          | −1         | −3  |
| 1          | 1          | 1          | 1   |

Figure 17:
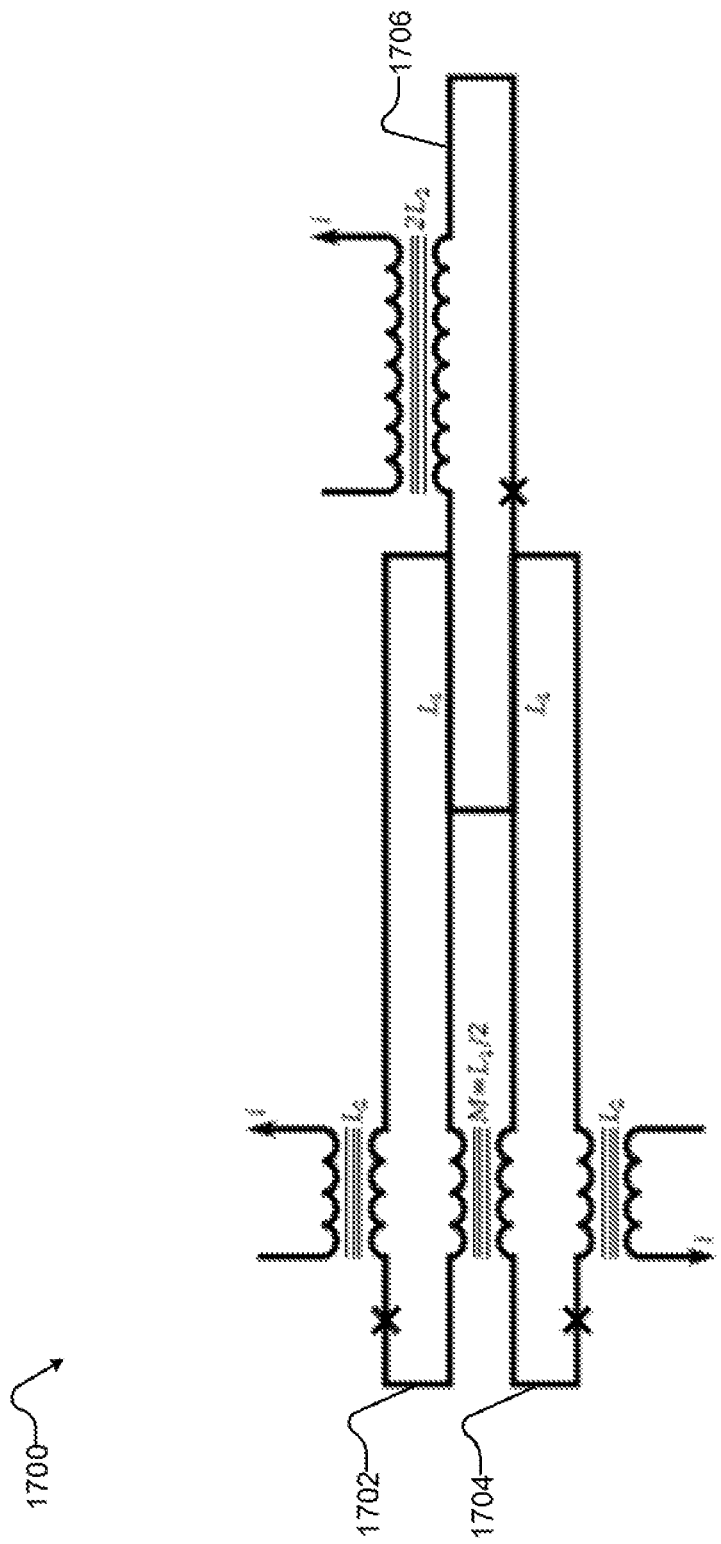
FIG. 17 is a schematic diagram illustrating a circuit comprising logic gate qubits and fixed-value couplers modeling the NAND gate depicted in FIG. 15, in accordance with the present systems, devices, and methods.

FIG. 17 is a circuit diagram that shows a circuit 1700 comprising logic gate qubits and fixed-value couplers that model the NAND gate depicted in FIG. 16. The circuit diagram for the NAND gate shows (i=bias current for $h_A$ [top], $h_B$, [bottom], and $h_C$ [right]). Notably, a persistent current i may be different for each logic gate qubit. In some implementations, logic gate qubits can also be coupled via fully galvanic couplers. FIG. 17 illustrates a NAND gate that is implemented by coupling a logic gate qubit A 1702 to a logic gate qubit C 1706 via a galvanic coupler and by coupling logic gate qubit B 1706 to a logic gate qubit C 1706 via a galvanic coupler.

Conventional programmable couplers can be used to couple logic gate qubits and traditional qubits. However, the values of conventional programmable couplers and conventional qubit biases would be restricted to {−1,0,1}. The logic gate qubit configuration can model each of the four logic gates by reversing the bias current or by reversing the signs of the conventional programmable couplers that are coupled to logic gate qubit C 1706.

Some examples of applications for use of logic gate qubits include circuit verification and inverting hash functions.

Scalable Coherent Quantum Annealer Circuit

D-Wave's quantum annealer technology solves the Ising spin model, but there could be other worthwhile problems that may be solved with a different processor. One potentially useful model is the Bose-Hubbard Hamiltonian. which may be solvable by superconducting qubit physics. in the form of a tunably-coupled Jaynes-Cummings lattice. Described below is a scalable coherent quantum annealer circuit based on a quantum processor that employs a cavity lattice that has qubits coupled to the cavities of the cavity lattice via tunable couplers.

Figure 18:
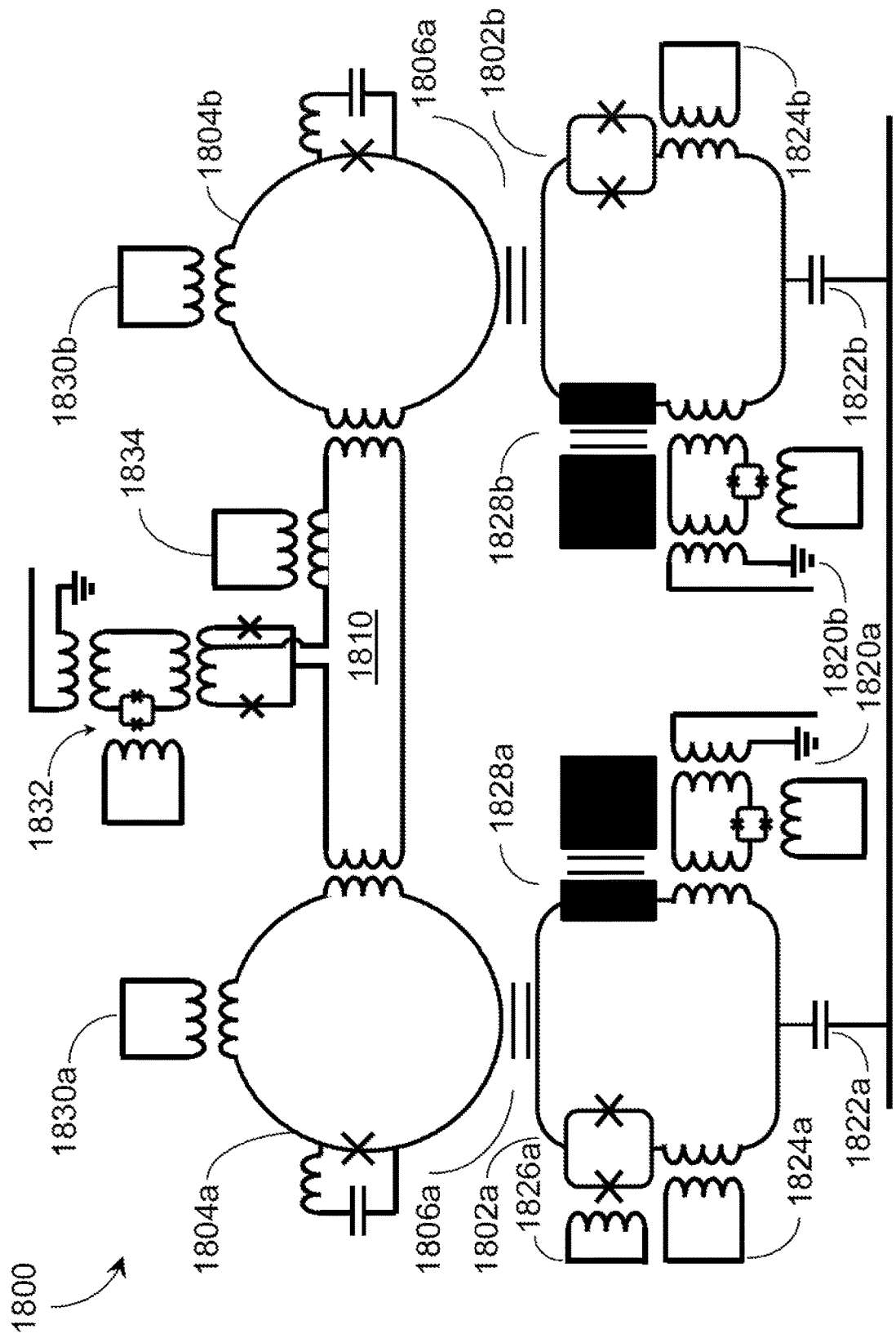
FIG. 18 is a schematic diagram illustrating a portion of an example quantum processor designed for quantum annealing, in accordance with the present systems, devices, and methods.

FIG. 18 is a schematic diagram illustrating a portion of an example quantum processor 1800 designed for quantum annealing, in accordance with the present systems, devices, and methods. Components from the quantum processor 1800 can be used to implement the present systems, devices, articles, and methods. The portion of quantum processor 1800 shown in FIG. 18 includes two superconducting qubits 1802a and 1802b. Associated respectively with each of qubit 1802a and qubit 1802b are cavity 1804a and cavity 1804b. The cavity 1804a is coupled to qubit 1802a via a coupling structure 1806a. The cavity 1804a is coupled to qubit 1802b via a coupling structure 1806b. Examples of coupling structures 1806a and 1806b are shown in FIGS. 3A and 3B. A tunable coupler 1810 provides a 2-local or pairwise interaction between cavity 1084a and cavity 1804b. If more cavities, say n in total, are coupled to the coupler, the coupler provides n-local interaction between a plurality of qubits.

The illustrated qubits 1802a, 1802b provide at least two functions. One, the qubits 1802a, 1802b are non-linear elements that interact with the photons in the cavity. In the language of QED, the qubits 1802a, 1802b are artificial atoms. Two, the qubits 1802a, 1802b are qubits are used to load photons into the cavities. The cavities 1804a, 1804b include zero, one, or more photons that when present interact with the qubits 1802a, 1802b. In some examples, the photons are used as computational states for quantum annealing.

The number and type of qubits in the example superconducting quantum processor 1800 are variable. While the portion of quantum processor 200 is illustrated in FIG. 18 with only two qubits 1802a, 1802b, two cavities 1804a, 1804b, and one coupler 1810, those of skill in the art will appreciate that quantum processor 1800 may include any number of qubits and cavities, and any number of coupling devices coupling information therebetween. The qubits in the example superconducting quantum processor 1800 may be selected from phase qubits, flux qubits, hybrid qubits (including xmon qubits and transmon qubits).

Examples of superconducting qubits include superconducting flux qubits, superconducting charge qubits, hybrid qubits, and the like. Further details of superconducting qubits may be found in Makhlin, et al., 2001, *Rev. Mod. Phys.* 73, 357; Devoret et al., 2004, arXiv:cond-mat/0411174; Zagoskin and Blais, 2007, *Physics in Canada* 63, 215; Clarke and Wilhelm, 2008, *Nature* 453, 1031; Martinis, 2009, *Quantum Inf. Process.* 8, 81; and Devoret and Schoelkopf, 2013, *Science* 339, 1169.

For flux qubits the computational states correspond to circulating currents in a loop of superconducting material. Generally, in a superconducting flux qubit, the Josephson energy dominates or is equal to the charging energy. In a charge qubit, it is the reverse. Examples of flux qubits that may be used include rf-SQUIDs, which include a superconducting loop interrupted by one Josephson junction, persistent current qubits, which include a superconducting loop interrupted by three Josephson junctions, and the like. See, examples of rf-SQUID qubits in Bocko, et al., 1997, *IEEE Trans. on Appl. Supercond.* 7, 3638; Friedman, et al., 2000, *Nature* 406, 43; and Harris, et al., 2010, *Phys. Rev. B* 81, 134510; or persistent current qubits, Mooij et al., 1999, *Science* 285, 1036; and Orlando et al., 5 1999, *Phys. Rev. B* 60, 15398. In addition, hybrid charge-phase qubits, where the energies are equal, may also be used.

For charge qubits the computational states correspond to the presence or absence of a charge. Generally, in a superconducting charge qubit, the charging energy dominates or is equal to the charging energy. For example, the presence or absence of a Cooper pair on an island of superconducting material. The island is defined by at least a Josephson junction and a capacitor. The state of the qubit is determined by the number of Cooper pairs which have tunneled across the junction. See Bouchiat, et al., 1998 *Physica Scripta* T76, 165-170 and Nakamura et al., 1999, *Nature* 398, 786-788.

A transmon qubit is an example of charge qubit that is characterized by a large Josephson energy. The ratio of the Josephson energy to charge energy of the qubit is in some examples around 100. See, for example, Koch et al., 2007 arXiv:cond-mat/0703002, Barends, et al., 2013 *Phys. Rev. Lett.* 111, 080502. A xmon qubit is a cross shaped transmon qubit.

In some examples, the cavities 1804a and 1804b are high quality resonators. An example of a resonator is a LC-circuit. It is an example of a unimodal resonator. An example of a resonator is a LC-circuit with a non-linear inductor. An example of a non-linear inductor is a Josephson junction. An example of a resonator is a waveguide. It is an example of a multimodal resonator. An example of waveguide is a coplanar waveguide. A wave guide is a superconducting structure with an interior region that supports the propagation of electromagnetic waves.

A resonator for a given mode is characterized by a quality factor. In some examples the quality factor of the resonator included in superconducting quantum processor 1800 are of about 100,000 or higher. In some examples the quality factor of the resonator included in superconducting quantum processor 1800 are of about 1,000,000 or higher.

The portion of quantum processor 1800 shown in FIG. 18 may be implemented to physically realize quantum annealing. Quantum processor 1800 includes a plurality of interfaces 1820-1834 that are used to configure and control the state of quantum processor 1800. Each of interfaces 1820-1834 may be realized by a respective coupling structure, as illustrated, as part of a programming subsystem and/or an evolution subsystem. In some examples, a respective coupling structure is an inductive coupling structure. In some examples, a respective coupling structure is a capacitive coupling structure. Such a programming subsystem and/or evolution subsystem may be separate from quantum processor 1800, or it may be included locally (i.e., on-chip with quantum processor 1800) as described in, for example, U.S. Pat. Nos. 7,876,248; and 8,035,540.

In the operation of quantum processor 1800, interfaces 1820a and 1820b (collectively 1820) may each be used to load photons into a respective cavity via a respective qubit. For example, interface 1820b may be used to load photons into cavity 1804b via qubit 1802b. In some examples, the interface 1820 includes a loader comprising a loop of superconducting material interrupted by a compound Josephson junction. The loop is coupled to load line. In some examples, the load line is a global line for the quantum processor 1800. A flux bias is applied to the compound Josephson junction form the output of a superconducting digital to analog converter (DAC). In some examples, the loop of superconducting material is coupled to the respective qubit. Through inductive coupling between the load line, the loop, and the qubit as mediated by the output of the DAC the qubit can be placed in an elevated state. In some examples, the qubit is controlled by on chip circuitry. Examples of on-chip control circuitry are found in U.S. Pat. Nos. 7,876, 248; 7,843,209; 8,018,244; 8,098,179; 8,169,231; and U.S. Patent Publication 2012-0094838.

In the operation of quantum processor 1800, interfaces 1822a and 1822b (collectively 1822) are each used to load photons into cavities 1804a and 1804b. Interfaces 1822, in conjunction with interfaces 1820 and 1824 are used to load photons into cavities 1804a and 1804b. Interfaces 1822a and 1822b are coupled to a microwave line through which shaped pulses are applied to the processor 1800. See FIG. 21.

In some examples, a qubit (e.g., qubit 1802a) includes an island of superconducting material can receive a voltage bias applied to the island across a capacitor. In some examples, the interface 1822a is used to apply a voltage to the island in the qubit.

Figure 21:
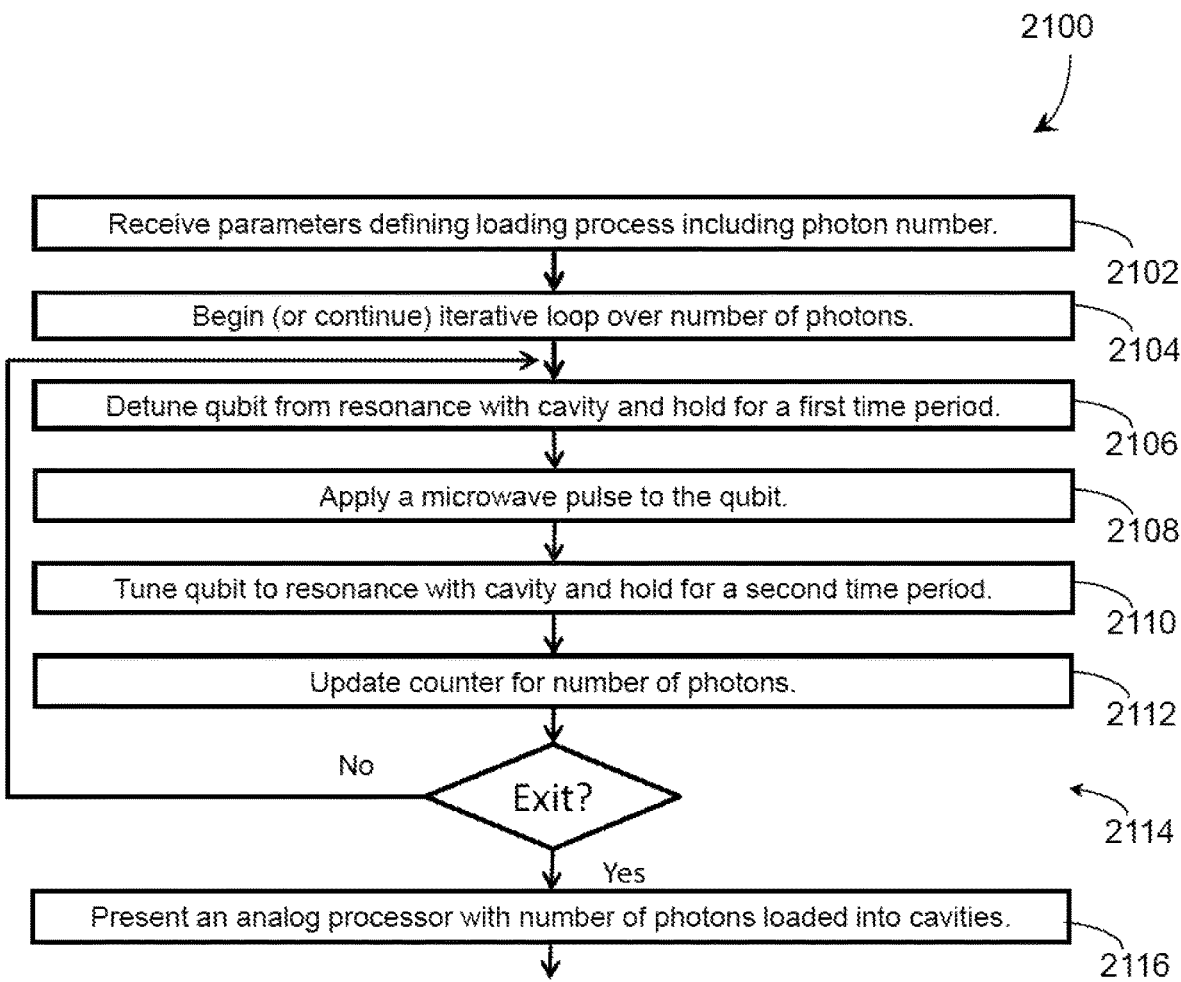
FIG. 21 is a flow diagram illustrating a method for operating a quantum computing device in accordance with the present systems, devices, and methods.

In the operation of quantum processor 1800, interfaces 1824a and 1824b (collectively 1824) are each used to provide a flux bias to a respective qubit. A qubit that includes a loop of superconducting material can receive a flux bias applied to the loop. In some examples, the interface 1824 includes an on-chip control circuit. In some examples, the on-chip control circuit is a superconducting DAC. The output of the superconducting DAC is coupled to a loop included in a respective qubit. Thus, in some examples, the computer 100 using interface 1824 initializes the qubits 1802a and 1802b. In some examples, qubits 1802a and 1802b are initialized in a state far detuned from their respective cavities 1804a and 1804b, and detuned from each other qubit in quantum processor 1800. A method of initialization is shown in FIG. 21.

In the operation of quantum processor 1800, interfaces 1826a and 1824b (collectively 1826) are each used to tune a respective qubit. A qubit comprising a first loop of superconducting material interrupted by a compound Josephson junction including a second loop of superconducting material can receive a flux through the second loop. In some examples, the interface 1824 includes an on-chip control circuit. In some examples, the on-chip control circuit is a superconducting DAC. The output of the superconducting DAC is coupled to a loop included in a compound Josephson junction.

In the operation of quantum processor 1800, interfaces 1828a and 1828b (collectively 1828) are each used to provide read out respective qubit. In some examples, a qubit is read-out by detecting the state of qubit. For example, the qubit is a charge qubit and the readout device includes an electrometer to detect the presence or absence of a Cooper pair. In some examples, a qubit is read out by detecting a quantity that varies with the state of a qubit. For example, the qubit is a hybrid qubit and the readout device includes detecting a voltage state that corresponds the presence a Cooper pair, or not detecting a voltage state that corresponds the absence of a Cooper pair. Examples are shown in FIGS. 3A and 3B.

Some examples of quantum processor 1800 include tunable cavities. In some examples of quantum processor 1800, the cavities 1804a and 1804b are tuned via interfaces 1830a and 1830b (collectively 1830), which are each used to tune a respective cavity. In some examples, each cavity a plurality of cavities is tuned into resonance with each other cavities in the plurality of cavities.

Some examples of quantum processor 1800 include a coupler 1810 controlled by one or more interfaces. In some examples, the coupler 1810 includes a compound Josephson junction for mediating a coupling between two cavities. Interface 1832 applies a flux to the compound Josephson junction. The compound Josephson junction is coupled to an anneal line, such as a global anneal line, via an inductive coupling structure. In some examples the inductive coupling structure is mediated by another compound Josephson junction biased by the output of a DAC.

Some examples of quantum processor 1800 include a coupler 1810 controlled by one or more interfaces. In some examples, the coupler 1810 includes an inductive coupling structure 1834 providing a flux bias to the coupler 1810.

Throughout this specification and the appended claims, the term "quantum processor" is used to generally describe a collection of physical qubits (e.g., qubits 1802a and 1802b) and physical couplers (e.g., coupler 1810), either with or without physical cavities (e.g., cavities 1804a and 1804b). The physical qubits 1802a, 1802b, physical couplers 1810, and cavities 1804a, 1804b, are referred to as the "programmable elements" of the quantum processor 1800 and their corresponding parameters (e.g., the bias on the qubit, the coupler values, and the number of photons in the cavity) are referred to as the "programmable parameters" of the quantum processor. In the context of a quantum processor, the term "programming subsystem" is used to generally describe the interfaces (e.g., "programming interfaces" 1820-1834) used to control the programmable parameters of the quantum processor 1800 and other associated control circuitry and/or instructions. As previously described, the programming interfaces of the programming subsystem may communicate with other subsystems which may be separate from the quantum processor or may be included locally on the processor. As described in more detail later, the programming subsystem may receive programming instructions in a machine language of the quantum processor and execute the programming instructions to program the programmable elements in accordance with the programming instructions.

Figure 19:
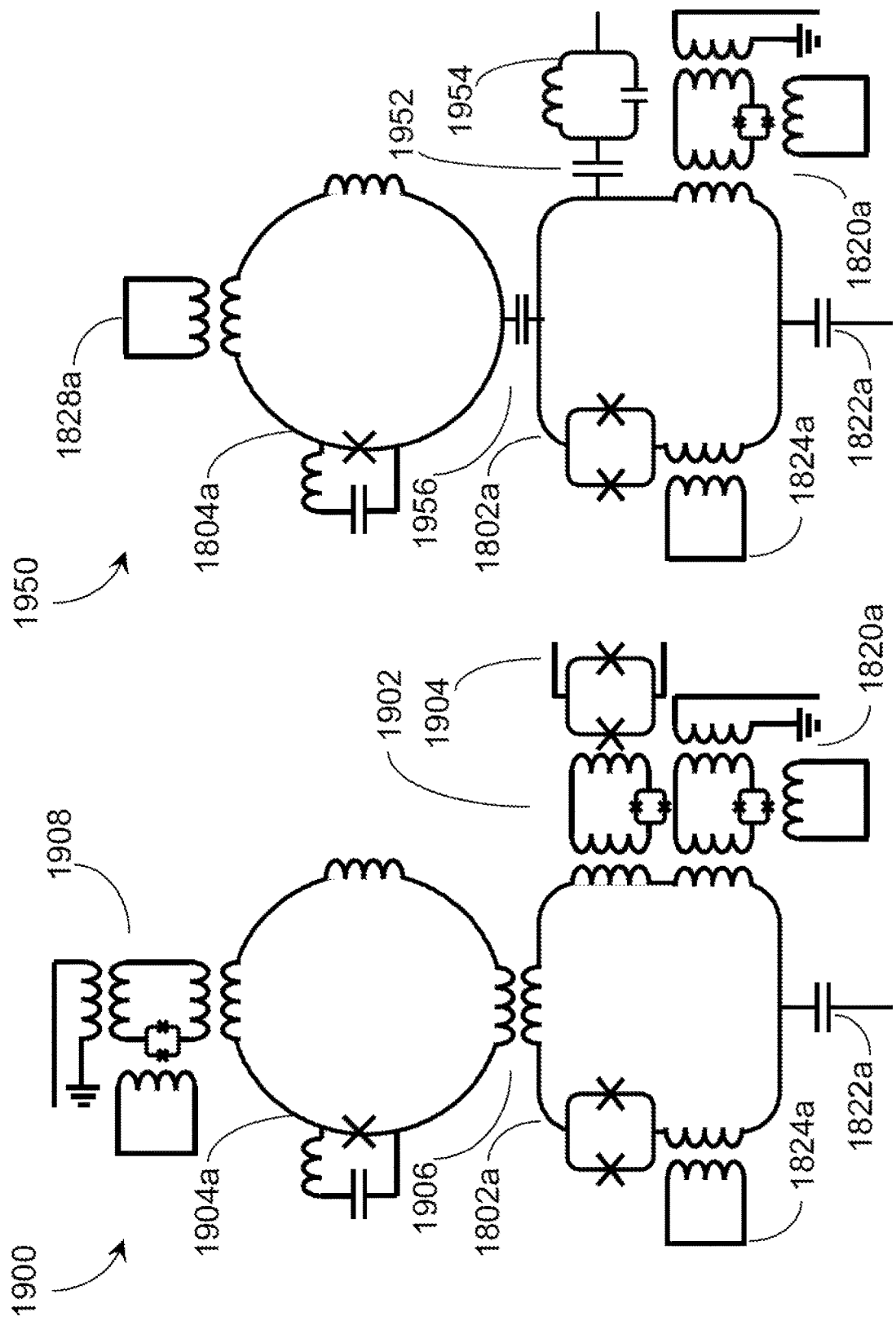
FIG. 19A and FIG. 19B are schematic diagrams that illustrate variations on a sub-portion of the portion of the example superconducting quantum processor of FIG. 18 in accordance with the present systems, devices, and methods.

FIG. 19A and FIG. 18b each illustrate variations on a sub-portion of the portion of the example superconducting quantum processor of FIG. 2, in accordance with the present systems, devices, and methods. In particular, FIG. 19A shows a flux qubit and inductive coupling and inductive control structures. In particular, FIG. 19B shows an xmon qubit and capacitive coupling and capacitive control structure.

FIG. 19A includes a flux qubit and inductive coupling and inductive control structures. FIG. 19A includes a flux qubit 1802a and an associated read out structure. The read out structure includes one or more shift registers 1902 to transfer a flux signal from qubit 1802a to magnetometer 1904. In some examples, the magnetometer 1904 is a DC-SQUID. FIG. 19A includes an inductive coupling between the flux qubit 1802a and the cavity 1804a. FIG. 19A includes a read out structure 1908 for reading out the state of cavity 1804a. The read out structure 1908 includes a shift register mediated by a DAC and coupled to a magnetometer.

FIG. 19B includes an xmon qubit and capacitive coupling and capacitive control structure. FIG. 19B includes an xmon qubit 1802a and an associated capacitive read out structure. The capacitive read out structure includes a capacitor 1952 coupling the qubit 1802a to an electrometer. In some examples the electrometer is an LC-circuit. By observing a shift in the frequency of the LC-circuit the presence or absence of charge in qubit 1802a can be detected. FIG. 19B includes a capacitive coupling structure 1956 between the xmon qubit 1802a and the cavity 1804a.

Quantum annealing uses quantum mechanics as a source of disorder during the annealing process. An objective function, such as an optimization problem, is encoded in a Hamiltonian $H_P$, and the algorithm introduces quantum effects by adding a disordering Hamiltonian $H_D$ that does not commute with $H_P$. There are time dependent envelope function. For example, A(t) changes from a small value to a large value and back to substantially zero during the evolution. The form of the Hamiltonian differs with parameters and bias values for the quantum processor 1800.

In some examples, the Hamiltonian of the quantum processor 1800 is described by a variant of the Jaynes-Cummings-Hubbard Model. An example of this model is:

$$H_E \propto A(t)H_D + B(t)H_P, \qquad (6)$$

Where:

$$H_D \propto \sum_{<i,j>} K_{i,j}(a_j^+ a_i + a_i^+ a_j) \qquad (7)$$

And:

$$H_P \propto \sum_i H_j^{JC} - \mu \hat{N} \qquad (8)$$

And:

$$H_j^{JC} \propto \omega_j a_j^+ a_i + \varepsilon_j \sigma_j^+ \sigma_i^- + g_j(a_j^+ \sigma_j^- + \sigma_j^+ a_j) \qquad (9)$$

And:

$$\hat{N} = \sum_i (a_j^+ a_j^- + \sigma_j^+ \sigma_j) \qquad (10)$$

As an overview, the quantum processor may be initially reset. The photons are loaded into each cavity of the cavity lattice. The cavities are then coupled to respective qubits via associated couplers. The quantum processor is then annealed. The cavity photon population is then counted.

Figure 20:
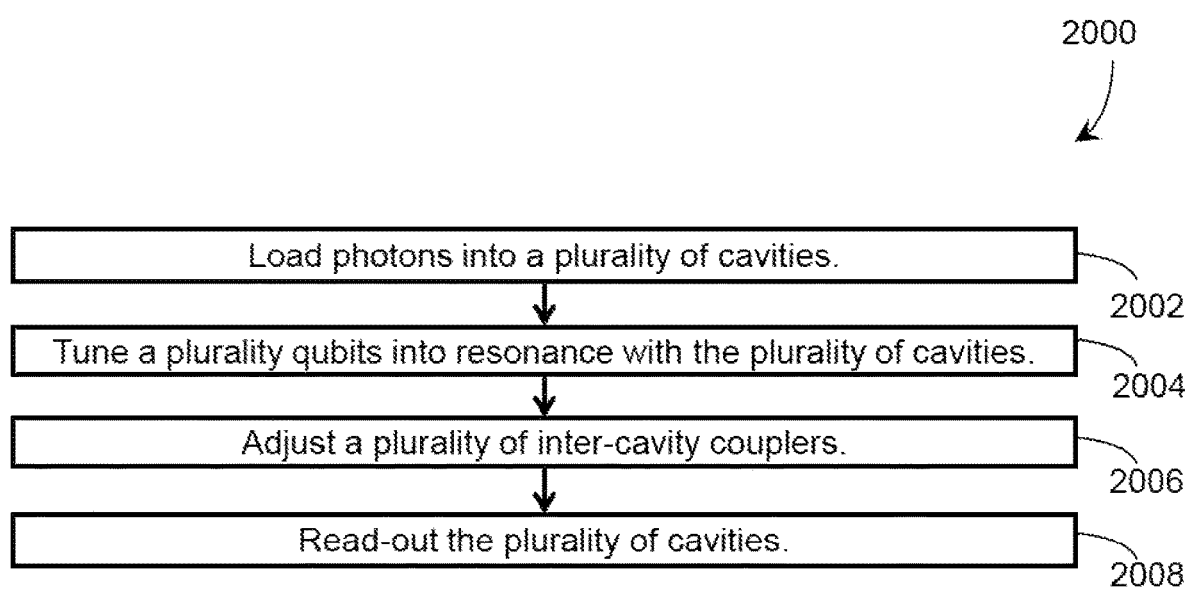
FIG. 20 is a flow diagram illustrating a method of operation in a computational system illustrates a tiling of qubits, cavities, couplers, and associated devices on an example superconducting quantum processor in accordance with the present systems, devices, and methods.

FIG. 20 shows a method 2000 for operating a hybrid computer including a plurality of qubits, couplers, and cavities as a quantum annealing system. One or more of these acts may be performed by or via one or more circuits, for instance one or more processors. In some examples, a quantum annealing system including a hybrid computer performs the acts in method 2000.

At 2002, one or more elements (e.g., digital processor(s), quantum processor(s)) of the hybrid computer system 1700 (FIG. 17) loads photons into a plurality of cavities in a quantum processor included in a hybrid computer included in the annealer (i.e., the quantum annealing system). In some examples, the photons are loaded into the cavities via an associated plurality of qubit. In some examples, each cavity in the plurality of cavities is associated with a qubit.

At 2004, one or more elements (e.g., digital processor(s), quantum processor(s)) of the hybrid computer system 1700 (FIG. 17) tunes each qubit in the plurality of qubits into resonance with each respective cavity in the plurality of cavities.

At 2006, one or more elements (e.g., digital processor(s), quantum processor(s)) of the hybrid computer system 1700 (FIG. 17) anneals the state of the quantum processor. In some examples the quantum annealing system adjusts the coupling between cavities.

At 2008, one or more elements (e.g., digital processor(s), quantum processor(s)) of the hybrid computer system 1700 (FIG. 17) reads out the state of each cavity. The state of a cavity includes the number of photons in the cavity.

FIG. 21 shows a method 2100 for loading photons into an annealing device in accordance with the present systems, devices, and methods.

At 2102, one or more elements (e.g., digital processor(s), quantum processor(s)) of the hybrid computer system 1700 (FIG. 17) receives parameters that define a loading process, including a photon number (i.e., defined number of photons to be loaded).

At 2104, one or more elements (e.g., digital processor(s), quantum processor(s)) of the hybrid computer system 1700 (FIG. 17) executes a loop over the number of photons.

At 2106, one or more elements (e.g., digital processor(s), quantum processor(s)) of the hybrid computer system 1700 (FIG. 17) detunes a qubit from resonance with a respective cavity and holds the qubit detuned for a defined first period of time.

At 2108, one or more elements (e.g., digital processor(s), quantum processor(s)) of the hybrid computer system 1700 (FIG. 17) applies a microwave pulse to the qubit that had been detuned.

At 2110, one or more elements (e.g., digital processor(s), quantum processor(s)) of the hybrid computer system 1700 (FIG. 17) tunes the qubit to resonance with the respective cavity and holds the qubit tuned for a defined second period of time.

At 2112, one or more elements (e.g., digital processor(s), quantum processor(s)) of the hybrid computer system 1700 (FIG. 17) updates a counter for the number of photons.

At 2114, one or more elements (e.g., digital processor(s), quantum processor(s)) of the hybrid computer system 1700 (FIG. 17) determines with an exit condition has been satisfied. For example, the value of the counter reaching or equaling the photon number can be an exit condition. If the exit condition has not been satisfied, control returns to 2106. If the exit condition has been satisfied, control passes to 2116, where an analog processor is presented with the defined number of photons loaded into the cavities of the analog processor.

Figure 22:
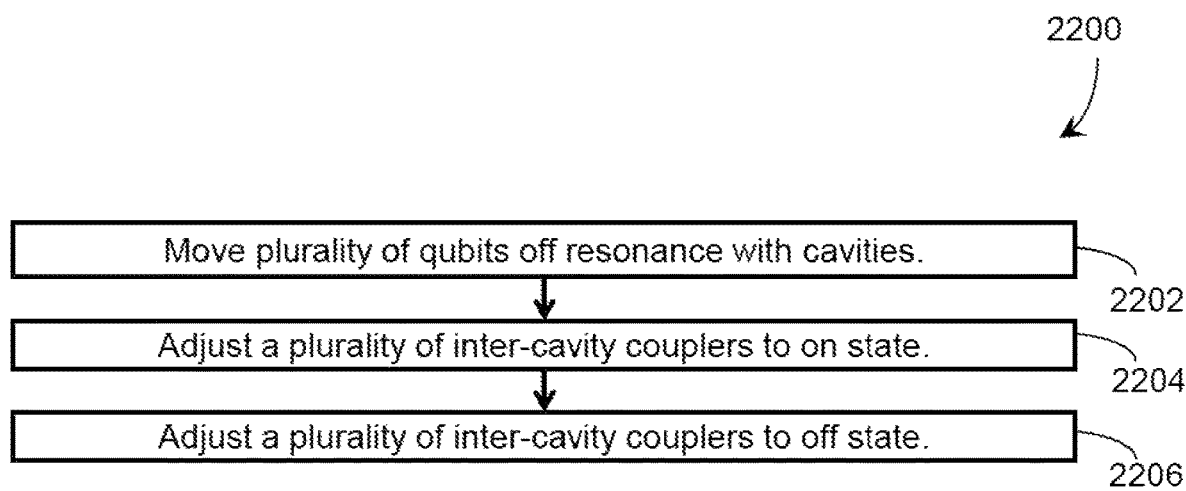
FIG. 22 is a flow diagram illustrating a method for operating a quantum computing device in accordance with the present systems, devices, and methods.

FIG. 22 show a method 2200 for reading out the state of quantum computing device in accordance with the present systems, devices, and methods.

At 2202, one or more elements (e.g., digital processor(s), quantum processor(s)) of the hybrid computer system 1700 (FIG. 17) moves a plurality of qubits off resonance with respective cavities.

At 2204, one or more elements (e.g., digital processor(s), quantum processor(s)) of the hybrid computer system 1700 (FIG. 17) adjusts or sets a plurality of inter-cavity couplers to an ON state.

At 2206, one or more elements (e.g., digital processor(s), quantum processor(s)) of the hybrid computer system 1700 (FIG. 17) adjusts or sets a plurality of inter-cavity couplers to an OFF state.

Figure 23:
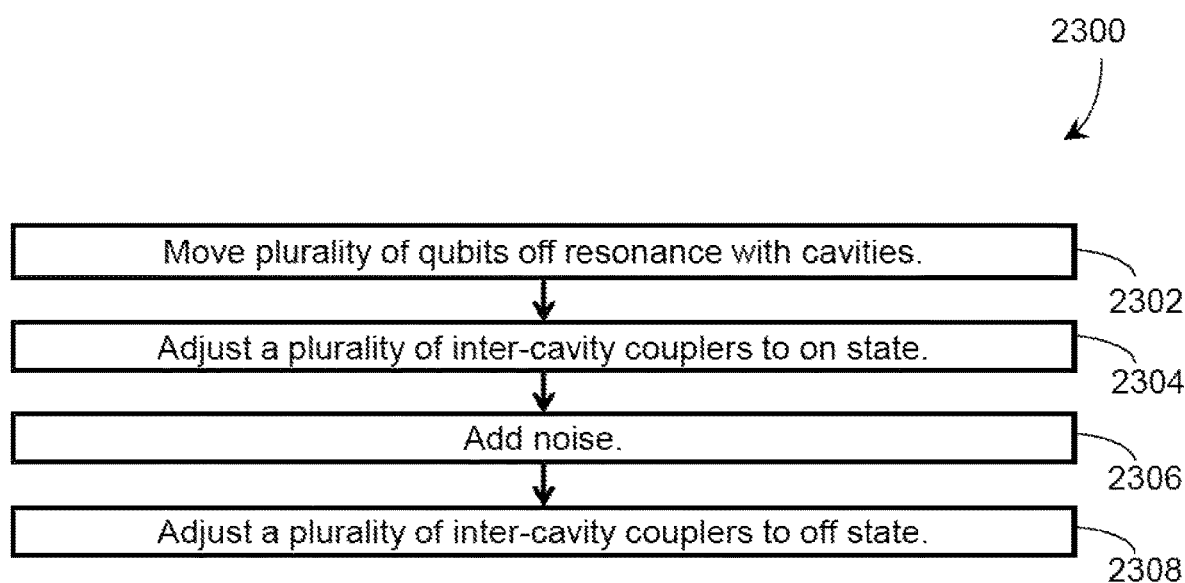
FIG. 23 is a flow diagram illustrating a method of operation in a quantum computing device as an annealer in accordance with the present systems, devices, and methods.

FIG. 23 is a flow diagram showing a method for operating a quantum computing device as an quantum annealing system in accordance with the present systems, devices, and methods.

At 2302, one or more elements (e.g., digital processor(s), quantum processor(s)) of the hybrid computer system 1700 (FIG. 17) moves a plurality of qubits off resonance with respective cavities.

At 2304, one or more elements (e.g., digital processor(s), quantum processor(s)) of the hybrid computer system 1700 (FIG. 17) adjusts or sets a plurality of inter-cavity couplers to an ON state.

At 2306, one or more elements (e.g., digital processor(s), quantum processor(s)) of the hybrid computer system 1700 (FIG. 17) adds noise.

At 2308, one or more elements (e.g., digital processor(s), quantum processor(s)) of the hybrid computer system 1700 (FIG. 17) adjusts or sets a plurality of inter-cavity couplers to an OFF state.

Noise Engineering for Reduction of Anderson Localization in Coherent Quantum Annealing The type of error this technique targets is Anderson localization. Anderson localization occurs when states change from a large superposition to a small local superposition, causing the system to move into local minima. The present technique involves deliberately introducing engineered noise that pushes the system to move to the global minimum if it falls into local minima to avoid Anderson localization. Such may employ the structure generally illustrated in FIGS. 1, 2, 3A and 3B and described in the description of the structures illustrated in those Figures.

The engineered noise that is introduced will ideally satisfy three conditions: i) Its frequencies are much smaller than the resonance frequency of oscillators, ii) noise broadening of the energy levels of the oscillators is much smaller than the resonance frequency, and iii) quench error must be smaller than desired precision.

These three conditions can be translated mathematically as described herein.

The engineered noise can be achieved by filtering white noise or from noise by lossy on-chip devices such as resonators.

In quantum annealing, the wave function starts from the initial ground state which is a large superposition in the solution space but is slowly deformed into a state that is completely localized in the solution space. During the evolution, the eigenstates of the system become more and more localized. Anderson localization is the process through which the ground state (and other excited states) changes from a large superposition of all states to a small local superposition. If the wave function of the system is localized into an excited state instead of the around state, the time required for the system to move from the local minimum to the global minimum can become exponentially long. This is closely related to the system having a very small gap anti-crossing. One way to increase the mobility of the system after Anderson localization is to introduce some noise. The noise spectrum and its strength, however, should be engineered in such a way that it does not reduce the amount of coherence needed, it does not cause unwanted relaxation out of the desired subspace, and it does not introduce quench error (static error in the Hamiltonian parameters). Methods to engineer such a noise for different coherent quantum annealers are described herein.

In most versions of coherent quantum annealing, the effective Hamiltonian is written in a subspace which consists of an excited state of the original physical system. Although the idea is to find the ground state of the effective Hamiltonian, in reality one finds an excited state of the physical system. As such any thermal relaxation will leak the system out of the computation subspace and cause an error. For example, in a version involving an harmonic oscillators, M photons are fed to the system and therefore the subspace includes all states that have in total M photons. Any photon relaxation (decay) is a source of error. As such, the computation time is always limited by the relaxation time of the total system. Such a coherent quantum annealing will suffer from Anderson localization at large scales.

Anderson localization can be described in terms of energy conservation. For example, consider a system of coupled harmonic oscillators with different resonance frequencies. If the coupling energies are larger than the differences in their resonance frequencies, photons can easily be exchanged between the resonators. However, if the coupling energies between different oscillators become smaller than the differences between their oscillation frequencies, the photons will likely not be able to move between the oscillators because it violates energy conservation. Therefore, photons will likely be localized. If the state in which photons are localized is not the ground state of the final Hamiltonian, an anticrossing with a very small gap occurs. In order to solve this problem, one needs to increase the annealing time beyond the adiabatic time scale determined by the minimum gap. Such annealing time can be larger than the relaxation time, which would translate into leaking out of the computation subspace thereby causing error. Therefore, without other quantum error correction procedures, such hard problems would likely not be solvable.

There will always be a limit in how large the relaxation time can be. Since the relaxation time is an upper bound on how long the annealing time can be, there can be a limit on how small of a spectral gap the system can handle. As a result, the computation can fail for many problems at large scale.

One can reduce the effect of Anderson localization by adding noise. By providing energy to the system or getting energy out of the system, noise can help photons move when energy conservation is not satisfied. Therefore, the photons can move in a regime where the photons would not otherwise be allowed in a completely coherent system. This can significantly increase the probability of success in hard problems.

However, noise can also reduce the relaxation time T1 and introduce error in the problem Hamiltonian. Therefore, a haphazardly added noise can harm more than it can help. Thus, it is preferable for noise to be engineered such that the noise maximally helps with Anderson localization, while the destructive effects of the noise are minimized. There are two destructive effects that noise can have: reducing relaxation time and introducing quench error.

For concreteness, consider a quantum annealer made of harmonic or unharmonic oscillators with a resonance frequency. The relaxation of a harmonic oscillator can result from a single-photon or a multi-photon process. For a single photon process, the environmental noise needs to have a large spectral density at the resonance frequency $W_i$ or higher harmonics of the ith harmonic oscillator. The relaxation rate of a harmonic oscillator with M photon is typically $$\gamma \propto \max_{m<M} S(m\omega_i) \tag{11}$$

The proportionality constant depends on how noise is coupled to the system. Therefore, in order to avoid an increase in relaxation rate due to single photon processes, it is preferable for the added noise to have modes only at frequencies much smaller than the resonance frequency, or equivalently $$S(\omega \gtrsim \omega_i) \approx \tag{12}$$

Low frequency noise, if strongly coupled to the system, may also cause relaxation through multi-photon processes. The noise broadening of the energy levels of the harmonic oscillators is given by $$W \propto \sqrt{\int_{1/T_1}^{\infty} S(\omega) d\omega} \tag{13}$$

Again, the proportionality constant depends on the details of the coupling Hamiltonian. To ensure that the multi-photon process does not decrease the relaxation time the following condition should be true:

$$W << \omega_i \tag{14}$$

The modes in the low frequency noise that are slower than $1/T_1$ will behave as constant shifts in the parameters causing quench error in the calculation, where $$\delta \propto \sqrt{\int_0^{1/T_1} \frac{d\omega}{2\pi} S(\omega)} \tag{15}$$

Once again, the proportionality constant depends on how noise is coupled to the system. If the desired precision is given by $\epsilon$, then the following should hold:

$$\delta \propto \epsilon \tag{16}$$

The engineered noise therefore needs to satisfy conditions (2), (4) and (6). If the noise spectral density $S(\omega)$ has low and high frequency cutoffs $w_L$ and $w_H$, the above three conditions translates into:

$$\omega_H << \omega_i, \omega_L >> 1/T_1, \sqrt{\int_{\omega_L}^{\omega_H} \frac{d\omega}{2\pi} S(\omega)} << \omega_i \tag{17}$$

There are many ways to introduce noise with engineered spectrum to the system. The easiest way is to filter a white noise or a thermal noise from a high temperature source with cutoff frequencies that satisfy conditions (7). One may also introduce noise by lossy on-chip devices, such as resonators of qubits. Suppose that a lossy resonator with resonance frequency $\omega_0$ and damping factor $\gamma_0$ is added to the harmonic oscillator i. The spectral density of the noise introduced by such a resonator is:

$$S(\omega) = \kappa^2 \frac{\gamma_0 \omega \coth\left(\frac{\omega}{2T}\right)}{(\omega^2 - \omega_0^2)^2 + \gamma_0^2 \omega^2} \tag{18}$$

where $\kappa$ is the coupling coefficient. In order to satisfy condition (7) the following should be satisfied:

$$\omega_i - \omega_0 \gg \gamma_0, \omega_0 - 1/T_1 \gg \gamma_0 \tag{19}$$
and $$\int \frac{d\omega}{2\pi} S(\omega) \ll \omega_i^2 \tag{20}$$

One may also introduce noise by adding lossy qubits or other two-state systems to the system. If the qubit has tunneling amplitude of $\Delta_0$ and relaxation rate of $\gamma_0$ then the noise spectral density introduced by the qubit is:

$$S(\omega) = \kappa^2 \frac{\gamma_0}{(\omega - \Delta_0)^2 + \gamma_0^2} \tag{21}$$

Again, in order to satisfy conditions (7) the following should be true:

$$\omega_i - \Delta_0 \gg \gamma_0, \omega_0 - 1/T_1 \gg \gamma_0 \tag{22}$$
and $$\int \frac{d\omega}{2\pi} S(\omega) \ll \omega_i^2 \tag{23}$$

There could be many other ways to introduce noise and the idea can be applied to any coherent quantum annealer and therefore is not limited to a system of coupled harmonic or unharmonic oscillators described here.

As described previously, due to imperfections in qubits of a quantum processor, indirect communicative coupling and leakage of applied biases can exist between problem qubits that are not directly coupled. Such indirect interactions can be characterized as "ghost coupling" and can lead to background susceptibility.

Figure 24:
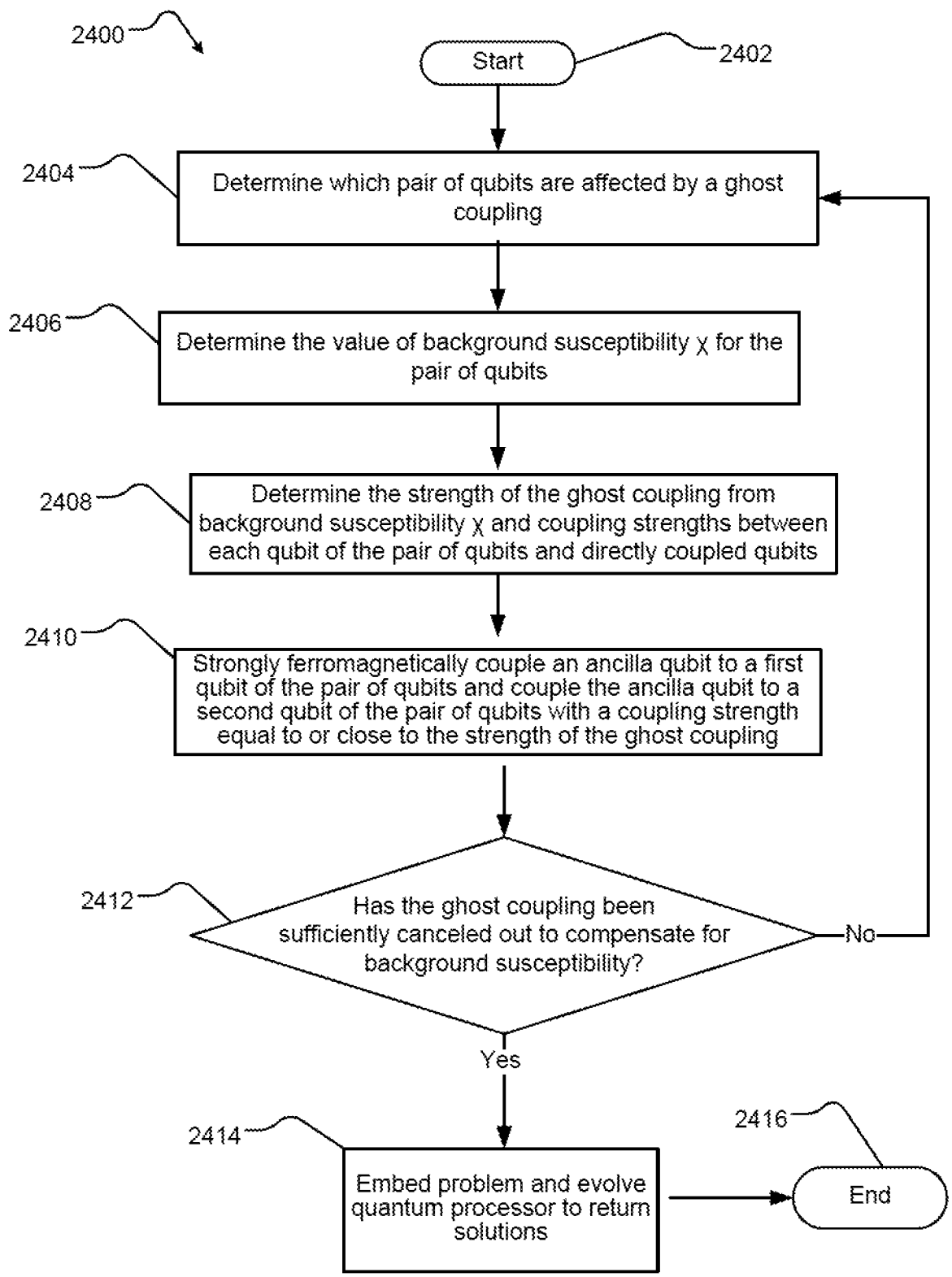
FIG. 24 is a flow diagram illustrating a method of operation to compensate for background susceptibility by canceling out at least some ghost couplings, in accordance with the present systems, devices, and methods.

FIG. 24 shows a method 2400 of operation to compensate for background susceptibility error by cancel out at least some "ghost couplings" in a computation system, in accordance with the present systems, devices, and methods. Acts 2402 to 2416 of method 2400 can be performed subsequent to act 608 of method 600 in FIG. 6.

The method 2400 starts at 2402, for example in response to a submission of a problem, a call from a routine, or other invocation.

At 2404, one or more elements (e.g., user(s), digital processor(s), quantum processor(s)) of a system determines a pair of qubits that are affected by at least one ghost coupling. The strength of a ghost coupling between a pair of qubits can depend on at least the number of qubits that each qubit of the pair of qubits is directly coupled to.

At 2406, one or more elements (e.g., user(s), digital processor(s), quantum processor(s)) of a system determines the value of background susceptibility $\chi$. In one implementation, background susceptibility $\chi$ is determined by a digital processor that compares experimental data to an ideal model that returns probabilities from a Boltzmann distribution. Typically, clustered qubits will have stronger ghost couplings and a greater background susceptibility error $\chi$.

At 2408, one or more elements (e.g., user(s), digital processor(s), quantum processor(s)) of a system determines the strength of a ghost coupling between a pair of qubits. The strength of the ghost coupling $K_{ij}$ between a pair of qubits (e.g., qubit i and qubit j) can depend on background susceptibility $\chi$ and coupling strengths between each qubit of the pair of qubits and directly coupled qubits.

At 2410, an ancilla qubit is strongly ferromagnetically coupled to a first qubit of the pair of qubits via a first coupler. The ancilla qubit can be strongly ferromagnetically coupled to a first qubit of the pair of qubits to operate as a logical qubit. The ancilla qubit is also further coupled to a second qubit of the pair of qubits via a second coupler with a couple strength that is comparable to the strength of the ghost coupling between the pair of qubits.

At 2412, one or more elements (e.g., user(s), digital processor(s), quantum processor(s)) of a system determines whether the ghost coupling between the pair of qubits has been sufficiently canceled out to compensate for background susceptibility. For example, the ghost coupling between the pair of qubits may be canceled out sufficiently so that the overall background susceptibility of the quantum processor is less than 2%.

At 2414, one or more elements (e.g., digital processor(s), quantum processor(s)) of a system embeds the problem graph in the hardware graph of the quantum processor and evolves the system to return solutions. Solutions may be generated from a system including a coupling scheme and topology that compensates for background susceptibility $\chi$. Evolution is explained elsewhere herein and in the various patents and patent applications incorporated by reference herein. The system returning solutions can include reading out solutions from the quantum processor and evaluating the solutions. For example, one or more readout devices (e.g., SQUIDS) may read out the state of the qubits and a digital processor can evaluate the solutions.

The method 2400 terminates at 2416. Alternatively, the method 2400 may repeat for one or more iterations. In some implementations, the method 2400 may be executed in parallel on a plurality of instances of a physical machine or physical processor or a plurality of instances of a virtual machine or virtual processor.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the example methods for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary, to employ systems, circuits, and concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a computational system that comprises both a quantum processor and at least one processor-based device communicatively coupled to one another, the quantum processor comprising a plurality of qubits and a plurality of coupling devices, wherein each coupling device is operable to provide controllable communicative coupling between two of the plurality of qubits, the method comprising:
producing a problem graph representation of a first problem;
identifying each of the qubits that will be operated as a problem qubit, the problem qubit to be used when generating solutions to the first problem;
for each of at least a non-zero number of the qubits that will be operated as problem qubits, identifying a respective ancilla qubit that is exclusively coupled to one qubit of the qubits that will be operated as problem qubits, the ancilla qubits operable to apply an external flux bias to respective problem qubits;
embedding the problem graph representation of the first problem into the problem qubits of the quantum processor;
applying an external flux bias to each problem qubit to at least partially reduce a qubit bias to coupling strength (h/J) ratio misbalance of a respective qubit; and
evolving the quantum processor with the problem graph representation embedded therein to generate solutions to the first problem via the quantum processor.

2. The method of claim 1, further comprising:
identifying a problem type of the first problem;
determining whether the identified problem type of the first problem is a problem type that is relatively sensitive to h/J misbalance error or is a problem type that is relatively insensitive to h/J misbalance error; and
wherein the identifying each of the qubits that will be operated as a problem qubit to be used when generating solutions to the first problem and the identifying a respective ancilla qubit to apply an external flux bias to the respective problem qubits is responsive to a determination that the problem type of the first problem is one that is relatively sensitive to h/J misbalance, employing existing hardware of the quantum processor to compensate for h/J misbalance when evolving the quantum processor to generate solutions to the first problem via the quantum processor.

3. The method of claim 2, the method comprising:
in response to a determination that the problem type is one that is relatively insensitive to h/J misbalance error, employing the existing hardware to embed a problem graph of the first problem in a hardware graph of the quantum processor without using the existing hardware of the quantum processor to compensate for h/J misbalance error.

4. The method of claim 3 wherein employing the existing hardware to embed the problem graph of the first problem in the hardware graph of the quantum processor without using the existing hardware of the quantum processor to compensate for h/J misbalance error includes embedding the problem graph of the first problem in the hardware graph of the quantum processor without any ancilla qubits to compensate for h/J misbalance error.

5. The method of claim 2 wherein determining whether the identified problem type of the first problem is a problem type that is relatively sensitive to h/J misbalance error or is a problem type that is relatively insensitive to h/J misbalance error includes determining whether the first problem is an optimization problem and hence is relatively sensitive to h/J misbalance error.

6. The method of claim 2 wherein determining whether the identified problem type of the first problem is a problem type that is relatively sensitive to h/J misbalance error or is a problem type that is relatively insensitive to h/J misbalance error includes querying at least one of a data schema or a piece of metadata, logically associated with the first problem via one or more stored relationships.

7. The method of claim 2 wherein determining whether the identified problem type of the first problem is a problem type that is relatively sensitive to h/J misbalance error x or is a problem type that is relatively insensitive to h/J misbalance error includes analyzing the first problem to determine a broad class of problems to which the first problem belongs.

8. The method of claim 2, the method further comprising:
identifying a problem type of a second problem;
determining whether the identified problem type of the second problem is a problem type that is relatively sensitive to h/J misbalance error or is a problem type that is relatively insensitive to h/J misbalance error; and
in response to a determination that the problem type of the second problem is a problem type that is relatively insensitive to h/J misbalance error, employing the existing hardware of the quantum processor to embed a problem graph of the second problem without using the existing hardware to compensate for h/J misbalance error when evolving the quantum processor to generate solutions to the second problem via the quantum processor.

9. The method of claim 8 wherein employing the existing hardware of the quantum processor to embed the problem graph of the second problem without using the existing hardware to compensate for h/J misbalance error when evolving the quantum processor to generate solutions to the second problem via the quantum processor includes embedding the problem graph of the second problem in a hardware graph of the quantum processor without any ancilla qubits to compensate for h/J misbalance error.

10. The method of claim 8 wherein employing the existing hardware of the quantum processor to embed the problem graph of the second problem without using the existing hardware to compensate for h/J misbalance error when evolving the quantum processor to generate solutions to the second problem via the quantum processor includes embedding the problem graph of the second problem in the hardware graph of the quantum processor employing one or more of the qubits of the quantum processor that were used as ancilla qubits when evolving the quantum processor to generate solutions for the first problem as problem qubits when generating solutions for the second problem.

11. A computational annealing system, comprising:
a quantum processor, the quantum processor comprising a plurality of qubits and a plurality of coupling devices, wherein each coupling device is operable to provide controllable communicative coupling between two of the plurality of qubits; and at least one processor-based device communicatively coupled to the quantum processor;

at least one non-transitory processor-readable medium that stores at least one of processor-executable instructions or data which, when executed, cause at least one processor to:

produce a problem graph representation of a first problem;

identify each of the qubits that will be operated as a problem qubit, the problem qubit to be used when generating solutions to the first problem;

for each of at least a number of the qubits that will be operated as problem qubits, identify a respective ancilla qubit to apply an external flux bias to respective problem qubits;

embed the problem graph representation of the first problem into the problem qubits of the quantum processor; and evolve the quantum processor with the problem graph representation embedded therein to generate solutions to the first problem via the quantum processor.

12. The computational annealing system of claim 11 wherein the at least one of processor-executable instructions or data, when executed, further cause the at least one processor to:

identify a problem type of the first problem; and determine whether the identified problem type of the first problem is a problem type that is relatively sensitive to a qubit bias to coupling strength (h/J) misbalance error or is a problem type that is relatively insensitive to h/J misbalance error, wherein when the at least one processor identifies each of the qubits that will be operated as a problem qubit to be used when generating solutions to the first problem and identifies a respective ancilla qubit to apply an external flux bias to the respective problem qubits the at least one processor is responsive to a determination that the problem type of the first problem is one that is relatively sensitive to h/J misbalance, and wherein when the at least one processor evolves the quantum processor to generate solutions to the first problem via the quantum processor the at least one processor employs existing hardware of the quantum processor to compensate for h/J misbalance.

13. The computational annealing system of claim 12 wherein the at least one of processor-executable instructions or data, when executed, further cause the at least one processor to:

in response to a determination that the problem type is one that is relatively insensitive to h/J misbalance error, employ the existing hardware to embed a problem graph of the first problem in a hardware graph of the quantum processor without using the existing hardware of the quantum processor to compensate for h/J misbalance error.

14. The computational annealing system of claim 13 wherein when the at least one processor employs the existing hardware to embed the problem graph of the first problem in the hardware graph of the quantum processor without using the existing hardware of the quantum processor to compensate for h/J misbalance error the at least one processor embeds the problem graph of the first problem in the hardware graph of the quantum processor without any ancilla qubits to compensate for h/J misbalance error.

15. The computational annealing system of claim 12 wherein when the at least one processor determines whether the identified problem type of the first problem is a problem type that is relatively sensitive to h/J misbalance error or is a problem type that is relatively insensitive to h/J misbalance error the at least one processor determines whether the first problem is an optimization problem and hence is relatively sensitive to h/J misbalance error.

16. The computational annealing system of claim 12 wherein when the at least one processor determines whether the identified problem type of the first problem is a problem type that is relatively sensitive to h/J misbalance error or is a problem type that is relatively insensitive to h/J misbalance error the at least one processor queries at least one of a data schema or a piece of metadata, logically associated with the first problem via one or more stored relationships.

17. The computational annealing system of claim 12 wherein when the at least one processor determines whether the identified problem type of the first problem is a problem type that is relatively sensitive to h/J misbalance error x or is a problem type that is relatively insensitive to h/J misbalance error the at least one processor analyzes the first problem to determine a broad class of problems to which the first problem belongs.

18. The computational annealing system of claim 12 wherein the at least one of processor-executable instructions or data, when executed, further cause the at least one processor to:

identify a problem type of a second problem;

determine whether the identified problem type of the second problem is a problem type that is relatively sensitive to h/J misbalance error or is a problem type that is relatively insensitive to h/J misbalance error; and in response to a determination that the problem type of the second problem is a problem type that is relatively insensitive to h/J misbalance error, employ the existing hardware of the quantum processor to embed a problem graph of the second problem without using the existing hardware to compensate for h/J misbalance error when the at least one processor-based device evolves the quantum processor to generate solutions to the second problem via the quantum processor.

19. The computational annealing system of claim 18 wherein when the at least one processor employs the existing hardware of the quantum processor to embed the problem graph of the second problem without using the existing hardware to compensate for h/J misbalance error when the at least one processor-based device evolves the quantum processor to generate solutions to the second problem via the quantum processor includes the at least one processor embeds the problem graph of the second problem in a hardware graph of the quantum processor without any ancilla qubits to compensate for h/J misbalance error.

20. The computational annealing system of claim 18 wherein when the at least one processor employs the existing hardware of the quantum processor to embed the problem graph of the second problem without using the existing hardware to compensate for h/J misbalance error when the at least one processor-based device evolves the quantum processor to generate solutions to the second problem via the quantum processor the at least one processor embeds the problem graph of the second problem in a hardware graph of the quantum processor employing one or more of the qubits of the quantum processor that were used as ancilla qubits when the at least one processor-based device evolves the quantum processor to generate solutions for the first problem as problem qubits.

\* \* \* \* \*